United States Patent
Arai

(10) Patent No.: US 8,503,092 B2
(45) Date of Patent: Aug. 6, 2013

(54) ZOOM LENS, OPTICAL APPARATUS AND METHOD OF MANUFACTURING ZOOM LENS

(75) Inventor: Daisaku Arai, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/215,381

(22) Filed: Aug. 23, 2011

(65) Prior Publication Data
US 2012/0050883 A1    Mar. 1, 2012

(30) Foreign Application Priority Data

Aug. 31, 2010  (JP) ................................. 2010-195087
Aug. 31, 2010  (JP) ................................. 2010-195088

(51) Int. Cl.
*G02B 15/14*    (2006.01)
*G02B 27/64*    (2006.01)

(52) U.S. Cl.
USPC ............................ 359/682; 359/557; 359/689

(58) Field of Classification Search
USPC .......................... 359/554–557, 680–682, 689
See application file for complete search history.

(56) References Cited

U.S. PATENT DOCUMENTS

| | | | |
|---|---|---|---|
| 2006/0181781 A1* | 8/2006 | Yamashita et al. | 359/680 |
| 2007/0121217 A1* | 5/2007 | Hozumi et al. | 359/680 |
| 2008/0106799 A1 | 5/2008 | Ohashi | |
| 2009/0290231 A1 | 11/2009 | Kanai et al. | |
| 2010/0195214 A1 | 8/2010 | Muratani | |

FOREIGN PATENT DOCUMENTS

| | | |
|---|---|---|
| JP | 63-292106 A | 11/1988 |
| JP | 2008-33212 A | 2/2008 |
| JP | 2009-282466 A | 12/2009 |
| JP | 2010-181518 A | 8/2010 |

* cited by examiner

*Primary Examiner* — Scott J Sugarman
(74) *Attorney, Agent, or Firm* — Miles & Stockbridge P.C.

(57) ABSTRACT

A zoom lens having, in order from the object, a first lens group G1 having negative refractive power, a second lens group G2 having positive refractive power, and a third lens group G3 having positive refractive power, wherein the second lens group G2 is constituted only by three or more cemented lenses.

23 Claims, 47 Drawing Sheets

(EXAMPLE 1)

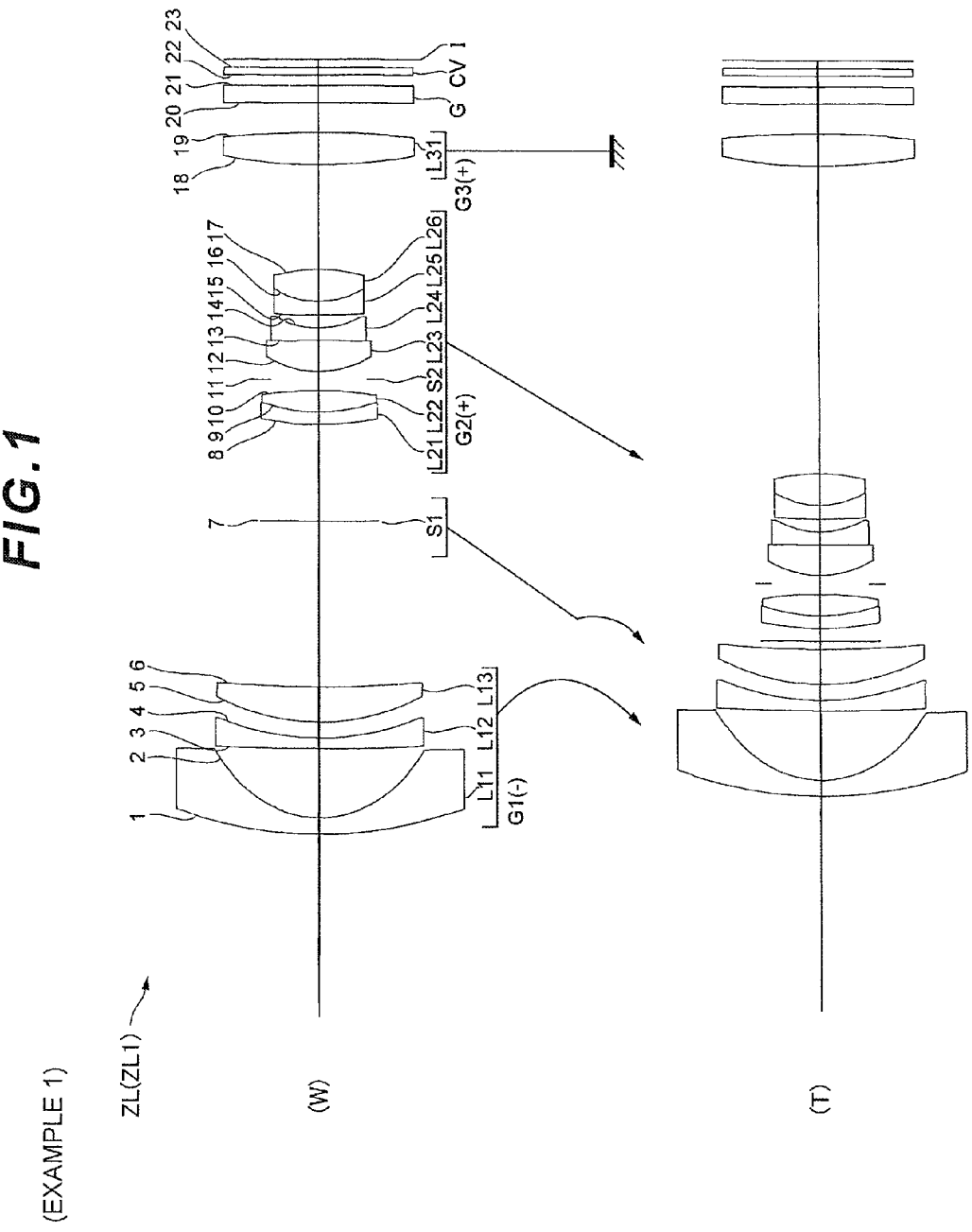

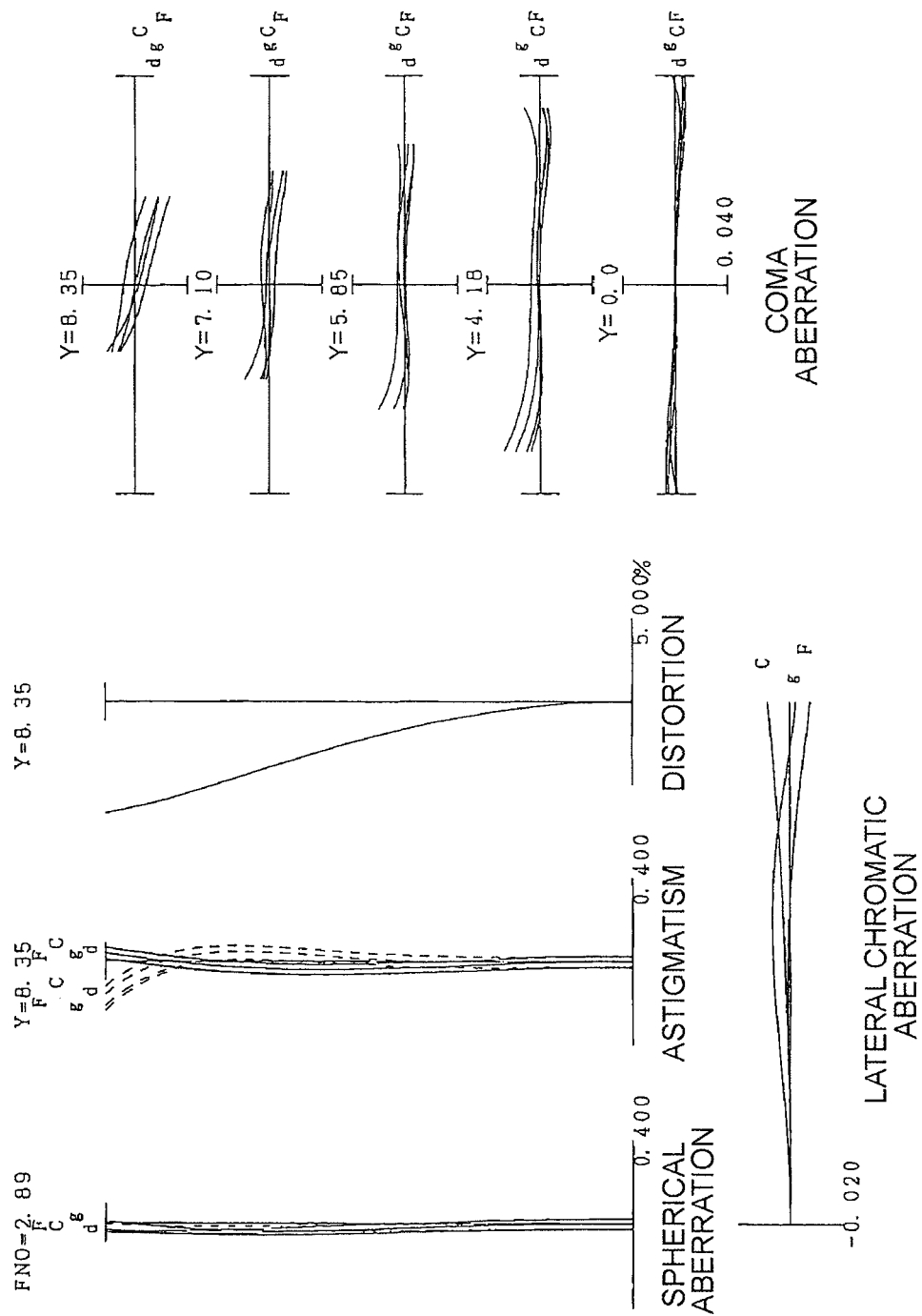

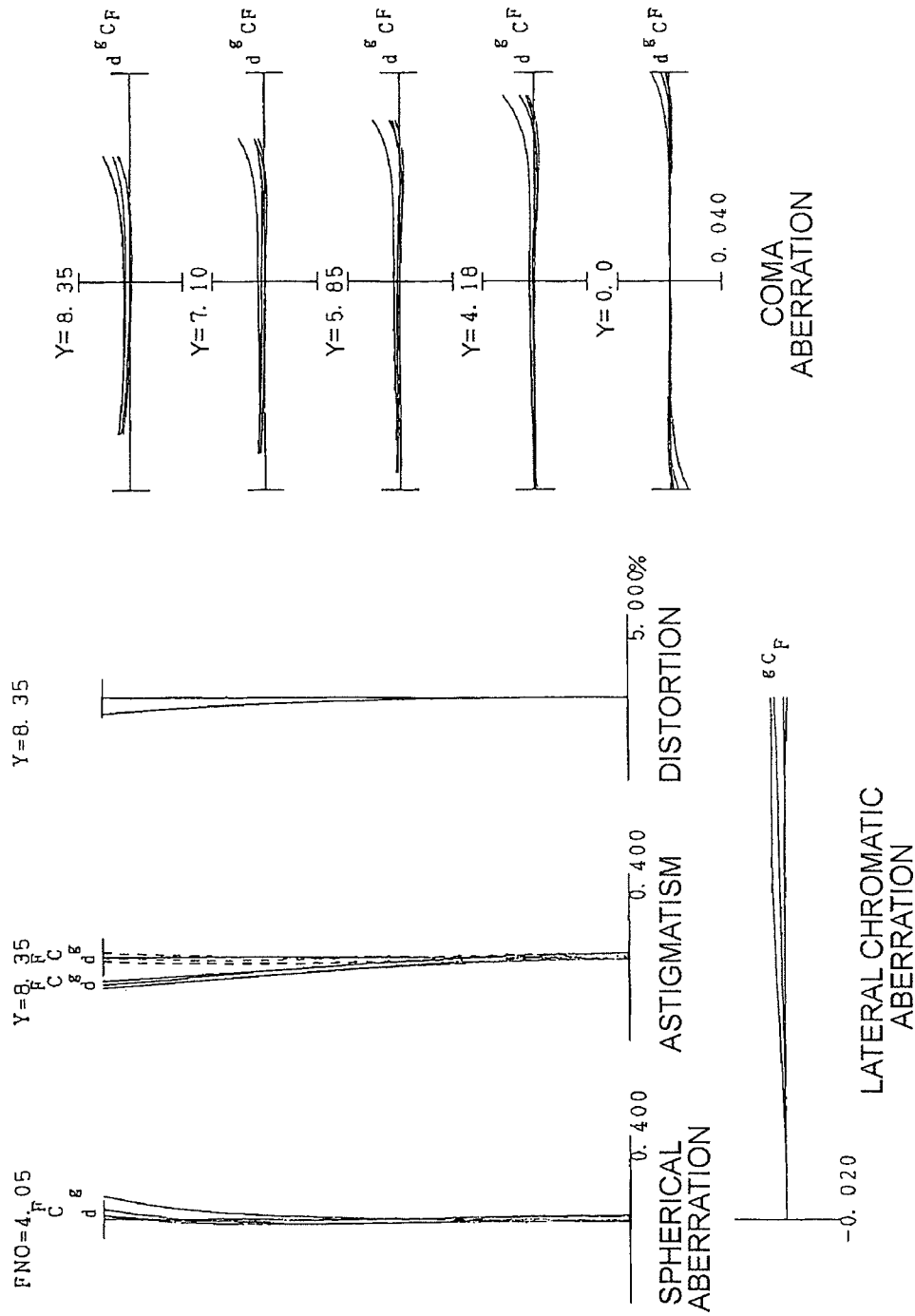

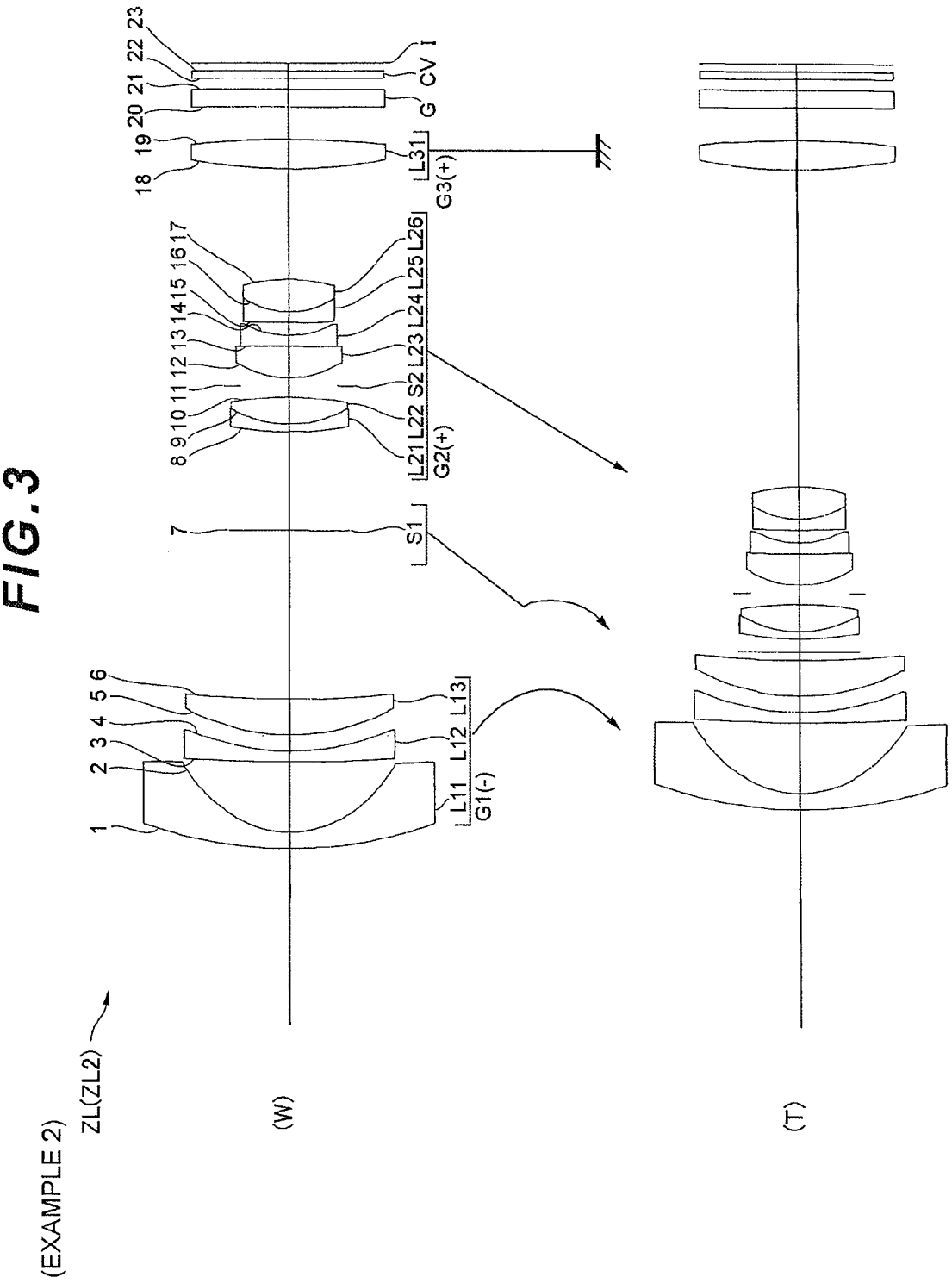

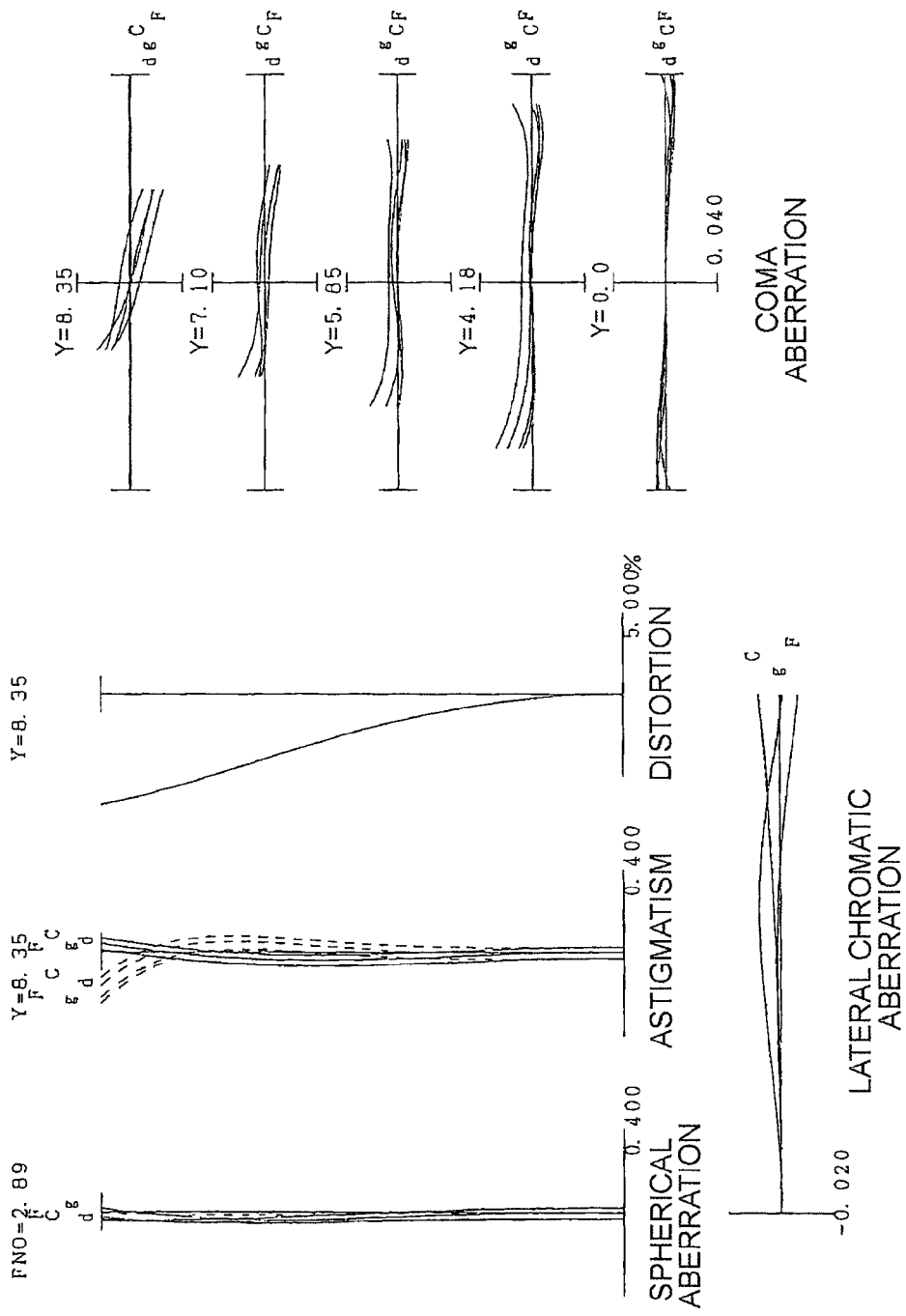

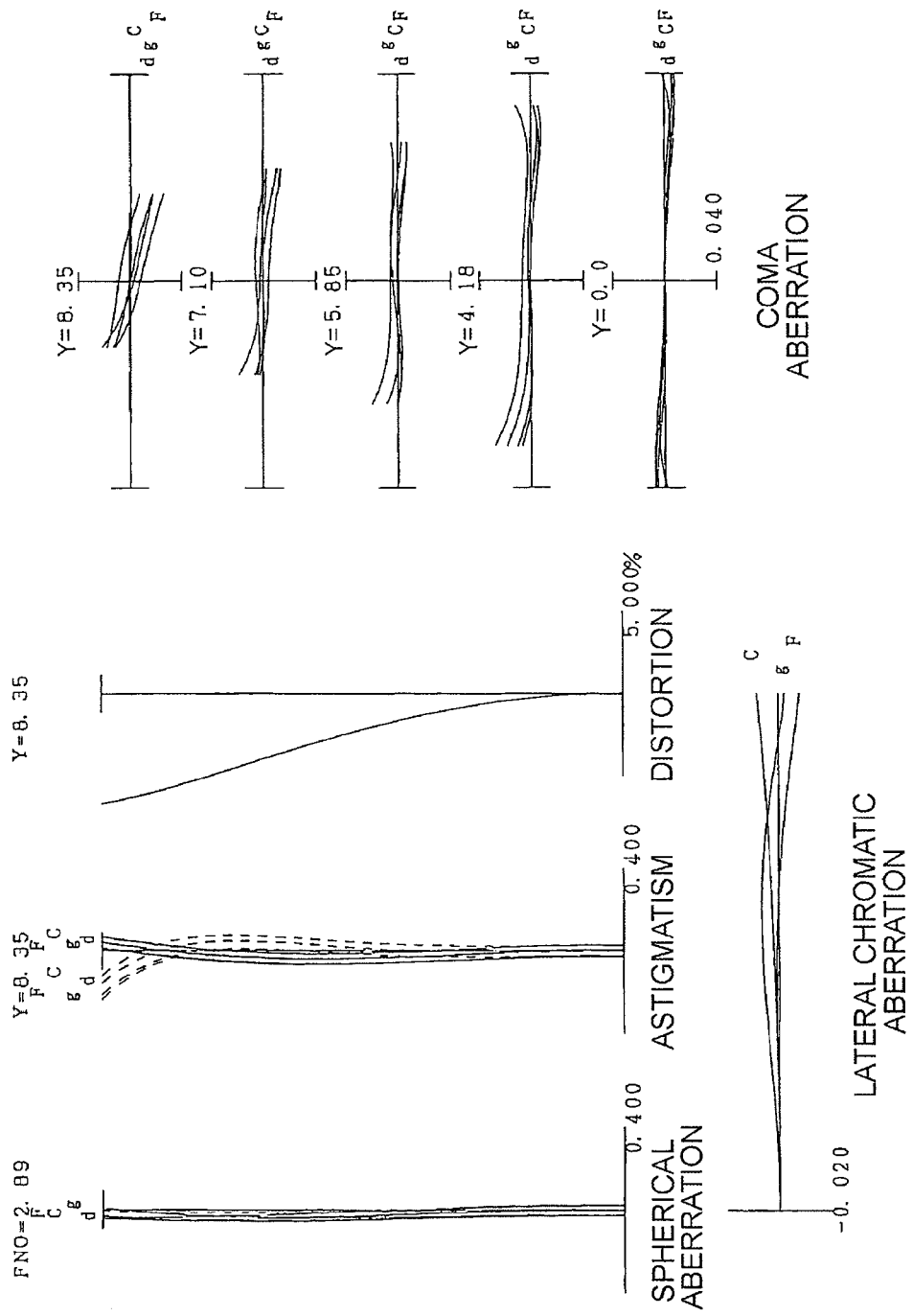

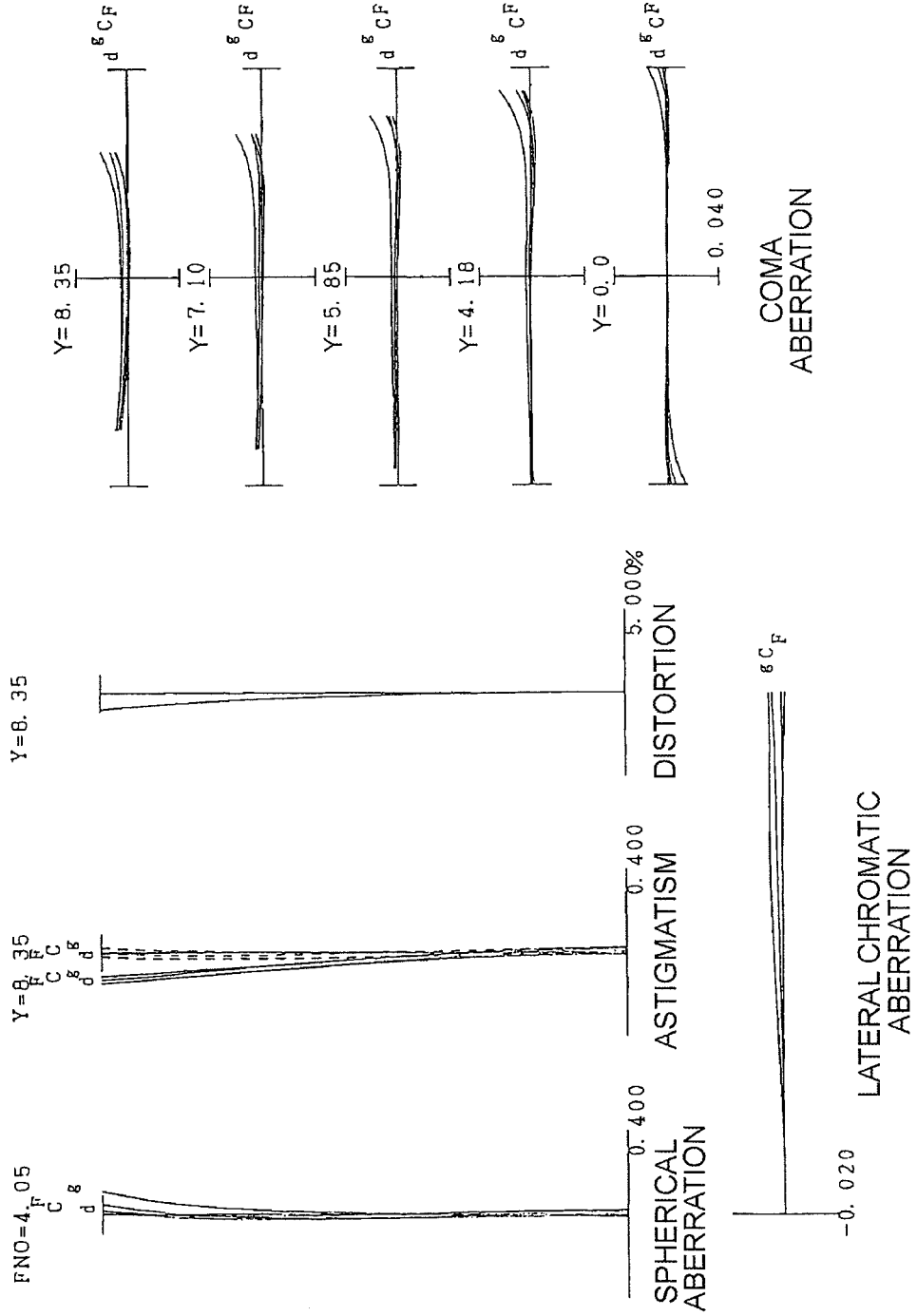

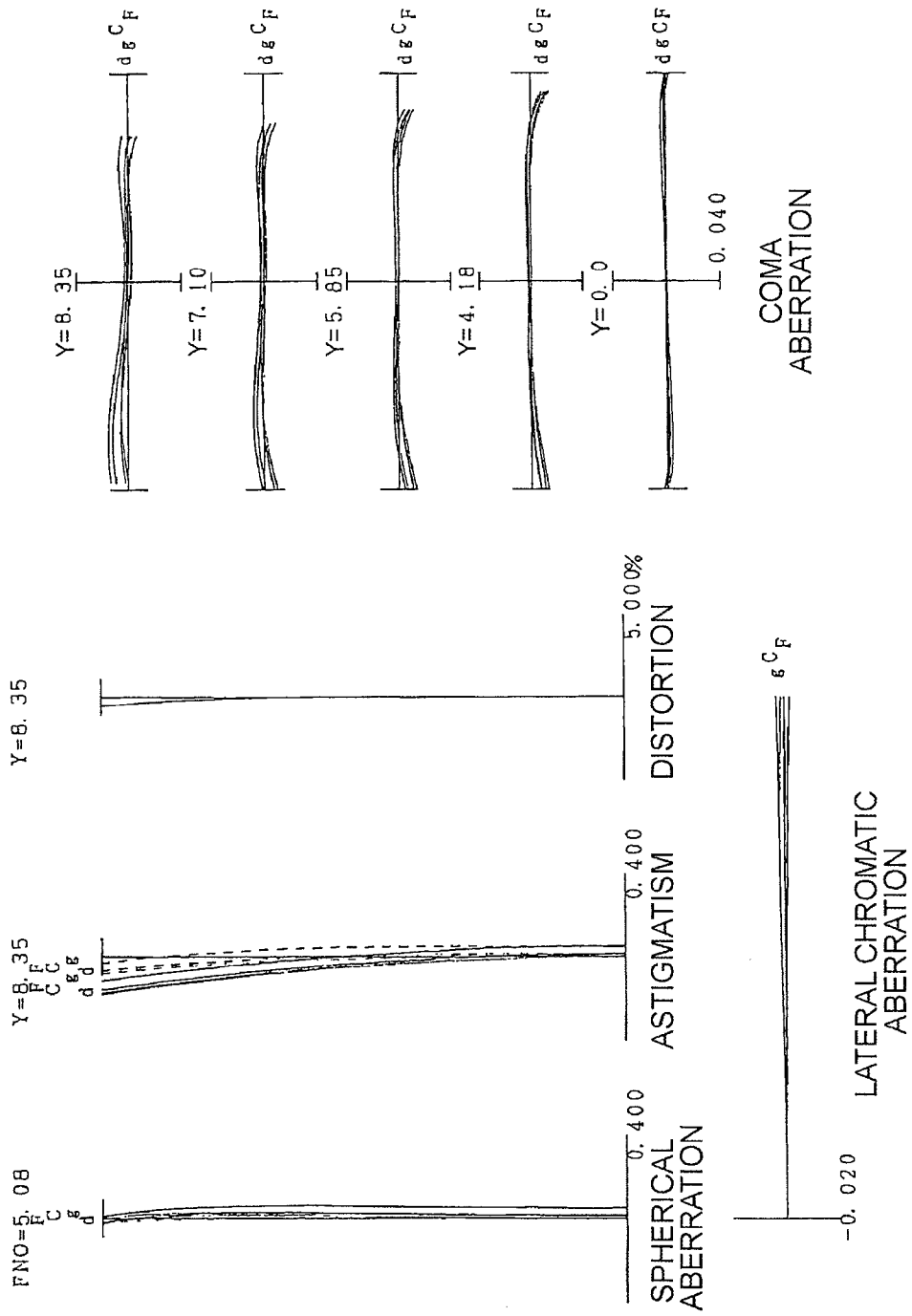

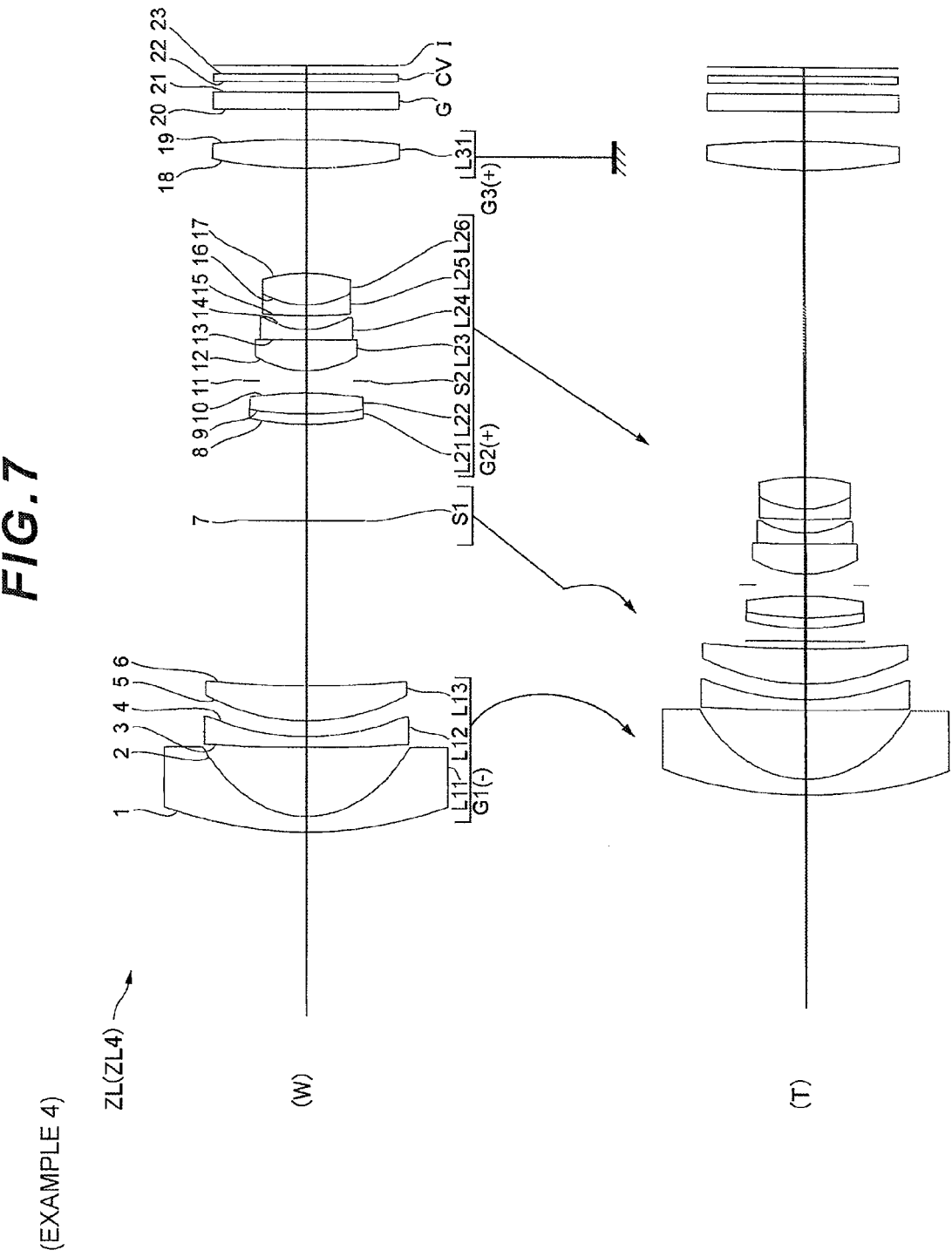

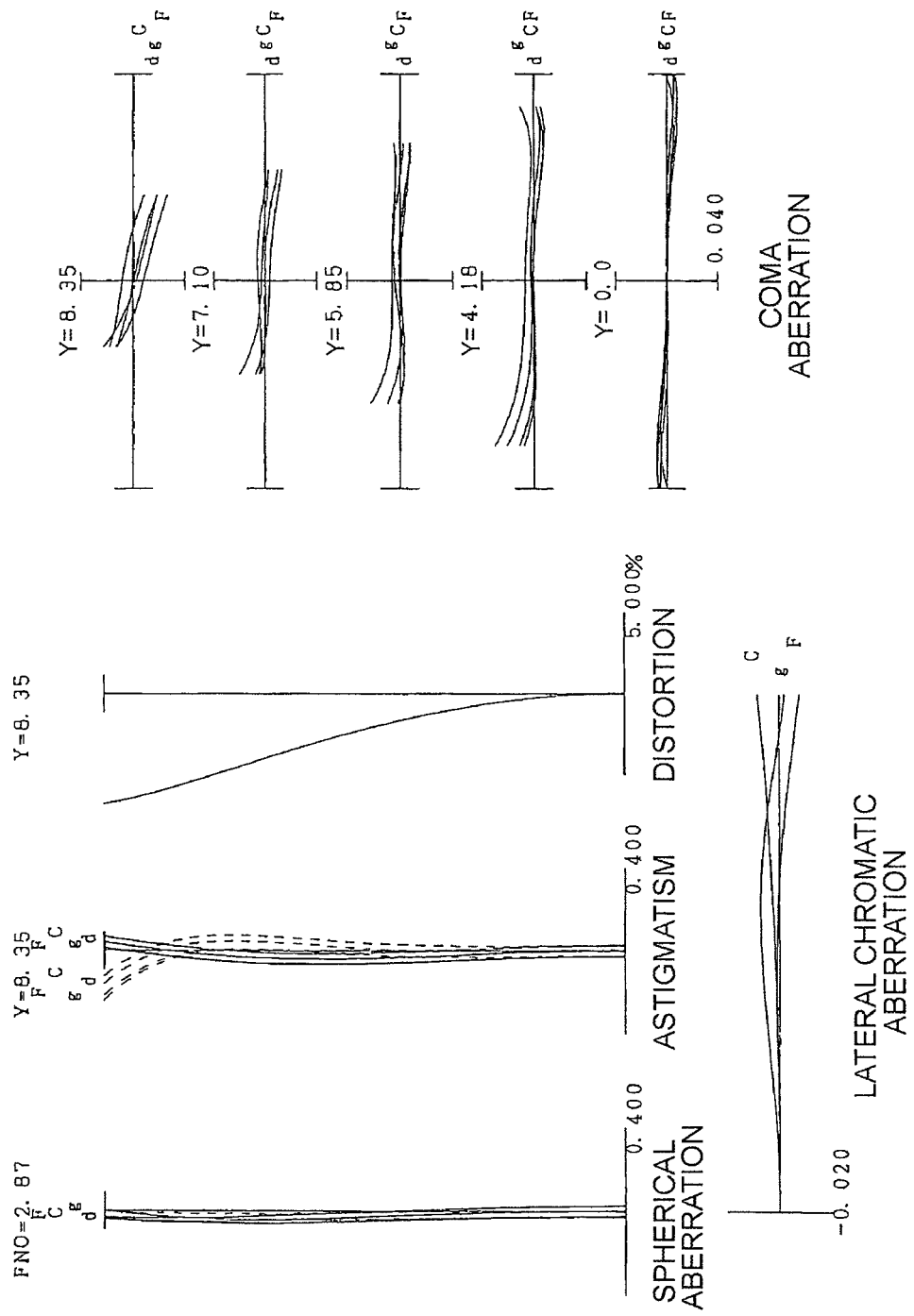

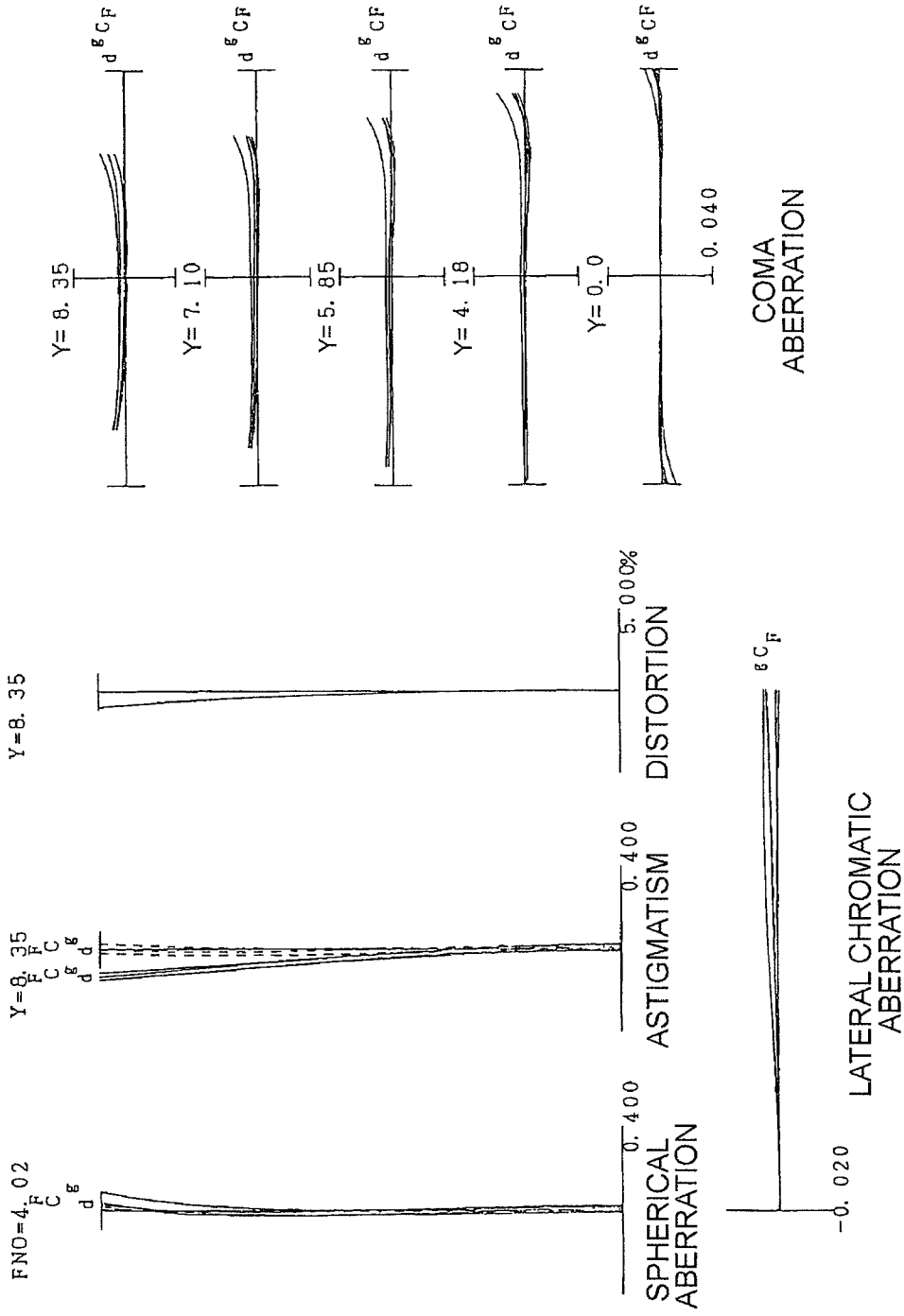

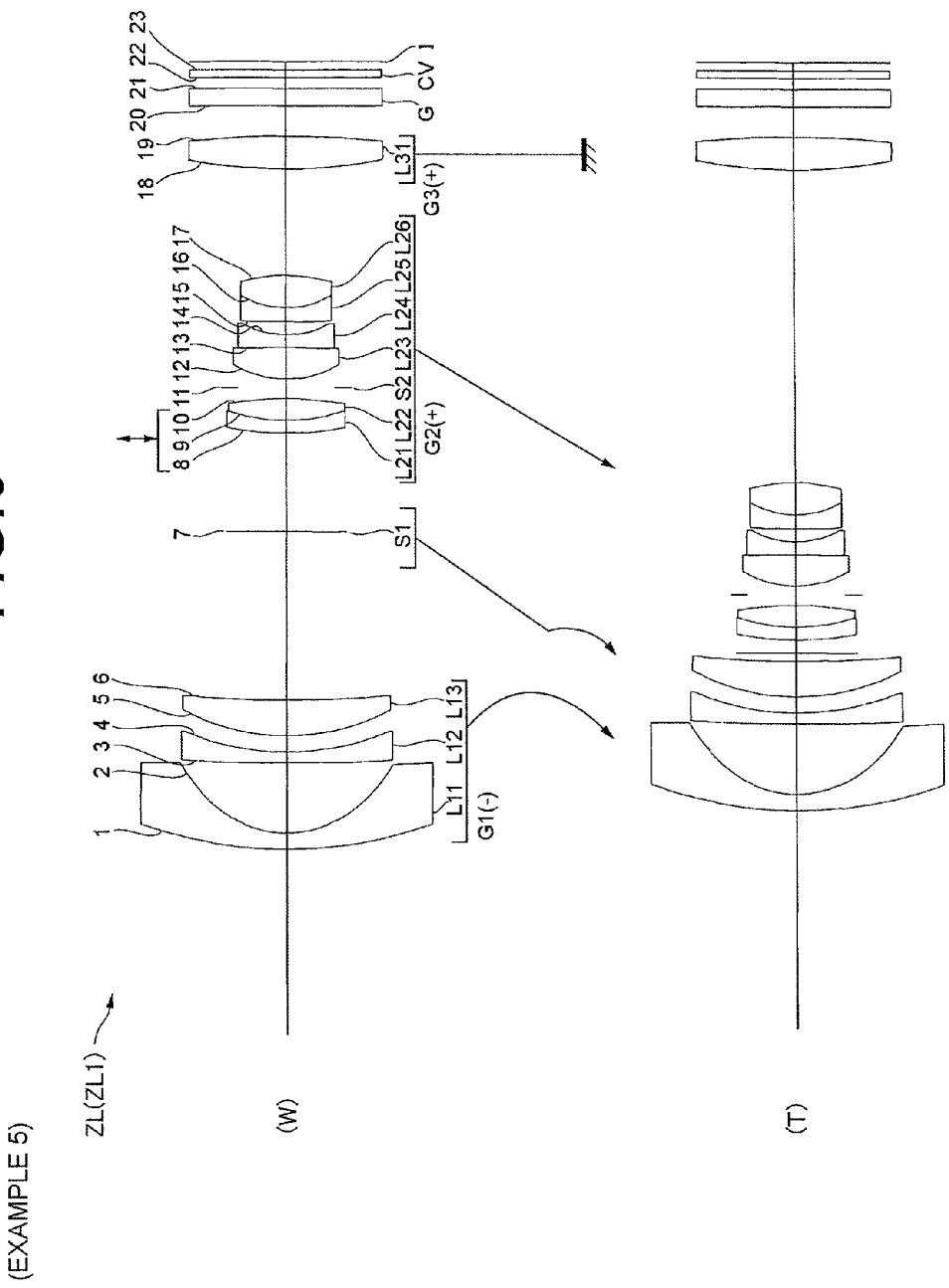

COMA ABERRATION

COMA ABERRATION

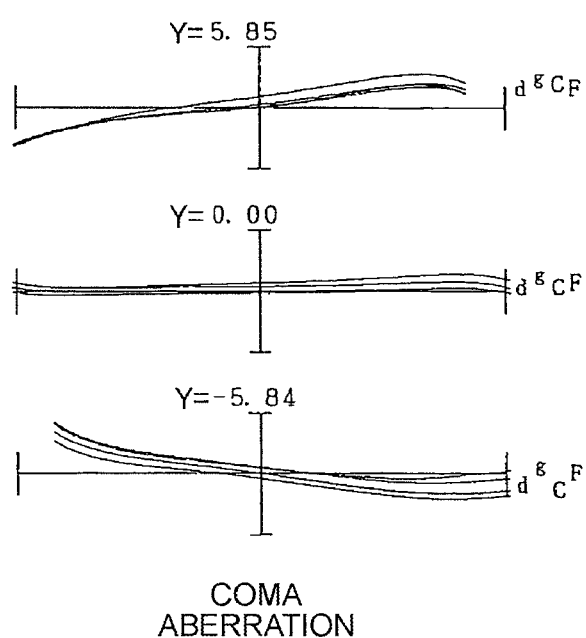

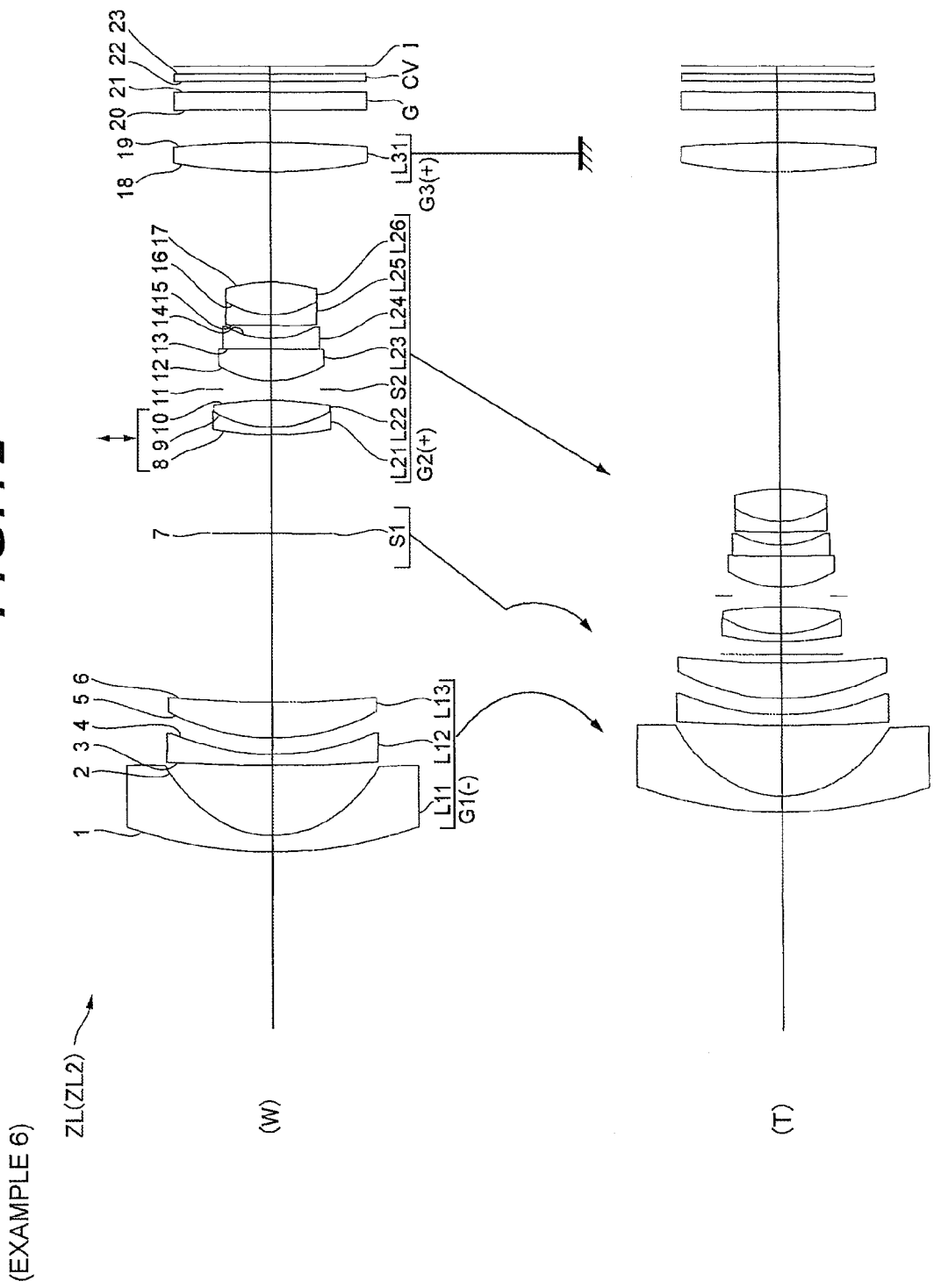

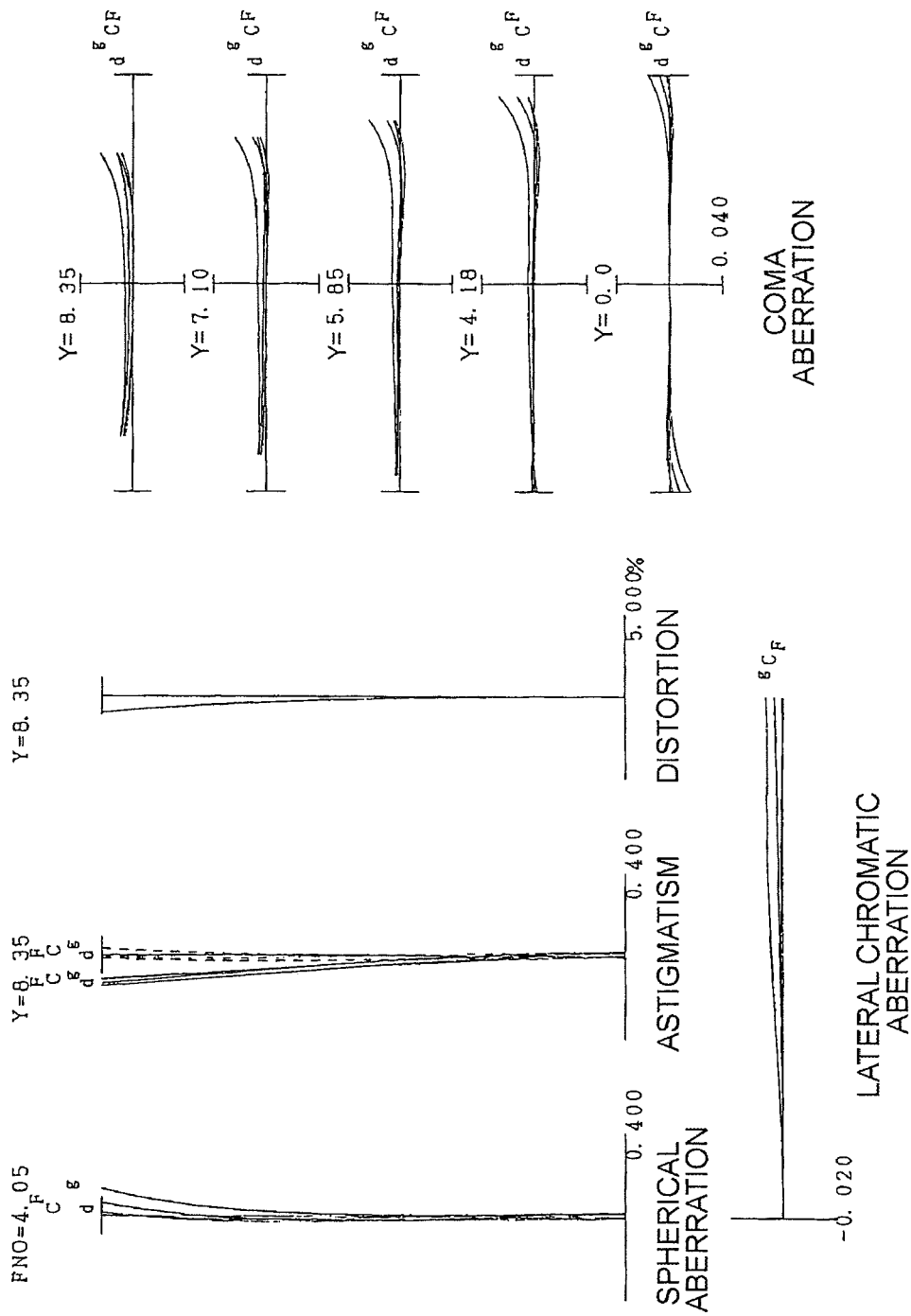

COMA ABERRATION

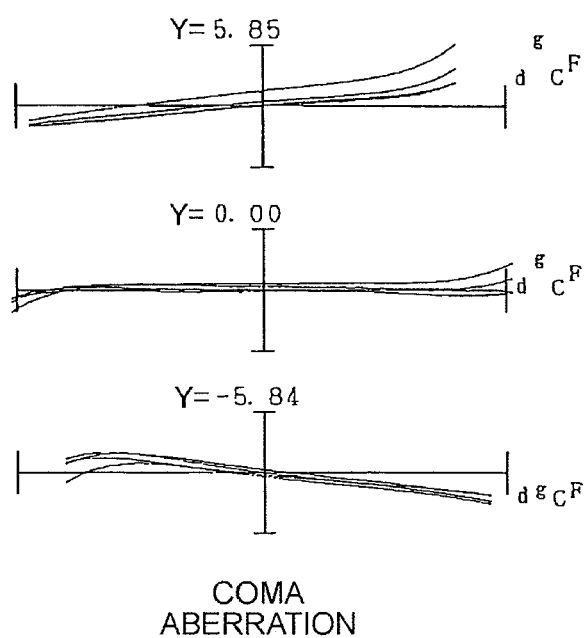

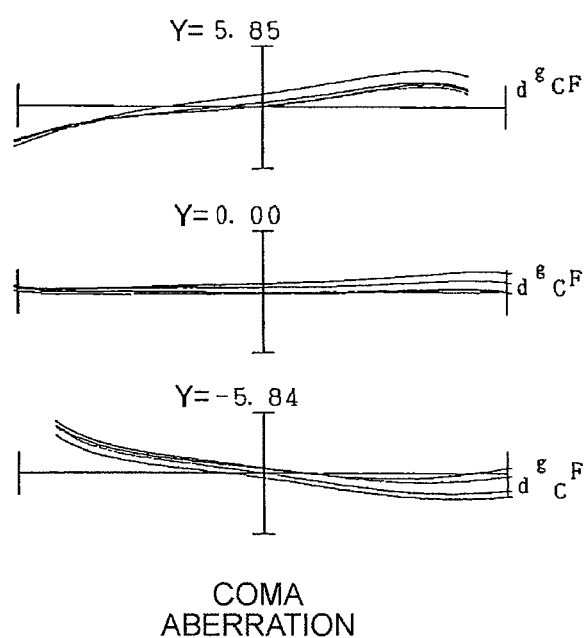

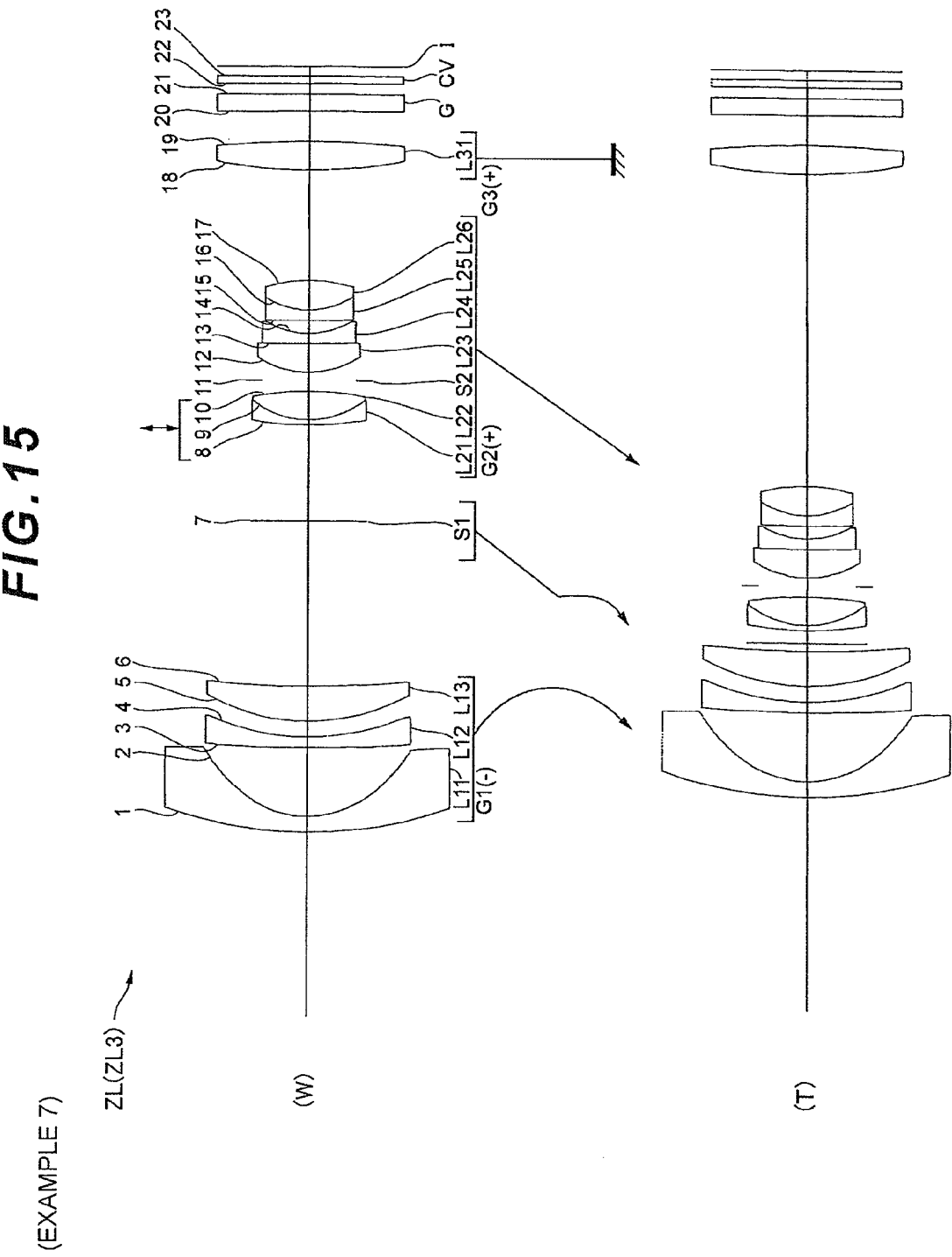

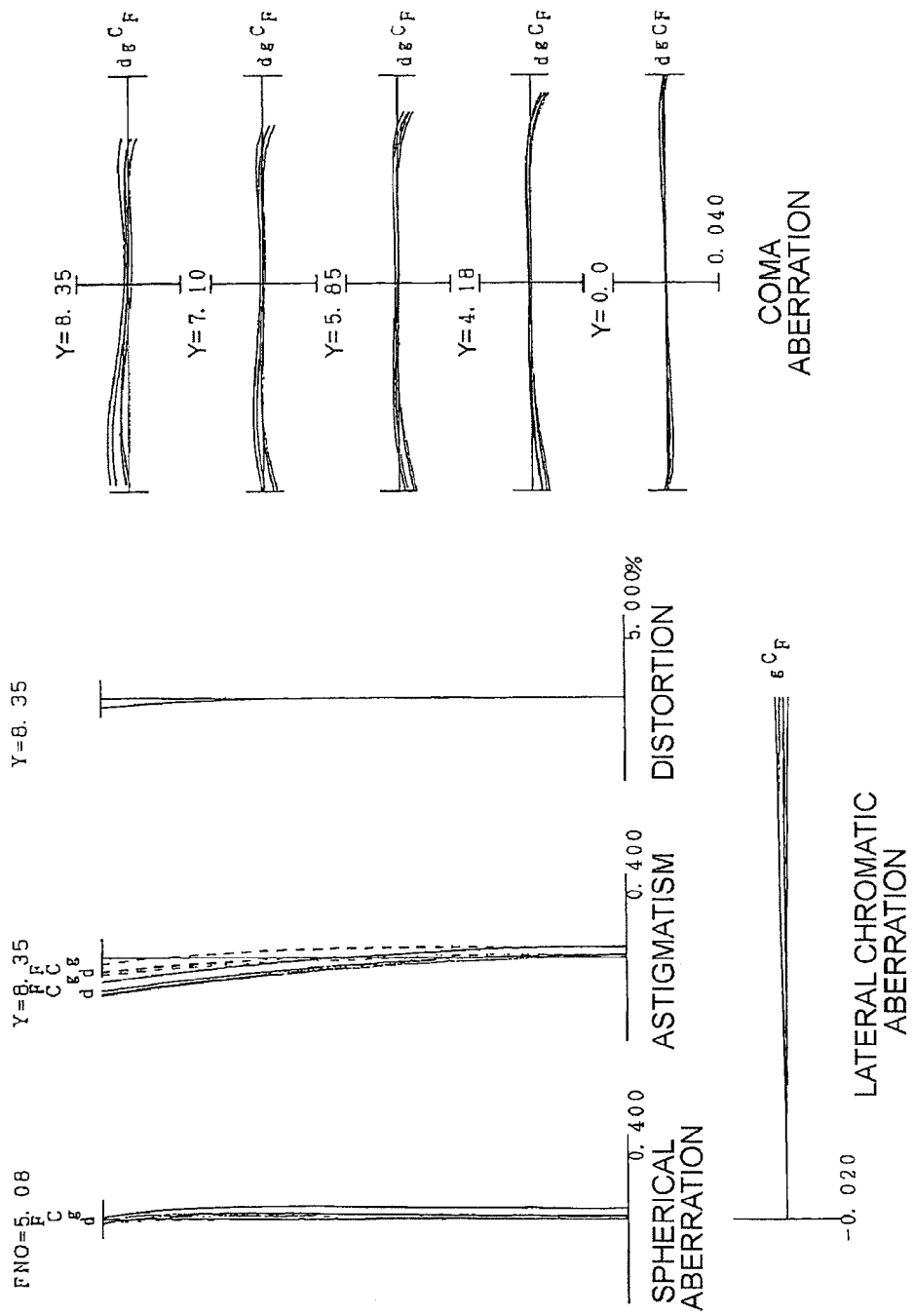

COMA ABERRATION

COMA ABERRATION

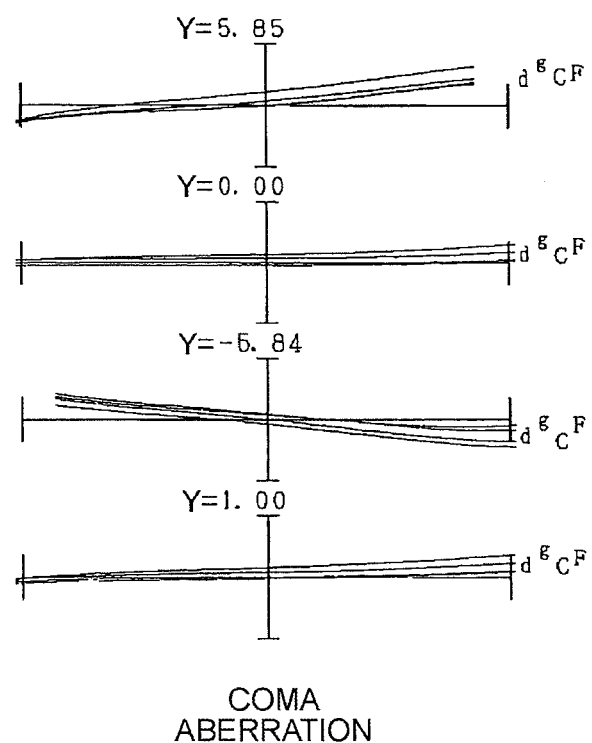

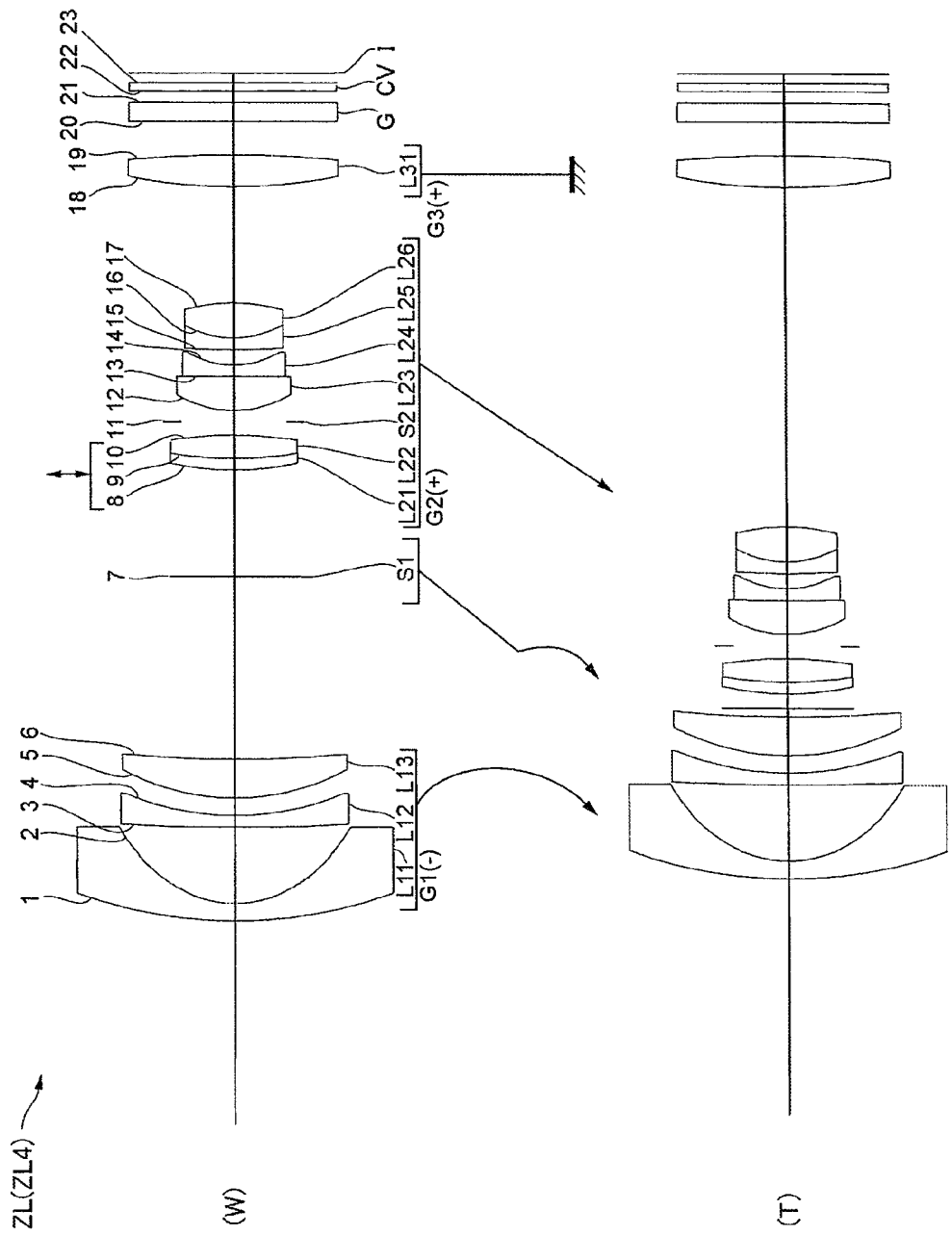

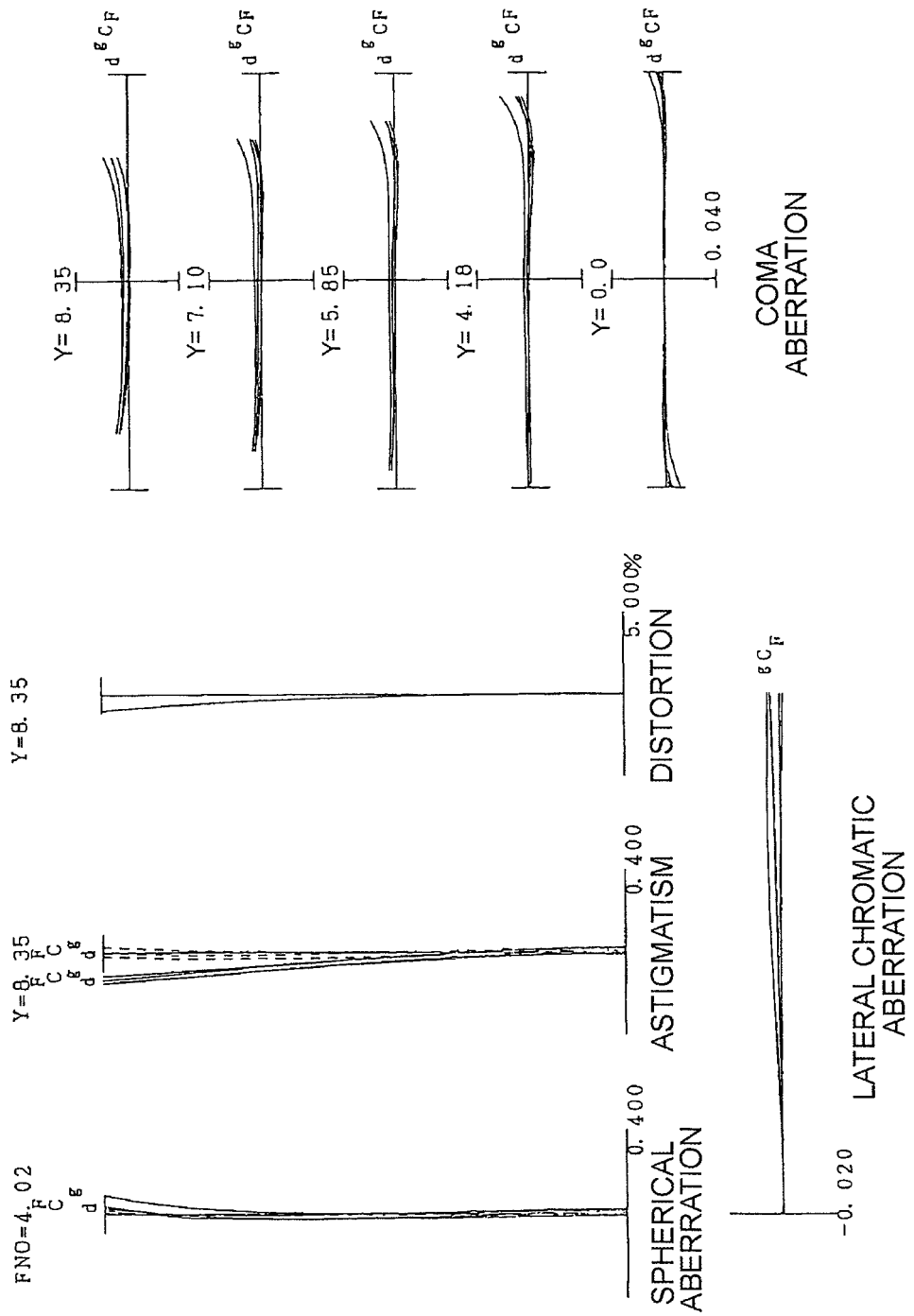

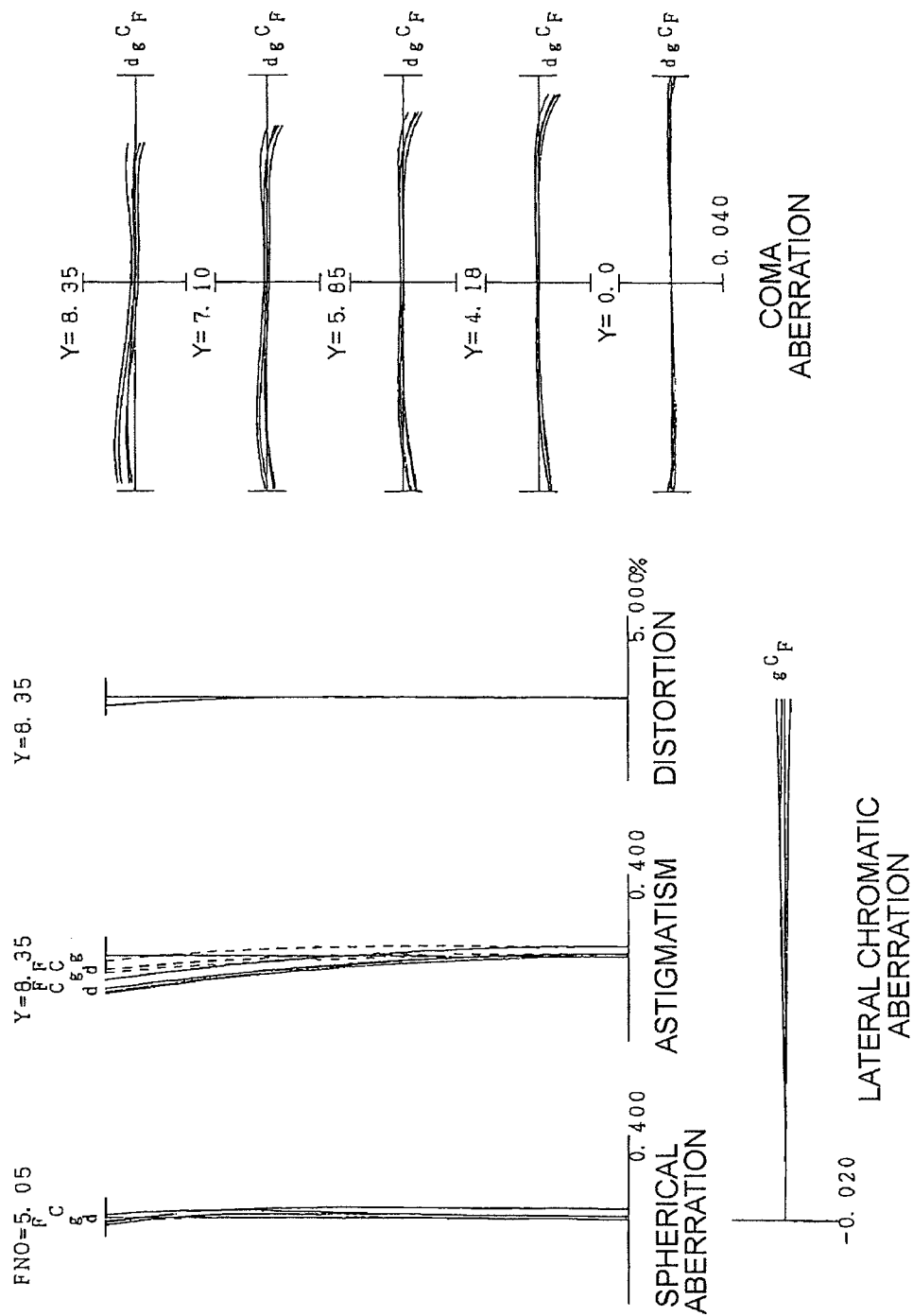

COMA ABERRATION

COMA ABERRATION

ZOOM LENS, OPTICAL APPARATUS AND METHOD OF MANUFACTURING ZOOM LENS

RELATED APPLICATIONS

This invention claims the benefit of Japanese Patent Application Nos. 2010-195087 and 2010-195088 which are hereby incorporated by reference.

TECHNICAL FIELD

The present invention relates to a zoom lens, an optical apparatus, and a method of manufacturing the zoom lens.

TECHNICAL BACKGROUND

For optical apparatuses, including video cameras and electronic still cameras, higher image quality and smaller sizes are always demanded. Therefore both high image quality and smaller sizes are also demanded for zoom lenses used for image capturing lenses. As one of the zoom lenses that meets such demands, a zoom lens comprised of three lens groups, that is, in order from an object, a negative lens group, a positive lens group, and a positive lens group, has been disclosed (e.g. see Japanese Laid-open Patent Publication No. 2009-282466(A)).

Recently ultra-high image quality is expected for cameras, and in order to implement this, higher optical performance than prior art is demanded for zoom lenses.

SUMMARY OF THE INVENTION

With the foregoing in view, it is an object of the present invention to provide a compact and ultra-high image quality zoom lens and optical apparatus, and a method of manufacturing the zoom lens.

To achieve this object, a first aspect of the present invention is a zoom lens comprising, in order from an object, a first lens group having negative refractive power, a second lens group having positive refractive power, and a third lens group having positive refractive power, and the second lens group further comprises three or more cemented lenses.

In this zoom lens, it is preferable that the following conditional expression is satisfied:

$$3.00 < Dt23/Dt3i < 30.00$$

where Dt23 denotes a distance between the second lens group and the third lens group in a telephoto end state, and Dt3i denotes a distance from the third lens group to the image plane in the telephoto end state, converted to air.

In this zoom lens according to Claim 1, it is preferable that the following conditional expression is satisfied:

$$0.10 < f2/f3 < 0.50$$

where f2 denotes a focal length of the second lens group and f3 denotes a focal length of the third lens group.

In this zoom lens, it is preferable that the third lens group is constituted only by a single lens.

In this zoom lens, it is preferable that upon zooming from the wide-angle end state to the telephoto end state, the first lens group and the second lens group move so that the distance between the first lens group and the second lens group decreases, and the distance between the second lens group and the third lens group increases, and the third lens group is fixed during zooming.

In this zoom lens, it is preferable that the first lens group is constituted at least by three lenses, that is, in order from the object, a first negative lens, a second negative lens and a positive lens.

In this zoom lens, it is preferable that at least one of the first negative lens and the second negative lens constituting the first lens group has an aspherical surface.

In this zoom lens, it is preferable that the second lens group has a positive lens, and at least one of the positive lenses has an aspherical surface.

In this zoom lens, it is preferable that an aperture stop for determining brightness is disposed in the second lens group.

In this zoom lens, it is preferable that a diaphragm for cutting unnecessary external light is disposed between the first lens group and the second lens group, and moves upon zooming from the wide-angle end state to the telephoto end state.

In this zoom lens, it is preferable that image blur is corrected by shifting the cemented lens disposed closest to the object in the second lens group in a direction approximately perpendicular to the optical axis.

In this zoom lens, it is preferable that the following conditional expression is satisfied:

$$0.001 < f2F/f2M < 0.500$$

where f2F denotes a focal length of the cemented lens disposed closest to the object, and f2M denotes a focal length of the cemented lens disposed second closest to the object, in the second lens group.

In the zoom lens above, it is preferable that the following conditional expression is satisfied:

$$0.01 < f2F/f2MR < 0.2$$

where f2F denotes a focal length of the cemented lens disposed closest to the object, and f2MR denotes a combined focal length of the cemented lenses disposed second and third closest to the object, in the second lens group.

An optical apparatus according to the present invention includes the zoom lens.

A method of manufacturing a zoom lens according to the present invention is constituted to manufacture the above mentioned zoom lens.

In this method of manufacturing this zoom lens, it is preferable that the following conditional expression is satisfied:

$$3.00 < Dt23/Dt3i < 30.00$$

where Dt23 denotes a distance between the second lens group and the third lens group in a telephoto end state, and Dt3i denotes a distance from the third lens group to the image plane in the telephoto end state, converted to air.

In this method of manufacturing the zoom lens, it is preferable that the following conditional expression is satisfied:

$$0.10 < f2/f3 < 0.50$$

where f2 denotes a focal length of the second lens group and f3 denotes a focal length of the third lens group.

In this method of manufacturing the zoom lens above, wherein the third lens group is constituted only by a single lens.

In this method of manufacturing the zoom lens, it is preferable that upon zooming from the wide-angle end state to the telephoto end state, the first lens group and the second lens group move so that the distance between the first lens group and the second lens group decreases, and the distance between the second lens group and the third lens group increases, and the third lens group is fixed during zooming.

In this method of manufacturing the zoom lens, it is preferable that the first lens group is constituted by at least three lenses, that is, in order from the object, a first negative lens, a second negative lens and a positive lens.

In this method of manufacturing the zoom lens, it is preferable that image blur is corrected by shifting the cemented lens disposed closest to the object in the second lens group in a direction approximately perpendicular to the optical axis.

In this method of manufacturing the zoom lens, it is preferable that the following conditional expression is satisfied:

$$0.001 < f2F/f2M < 0.500$$

where f2F denotes a focal length of the cemented lens disposed closest to the object, and f2M denotes a focal length of the cemented lens disposed second closest to the object, in the second lens group.

In this method of manufacturing the zoom lens, it is preferable that the following conditional expression is satisfied:

$$0.01 < f2F/f2MR < 0.2$$

where f2F denotes a focal length of the cemented lens disposed closest to the object, and f2MR denotes a combined focal length of the cemented lenses disposed second and third closest to the object, in the second lens group.

According to the present invention, a compact and ultra-high image quality zoom lens and optical apparatus, and a method of manufacturing the zoom lens, can be provided.

Further scope of applicability of the present invention will become apparent from the detailed description given hereinafter. However, it should be understood that the detailed description and specific examples, while indicating preferred embodiments of the invention, are given by way of illustration only, since various Changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

FIG. 1 is a diagram depicting a configuration and a zoom locus from a wide-angle end state (W) to a telephoto end state (T) of a zoom lens according to Example 1;

FIG. 3 is a diagram depicting a configuration and a zoom locus from a wide-angle end state (W) to a telephoto end state (T) of a zoom lens according to Example 2;

FIG. 6 are graphs showing various aberrations of the zoom lens according to Example 3, where FIG. 6A are graphs showing various aberrations of the zoom lens upon focusing on infinity in the wide-angle end state, FIG. 6B are graphs showing various aberrations of the zoom lens upon focusing on infinity in the intermediate focal length state, and FIG. 6C are graphs showing various aberrations of the zoom lens upon focusing on infinity in the telephoto end state;

FIG. 7 is a diagram depicting a configuration and a zoom locus from a wide-angle end state (W) to a telephoto end state (T) of a zoom lens according to Example 4;

FIG. 9 is a diagram depicting a configuration and a zoom locus from a wide-angle end state (W) to a telephoto end state (T) of a zoom lens according to Example 5;

FIG. 12 is a diagram depicting a configuration and a zoom locus from a wide-angle end state (W) to a telephoto end state (T) of a zoom lens according to Example 6;

FIG. 15 is a diagram depicting a configuration and a zoom locus from a wide-angle end state (W) to a telephoto end state (T) of a zoom lens according to Example 7;

FIG. 18 is a diagram depicting a configuration and a zoom locus from a wide-angle end state (W) to a telephoto end state (T) of a zoom lens according to Example 8;

FIG. 21 is an external view of a digital camera according to the present embodiment, where

DESCRIPTION OF THE EMBODIMENTS

First Embodiment

Figure 2C:
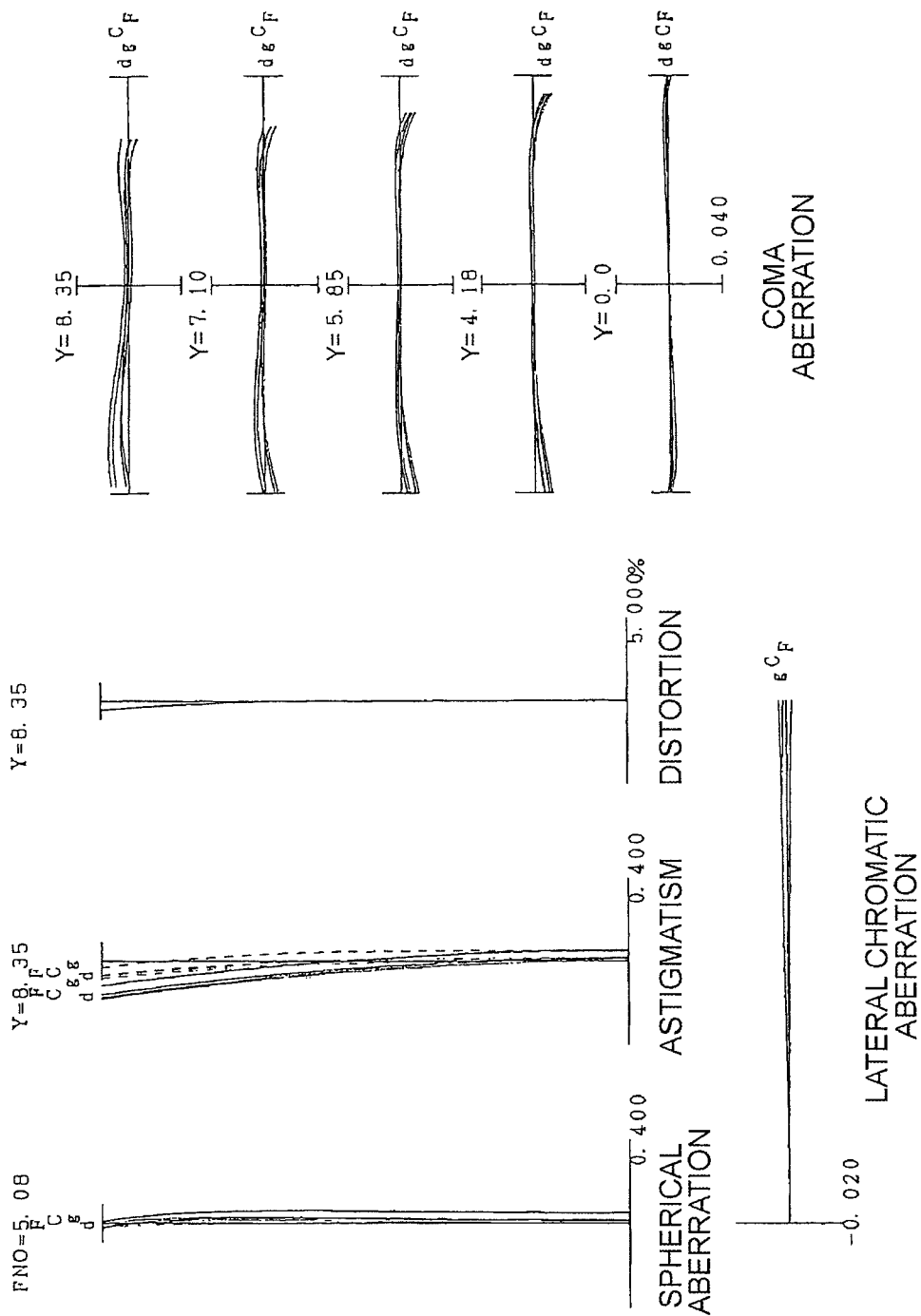
FIG. 2 are graphs showing various aberrations of the zoom lens according to Example 1, where FIG. 2A are graphs showing various aberrations of the zoom lens upon focusing on infinity in the wide-angle end state, FIG. 2B are graphs showing various aberrations of the zoom lens upon focusing on infinity in the intermediate focal length state, and FIG. 2C are graphs showing various aberrations of the zoom lens upon focusing on infinity in the telephoto end state.

Embodiments of the present invention will now be described with reference to the drawings. As FIG. 1 shows, a zoom lens according to a first embodiment is a zoom lens comprising, in order from an object, a first lens group G1 having negative refractive power, a second lens group G2 having positive refractive power, and a third lens group G3 having positive refractive power, wherein the second lens group G2 is constituted only by three or more cemented lenses.

By this configuration, the apparatus can be downsized, preventing the lens diameter from becoming too larger in the wide-angle end state, and fluctuation of astigmatism due to zooming can be corrected well. Since three or more cemented lenses are disposed in the second lens group G2, fluctuation of lateral chromatic aberration during zooming can be corrected well. Furthermore even if ultra-high image quality is demanded for the electronic still cameras, and sensors become larger and resolutions thereof increase in future, a zoom lens having high optical performance that can support this possibility can be obtained.

In the zoom lens according to the present embodiment, it is preferable that the following conditional expression (1) is satisfied, where $Dt23$ denotes a distance between the second lens group G2 and the third lens group G3 in the telephoto end state, and $Dt3i$ denotes a distance between the third lens group G3 and the image plane (converted to air) in the telephoto end state. "$Dt23$ denotes a distance between the second lens group G2 and the third lens group G3 in the telephoto end state" means a distance from the lens surface closest to the image constituting the second lens group G2 to the lens surface closest to the object constituting the third lens group G3 in the telephoto end state. "$Dt3i$ denotes a distance between the third lens group G3 and the image plane (converted to air) in the telephoto end state" means a distance from the lens surface closest to the image constituting the third lens group G3 to the image plane in the telephoto end state.

$$3.00 < Dt23/Dt3i < 30.00 \tag{1}$$

The conditional expression (1) specifies an appropriate ratio of the air distance of the third lens group G3 to the object side, and the air distance thereof to the image side. If the upper limit value of the conditional expression (1) is exceeded, it becomes difficult to correct astigmatism well, which is not desirable. If the lower limit value of the conditional expression (1) is not reached, it becomes difficult to correct coma aberration well, which is not desirable.

To ensure the effect of the present embodiment, it is preferable that the upper limit value of the conditional expression (1) is 20.0. To further ensure the effect of the present embodiment, it is preferable that the upper limit value of the conditional expression (1) is 10.0.

To ensure the effect of the present embodiment, it is preferable that the lower limit value of the conditional expression (1) is 3.50. To further ensure the effect of the present embodiment, it is preferable that the lower limit value of the conditional expression (1) is 4.00. To even further ensure the effect of the present embodiment, it is preferable that the lower limit value of the conditional expression (1) is 4.50.

In the zoom lens according to the present embodiment, it is preferable that the following conditional expression (2) is satisfied, where $f2$ denotes a focal length of the second lens group G2, and $f3$ denotes a focal length of the third lens group G3.

$$0.10 < f2/f3 < 0.50 \tag{2}$$

The conditional expression (2) specifies an appropriate ratio of the focal length of the second lens group G2 and the focal length of the third lens group G3. If the upper limit value of the conditional expression (2) is exceeded, the total length of the optical system becomes long, which is not desirable. It also becomes difficult to correct coma aberration well, which is not desirable. If the lower limit value of the conditional expression (2) is not reached, it becomes difficult to correct spherical aberration well, which is not desirable.

To ensure the effect of the present embodiment, it is preferable that the upper limit value of the conditional expression (2) is 0.45. To further ensure the effect of the present embodiment, it is preferable that the upper limit value of the conditional expression (2) is 0.40.

To ensure the effect of the present embodiment, it is preferable that the lower limit value of the conditional expression (2) is 0.15. To further ensure the effect of the present embodiment, it is preferable that the lower limit value of the conditional expression (2) is 0.20.

In the zoom lens according to the present embodiment, it is preferable that the third lens group G3 is constituted only by a single lens. By constituting the third lens group G3 only by a single lens like this, assembly adjustment becomes extremely easy, which is effective for decreasing cost. Furthermore, the space required for housing the lenses decreases, so the size of the apparatus when carrying can be decreased. Using the single lens also enables correcting longitudinal chromatic aberration well.

In the zoom lens according to the present embodiment, it is preferable that the first lens group G1 and the second lens group G2 move upon zooming from the wide-angle end stat to the telephoto end state so that the distance between the first lens group G1 and the second lens group G2 decreases, and the distance between the second lens group G2 and the third lens group G3 increases, and the third lens group G3 is fixed. By this configuration, each lens group position during zooming can be controlled by one cam drum, and the position of the image plane during zooming can be accurately controlled as a result. Fixing the third lens group G3 during zooming can decrease deterioration of astigmatism due to positional shift of the third lens group G3.

In the zoom lens according to the present embodiment, it is preferable that the first lens group G1 is constituted by three lenses, which are, in order from the object, a first negative lens, a second negative lens and a positive lens. By this configuration, lateral chromatic aberration generated in the wide-angle end state can be corrected well.

In the zoom lens according to the present embodiment, it is preferable that at least one of the first negative lens and the second negative lens constituting the first lens group G1 has an aspherical surface. By this configuration, distortion generated in the wide-angle end state can be corrected well.

In the zoom lens according to the present embodiment, it is preferable that the second lens group G2 has positive lenses, and at least one of the positive lenses constituting the second lens group G2 has an aspherical surface. By this configuration, coma aberration can be corrected well.

In the zoom lens according to the present embodiment, it is preferable that an aperture stop for determining brightness is disposed in the second lens group G2. By this configuration, fluctuation of spherical aberration during zooming can be corrected well.

In the zoom lens according to the present embodiment, it is preferable that a diaphragm for cutting unnecessary external light is disposed between the first lens group G1 and the second lens group G2, and moves upon zooming from the wide-angle end state to the telephoto end state. Since unnecessary external light in the wide-angle end state can be effectively cut by this configuration, coma aberration in the wide-angle end state can be corrected well.

Figure 21A:
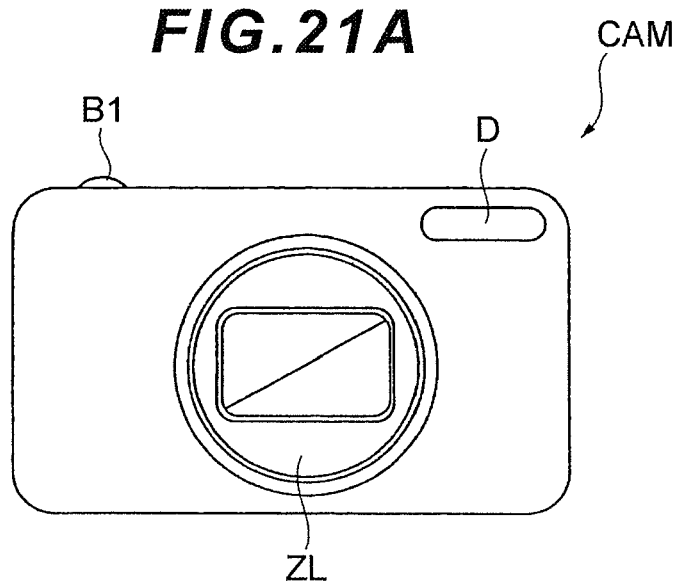
FIG. 21A is a front view of the digital still camera.
Figure 21B:
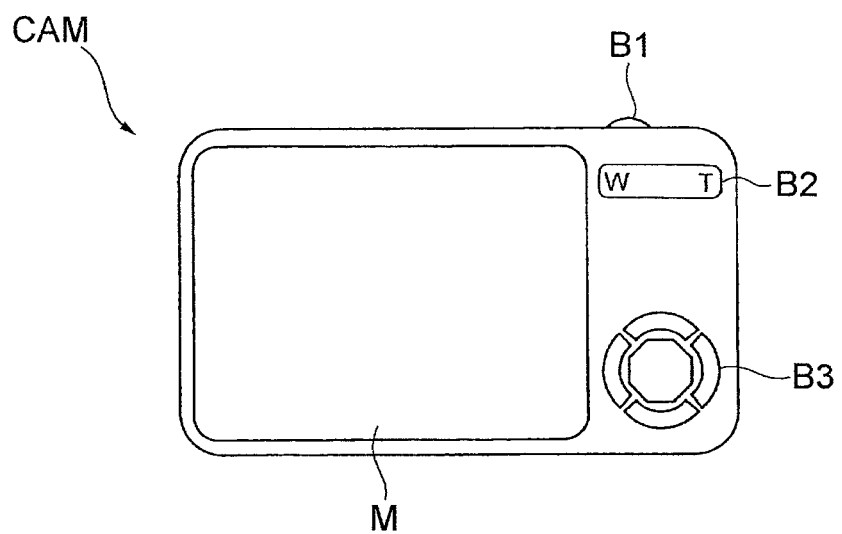
FIG. 21B is a rear view of the digital still camera.

FIG. 21 shows a digital still camera CAM (optical apparatus) having the zoom lens as an image capturing lens ZL. If a power button, which is not illustrated, is pressed on this digital still camera CAM, a shutter, which is not illustrated, of the image capturing lens ZL is released and lights from an object are collected by the image-capturing lens ZL and form an image on a picture element (e.g. CCD, CMOS), which is disposed on the image plane I (see FIG. 1). The object image formed on the picture element is displayed on a liquid crystal monitor M disposed behind the digital still camera CAM. The user determines the composition of the object image while viewing the liquid crystal monitor M, then presses a release button B1 to capture the object image by the picture element, and stores it in memory, which is not illustrated.

The camera CAM has an auxiliary light emitting unit D, which emits auxiliary light when the object is dark, a wide (W)—telephoto (T) button B2 for zooming the image capturing lens ZL from the wide-angle end state (W) to the telephoto end state (T), and a function button B3, which is used for setting various conditions for the digital still camera CAM.

Figure 22:
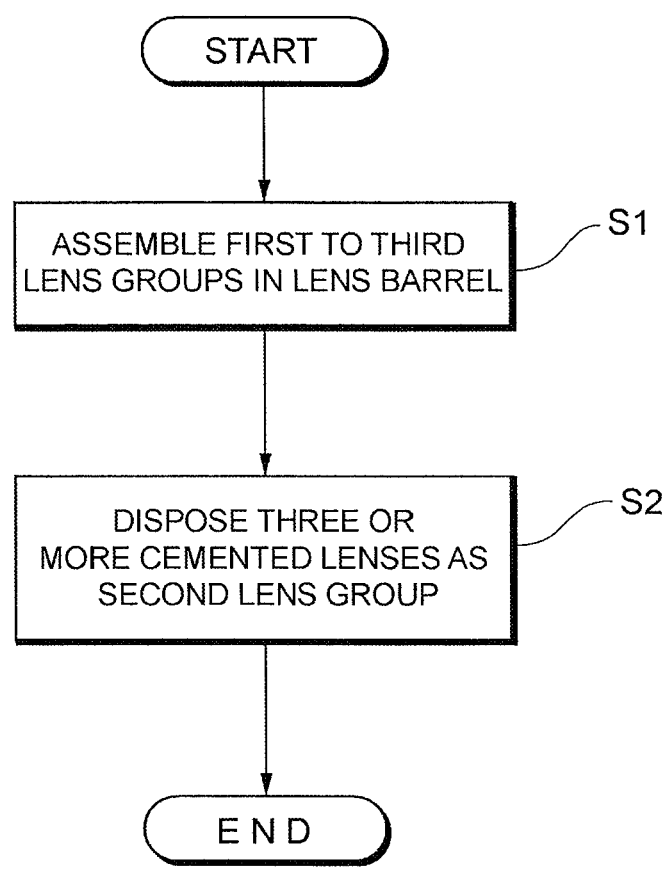
FIG. 22 is a flow chart depicting a first method of manufacturing the zoom lens according to the present embodiment.

Now a method of manufacturing the zoom lens having the above mentioned configuration will be described with reference to FIG. 22. First the first to third lens groups (e.g. first to third lens groups G1 to G3 in FIG. 1) are assembled in a lens barrel (step S1). In this assembling step, each lens is disposed so that the first lens group has negative refractive power, the second lens group has positive refractive power and the third lens group has positive refractive power. At this time, for the second lens group, only three or more cemented lens are disposed (step S2). When each lens is assembled in the lens barrel, each lens may be assembled in the lens barrel one at a time in order along the optical axis, or a part or all of the lenses may be integratedly held on a holding member, and then assembled in the lens barrel. After assembling each lens group in the lens barrel like this, it is checked whether the object image is formed in a state where each lens group is assembled in the lens barrel, that is, whether the center of each lens is aligned, and then various operations of the zoom lens are checked. Examples of the various operations are a zoom operation in which lens groups which perform zooming from the wide-angle end state to the telephoto end state (e.g. first lens group G1, diaphragms S1, S2, and second lens group G2 in this embodiment) move along the optical axis, a focusing operation in which a lens group which performs focusing from an object at a long distance to an object at a short distance (e.g. third lens group G3 in this embodiment) moves along the optical axis, and a hand motion blur correction operation in which at least a part of the lenses (e.g. at least a part of the second lens group G2 in this embodiment) move so as to have components orthogonal to the optical axis. The sequence of checking the various operations is arbitrary. According to this manufacturing method, a compact and ultra-high image quality zoom lens can be obtained.

Example 1 to Example 4

Example 1 to Example 4 according to the first embodiment will be described with reference to the drawings. Table 1 to Table 4 are tables listing each data according to Example 1 to Example 4.

In [Lens Data] in the table, the surface number is a sequence of the lens surface counted from the object side along the light traveling direction, r is a radius of curvature of each lens surface, d is a distance between surfaces, which is a distance from each optical plane to the next optical plane (or image plane), nd is a refractive index at d-line (wavelength: 587.6 nm), and νd is an Abbe number at d-line. "∞" in the radius of curvature indicates a plane or an aperture. The refractive index of air 1.000000 is omitted.

In [Aspherical Data], the form of an aspherical surface shown in [Lens Data] is given by Expression (a). X(y) is a distance from the tangential plane at a vertex of the aspherical surface to the position on the aspherical surface at the height y along the optical axis, r is a radius of curvature (paraxial radius of curvature) of a reference spherical surface, κ is a conical coefficient, and Ai is an aspherical coefficient in degree i. "E-n" indicates "$\times 10^{-n}$". For example, $1.234E-05 = 1.234 \times 10^{-5}$.

$$X(y) = y^2/[r \times \{1 + (1 - \kappa \times y^2/r^2)^{1/2}\}] + A4 \times y^4 + A6 \times y^6 + A8 \times y^8 + A10 \times y^{10} \quad (a)$$

In [General Data] in the table, f is a focal length, FNo is an F number, ω is a half angle of view, Y is an image height, TL is a total lens length, Bf is a distance from an image side surface of the optical member disposed closest to the image to a paraxial image plane, and Bf (converted to air) is a distance converted to air from the last lens surface to the paraxial image plane.

In [Zooming Data] in the table, Di (i is an integer) in each state of the wide-angle end state, intermediate focal length state and telephoto end state is a variable distance between the i-th surface and the (i+1)th surface.

In [Zoom Lens Group Data] in the table, G is a group number, "First surface of group" is a surface number of a surface closest to the object in each group, "Focal length of group" is a focal length of each group, and "Total lens length" is a distance from the lens surface closest to the object to the lens surface closest to the image in each group on the optical axis.

In [Conditional Expression] in the table, values corresponding to the conditional expressions (1) and (2) are shown.

In all the data values, "mm" is normally used for the unit of focal length f, radius of curvature r, surface distance d and other lengths unless otherwise specified, but the unit is not limited to "mm", since the equivalent optical performance is obtained even if an optical system is proportionally expanded or proportionally reduced. For the unit, another appropriate unit may be used without being limited to "mm".

The description on the tables thus far is common for all the examples, and is omitted herein below.

Example 1

Example 1 will now be described with reference to FIG. 1, FIG. 2 and Table 1. FIG. 1 is a diagram depicting a configuration of a zoom lens ZL (ZL1) according to Example 1, and a zoom lens from a wide-angle end state (W) to a telephoto end state (T) thereof. As FIG. 1 shows, the zoom lens ZL1 according to Example 1 has, in order from an object, a first lens group G1 having negative refractive power, a second lens group G2 having positive refractive power, and a third lens group G3 having positive refractive power.

Upon zooming from the wide-angle end state to the telephoto end state, the first lens group G1 and the second lens group G2 move respectively so that the distance between the first lens group G1 and the second lens group G2 decreases, the distance between the second lens group G2 and the third lens group G3 increases, and the third lens group G3 is fixed.

The first lens group G1 is comprised of, in order from the object: a negative meniscus lens L11 having a convex surface facing the object; a negative meniscus lens L12 having a convex surface facing the object; and a positive meniscus lens L13 having a convex surface facing the object.

A diaphragm S1 for cutting unnecessary external light is disposed between the first lens group G1 and the second lens group G2, and moves toward the object upon zooming from the wide-angle end state to the telephoto end state.

The second lens group G2 is comprised of, in order from the object: a cemented lens of a negative meniscus lens L21 having a convex surface facing the object and a biconvex positive lens L22; a cemented lens of a biconvex positive lens L23 and a biconcave negative lens L24; and a cemented lens of a negative meniscus lens L25 having a convex surface facing the object and a biconvex positive lens L26.

An aperture stop S2 for adjusting quantity of light is disposed between the biconvex positive lens L22 and the biconvex positive lens L23 constituting the second lens group G2, and moves, together with the second lens group G2, toward the object upon zooming from the wide-angle end state to the telephoto end state.

The third lens group G3 is constituted by a biconvex positive lens L31.

Between the third lens group G3 and the image plane I, a glass block G, such as a low pass filter and an infrared cut-off filter, for cutting off spatial frequencies exceeding a critical resolution of a picture element (e.g. CCD, CMOS), disposed on the image plane I, and a sensor cover glass CV of the picture element are disposed.

Table 1 shows each data value of Example 1. The surface numbers 1 to 23 in Table 1 correspond to the surfaces 1 to 23 in FIG. 1. In Example 1, the second surface, eighth surface and eighteenth surface are formed to be aspherical.

TABLE 1

[Lens Data]

| surface number | r | d | nd | vd |
|---|---|---|---|---|
| object surface | ∞ | | | |
| 1 | 38.7781 | 1.5000 | 1.806100 | 40.71 |
| 2(aspherical surface) | 9.2824 | 6.5000 | | |
| 3 | 183.8983 | 1.0000 | 1.729157 | 54.68 |
| 4 | 24.0042 | 1.5000 | | |
| 5 | 20.1101 | 3.3000 | 1.805181 | 25.42 |
| 6 | 101.4010 | D6 | | |
| 7(diaphragm) | ∞ | D7 | | |
| 8(aspherical surface) | 25.9620 | 1.2000 | 1.592014 | 67.02 |
| 9 | 16.7688 | 2.0000 | 1.618000 | 63.33 |
| 10 | −32.7003 | 1.0000 | | |
| 11(aperture stop) | ∞ | 0.8000 | | |
| 12 | 9.3921 | 2.9000 | 1.772499 | 49.60 |
| 13 | −450.5504 | 1.2000 | 1.800999 | 34.97 |
| 14 | 8.2370 | 1.2000 | | |
| 15 | 71.5552 | 1.3000 | 1.882997 | 40.76 |
| 16 | 8.1763 | 3.0000 | 1.497820 | 82.52 |
| 17 | −15.2902 | D17 | | |
| 18(aspherical surface) | 49.7019 | 3.0000 | 1.603001 | 65.44 |
| 19 | −92.2790 | 2.8200 | | |
| 20 | ∞ | 1.5900 | 1.516330 | 64.14 |
| 21 | ∞ | 1.0000 | | |
| 22 | ∞ | 0.7000 | 1.516330 | 64.14 |
| 23 | ∞ | Bf | | |
| image plane | ∞ | | | |

[Aspherical data]

second surface $\kappa = 0.5090$, $A4 = 7.82030E{-}06$, $A6 = 1.10540E{-}07$, $A8 = 0.00000E{+}00$, $A10 = 0.00000E{+}00$ eighth surface $\kappa = 1.0000$, $A4 = -3.98800E{-}05$, $A6 = -7.73110E08$, $A8 = 0.00000E{+}00$, $A10 = 0.00000E{+}00$ eighteenth surface $\kappa = 1.0000$, $A4 = 2.24470E{-}06$, $A6 = 7.89090E{-}08$, $A8 = 0.00000E{+}00$, $A10 = 0.00000E{+}00$

[General Data]
zoom ratio 2.8035

| | wide-angle end | intermediate position | telephoto end |
|---|---|---|---|
| f | 9.05996 | 17.69991 | 25.40001 |
| FNo | 2.89144 | 4.04720 | 5.08557 |
| ω | 44.65220 | 25.47754 | 18.28922 |
| Y | 8.35000 | 8.35000 | 8.35000 |
| TL | 72.75641 | 65.55254 | 69.03906 |
| Bf | 0.74678 | 0.74673 | 0.74652 |
| Bf(converted to air) | 6.07700 | 6.07695 | 6.07674 |

[Zooming Data]

| variable distance | wide-angle end | intermediate position | telephoto end |
|---|---|---|---|

TABLE 1-continued

| | | | |
|---|---|---|---|
| D6 | 15.59672 | 0.88573 | 0.76426 |
| D7 | 9.13980 | 6.57143 | 1.20000 |
| D17 | 9.76311 | 19.83865 | 28.81828 |

[Zoom lens group data]

| group number | first surface of group | focal length of group | total lens length |
|---|---|---|---|
| G1 | 1 | −19.17720 | 13.8 |
| G2 | 8 | 19.33903 | 14.6 |
| G3 | 18 | 54.00001 | 3.0 |

[Conditional Expression]

conditional expression (1) Dt23/Dt3i = 4.74
conditional expression (2) f2/f3 = 0.36

As the data table in Table 1 shows, the zoom lens ZL1 according to this example satisfies all the conditional expressions (1) and (2).

FIG. 2 are graphs showing various aberrations of the zoom lens ZL1 according to Example 1 (graphs showing spherical aberration, astigmatism, distortion, coma aberration and lateral chromatic aberration), where FIG. 2A are graphs showing various aberrations of the zoom lens upon focusing on infinity in the wide-angle end state, FIG. 2B are graphs showing various aberrations of the zoom lens upon focusing on infinity in the intermediate focal length state, and FIG. 2C are graphs showing various aberrations of the zoom lens upon focusing on infinity in the telephoto end state.

In each graph showing aberrations, FNo denotes an F number, and Y denotes an image height. In the graph showing spherical aberrations, the solid line indicates spherical aberration, and the broken line indicates the sine condition. In the graph showing astigmatisms, the solid line indicates the sagittal image surface, and the broken line indicates the meridional image surface. In the graph showing coma aberrations, the solid line indicates the meridional coma. The description on the graphs showing aberrations is the same for the other examples, where this description is omitted.

In Example 1, as the respective graphs on aberrations show, various aberrations are corrected well in each focal length state from the wide-angle end state to the telephoto end state, and excellent image forming performance is exhibited.

Example 2

Example 2 will now be described with reference to FIG. 3, FIG. 4 and Table 2. FIG. 3 is a diagram depicting a configuration of a zoom lens ZL (ZL2) according to Example 2, and a zoom lens from a wide-angle end state (W) to a telephoto end state (T) thereof. As FIG. 3 shows, the zoom lens ZL2 according to Example 2 has, in order from an object, a first lens group G1 having negative refractive power, a second lens group G2 having positive refractive power, and a third lens group G3 having positive refractive power.

Upon zooming from the wide-angle end state to the telephoto end state, the first lens group G1 and the second lens group G2 move respectively so that the distance between the first lens group G1 and the second lens group G2 decreases, the distance between the second lens group G2 and the third lens group G3 increases, and the third lens group G3 is fixed.

The first lens group G1 is comprised of, in order from the object: a negative meniscus lens L11 having a convex surface facing the object; a negative meniscus lens L12 having a convex surface facing the object; and a positive meniscus lens L13 having a convex surface facing the object.

A diaphragm S1 for cutting unnecessary external light is disposed between the first lens group G1 and the second lens group G2, and moves toward the object upon zooming from the wide-angle end state to the telephoto end state.

The second lens group G2 is comprised of, in order from the object: a cemented lens of a negative meniscus lens L21 having a convex surface facing the object and a biconvex positive lens L22; a cemented lens of a positive meniscus lens L23 having a convex surface facing the object, and a negative meniscus lens L24 having a convex surface facing the object; and a cemented lens of a negative meniscus lens L25 having a convex surface facing the object and a biconvex positive lens L26.

An aperture stop S2 for adjusting quantity of light is disposed between the biconvex positive lens L22 and the positive meniscus lens L23 having a convex surface facing the object constituting the second lens group G2, and moves, together with the second lens group G2, toward the object upon zooming from the wide-angle end state to the telephoto end state.

The third lens group G3 is constituted by a biconvex positive lens L31.

Between the third lens group G3 and the image plane I, a glass block G, such as a low pass filter and an infrared cut-off filter, for cutting off spatial frequencies exceeding a critical resolution of a picture element (e.g. CCD, CMOS), disposed on the image plane I, and a sensor cover glass CV of the picture element are disposed.

Table 2 shows each data value of Example 2. The surface numbers 1 to 23 in Table 2 correspond to the surfaces 1 to 23 in FIG. 3. In Example 2, the second surface, eighth surface and eighteenth surface are formed to be aspherical.

TABLE 2

[Lens Data]

| surface number | r | d | nd | vd |
|---|---|---|---|---|
| object surface | ∞ | | | |
| 1 | 39.6181 | 1.5000 | 1.806100 | 40.71 |
| 2(aspherical surface) | 9.3068 | 6.5000 | | |
| 3 | 147.3117 | 1.0000 | 1.729157 | 54.68 |
| 4 | 23.4401 | 1.5000 | | |
| 5 | 19.9275 | 3.3000 | 1.805181 | 25.42 |
| 6 | 96.4018 | D6 | | |
| 7(diaphragm) | ∞ | D7 | | |
| 8(aspherical surface) | 27.4568 | 0.7000 | 1.592014 | 67.02 |
| 9 | 10.6595 | 2.5000 | 1.618000 | 63.33 |
| 10 | −32.0304 | 1.0000 | | |
| 11(aperture stop) | ∞ | 0.8000 | | |
| 12 | 9.0348 | 2.9000 | 1.772499 | 49.60 |
| 13 | 507.9539 | 1.0000 | 1.800999 | 34.97 |
| 14 | 8.2208 | 1.2000 | | |
| 15 | 82.7249 | 1.0000 | 1.882997 | 40.76 |
| 16 | 7.6793 | 3.0000 | 1.497820 | 82.52 |
| 17 | −14.9390 | D17 | | |
| 18(aspherical surface) | 49.5815 | 2.7000 | 1.603001 | 65.44 |
| 19 | −92.9175 | 3.0000 | | |
| 20 | ∞ | 1.5900 | 1.516330 | 64.14 |
| 21 | ∞ | 1.0000 | | |

TABLE 2-continued

| 22 | ∞ | 0.7000 | 1.516330 | 64.14 |
| 23 | ∞ | Bf | | |
| image plane | ∞ | | | |

[Aspherical data]

second surface

κ = 0.4995, A4 = 8.00570E−06, A6 = 1.10200E−07, A8 = 0.00000E+00,
A10 = 0.00000E+00 eighth surface

κ = 1.0000, A4 = −4.18390E−05, A6 = −9.30920E−08,
A8 = 0.00000E+00, A10 = 0.00000E+00 eighteenth surface

κ = 1.0000, A4 = 2.09510E−06, A6 = 7.83470E−08, A8 = 0.00000E+00,
A10 = 0.00000E+00

[General Data]
zoom ratio 2.8035

| | wide-angle end | intermediate position | telephoto end |
|---|---|---|---|
| f | 9.05996 | 17.69991 | 25.40001 |
| FNo | 2.89342 | 4.04955 | 5.08823 |
| ω | 44.65324 | 25.47896 | 18.28836 |
| Y | 8.35000 | 8.35000 | 8.35000 |
| TL | 72.43416 | 65.23029 | 68.71681 |
| Bf | 0.68671 | 0.68666 | 0.68645 |
| Bf(converted to air) | 6.19693 | 6.19688 | 6.19667 |

[Zooming Data]

| variable distance | wide-angle end | intermediate position | telephoto end |
|---|---|---|---|
| D6 | 15.59672 | 0.88573 | 0.76426 |
| D7 | 9.13980 | 6.57143 | 1.20000 |
| D17 | 10.12093 | 20.19647 | 29.17610 |

[Zoom lens group data]

| group number | first surface of group | focal length of group | total lens length |
|---|---|---|---|
| G1 | 1 | −19.17720 | 13.8 |
| G2 | 8 | 19.33903 | 13.7 |
| G3 | 18 | 54.00001 | 2.7 |

[Conditional Expression]

conditional expression (1) Dt23/Dt3i = 4.71
conditional expression (2) f2/f3 = 0.36

As the data table in Table 2 shows, the zoom lens ZL2 according to this example satisfies all the conditional expressions (1) and (2).

Figure 4B:
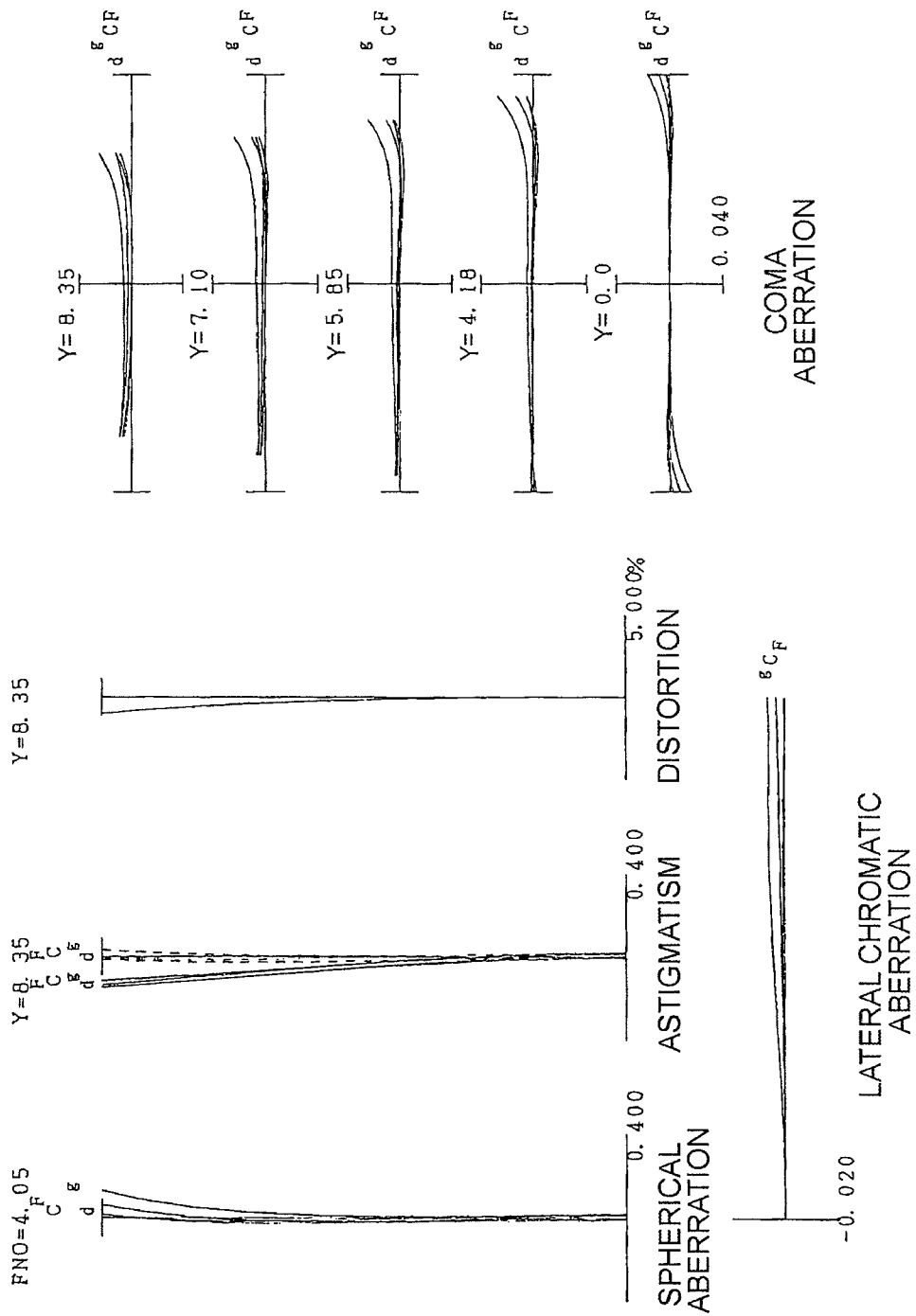
FIG. 4 are graphs showing various aberrations of the zoom lens according to Example 2, where FIG. 4A are graphs showing various Aberrations of the zoom lens upon focusing on infinity in the wide-angle end state, FIG. 4B are graphs showing various aberrations of the zoom lens upon focusing on infinity in the intermediate focal length state, and FIG. 4C are graphs showing various aberrations of the zoom lens upon focusing on infinity in the telephoto end state.
Figure 4C:
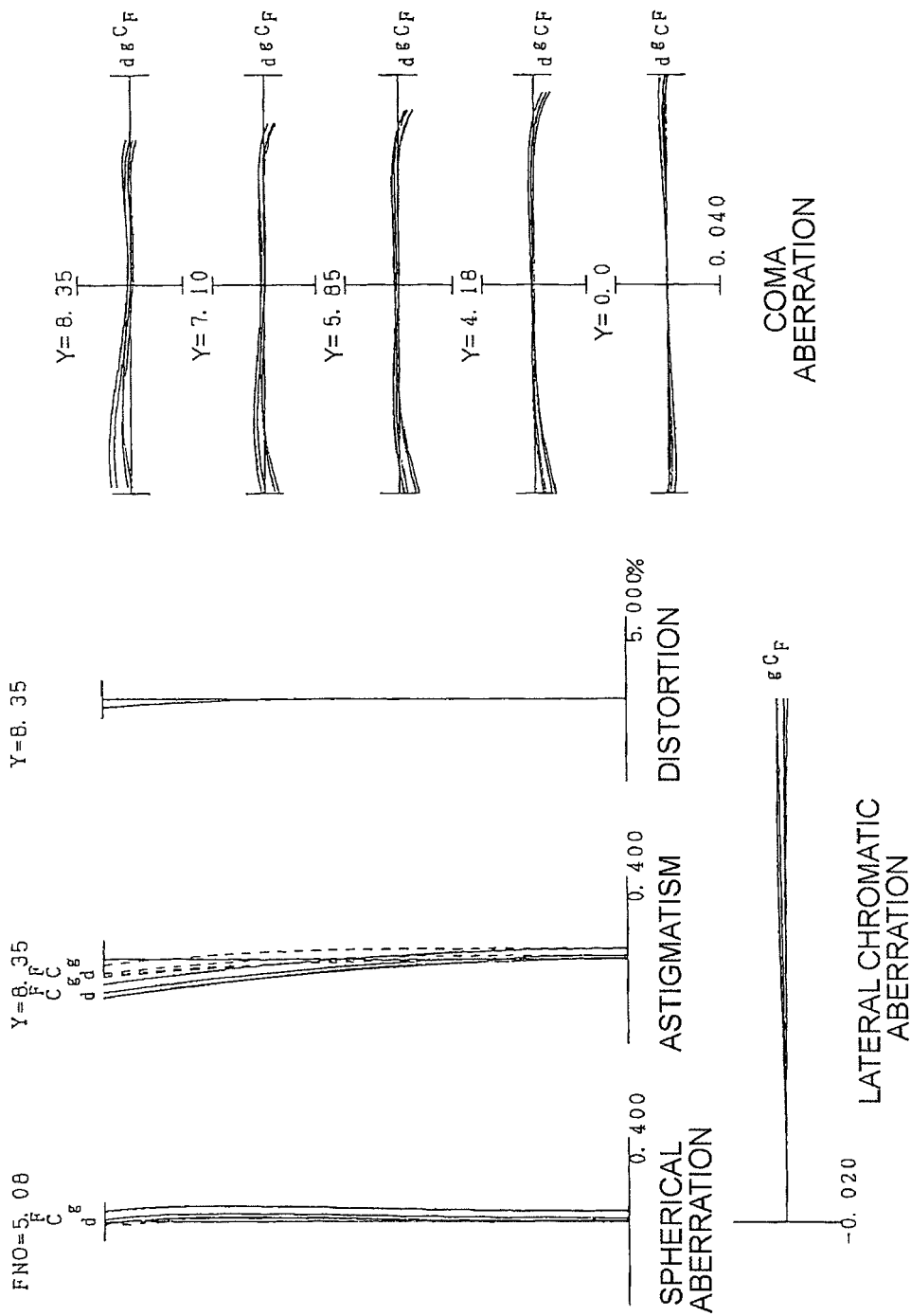

FIG. 4 are graphs showing various aberrations of the zoom lens ZL2 according to Example 2 (graphs showing spherical aberration, astigmatism, distortion, coma aberration and lateral chromatic aberration), where FIG. 4A are graphs showing various aberrations of the zoom lens upon focusing on infinity in the wide-angle end state, FIG. 4B are graphs showing various aberrations of the zoom lens upon focusing on infinity in the intermediate focal length state, and FIG. 4C are graphs showing various aberrations of the zoom lens upon focusing on infinity in the telephoto end state.

In Example 2, as the respective graphs on aberrations show, various aberrations are corrected well in each focal length state from the wide-angle end state to the telephoto end state, and excellent image forming performance is exhibited.

Example 3

Figure 5:
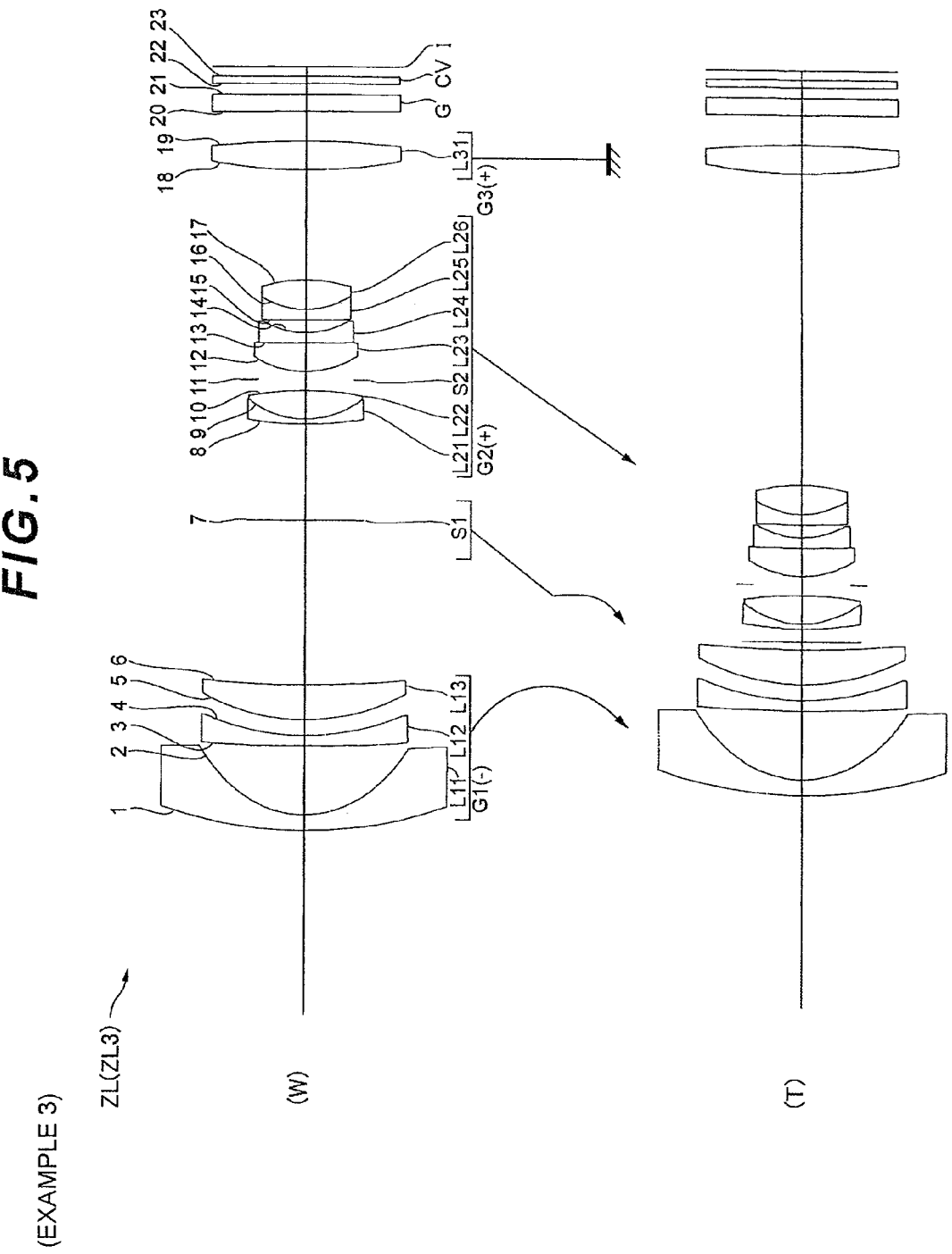
FIG. 5 is a diagram depicting a configuration and a zoom locus from a wide-angle end state (W) to a telephoto end state (T) of a zoom lens according to Example 3.

Example 3 will now be described with reference to FIG. 5, FIG. 6 and Table 3. FIG. 5 is a diagram depicting a configuration of a zoom lens ZL (ZL3) according to Example 3, and a zoom lens from a wide-angle end state (W) to a telephoto end state (T) thereof. As FIG. 5 shows, the zoom lens ZL3 according to Example 3 has, in order from an object, a first lens group G1 having negative refractive power, a second lens group G2 having positive refractive power, and a third lens group G3 having positive refractive power.

Upon zooming from the wide-angle end state to the telephoto end state, the first lens group G1 and the second lens group G2 move respectively so that the distance between the first lens group G1 and the second lens group G2 decreases, the distance between the second lens group G2 and the third lens group G3 increases, and the third lens group G3 is fixed.

The first lens group G1 is comprised of, in order from the object: a negative meniscus lens L11 having a convex surface facing the object; a negative meniscus lens L12 having a convex surface facing the object; and a positive meniscus lens L13 having a convex surface facing the object.

A diaphragm S1 for cutting unnecessary external light is disposed between the first lens group G1 and the second lens group G2, and moves toward the object upon zooming from the wide-angle end state to the telephoto end state.

The second lens group G2 is comprised of, in order from the object: a cemented lens of a negative meniscus lens L21 having a convex surface facing the object and a biconvex positive lens L22; a cemented lens of a positive meniscus lens L23 having a convex surface facing the object and a negative meniscus lens L24 having a convex surface facing the object; and a cemented lens of a negative meniscus lens L25 having a convex surface facing the object and a biconvex positive lens L26.

An aperture stop S2 for adjusting quantity of light is disposed between the biconvex positive lens L22 and the positive meniscus lens L23 having a convex surface facing the object constituting the second lens group G2, and moves, together with the second lens group G2, toward the object upon zooming from the wide-angle end state to the telephoto end state.

The third lens group G3 is constituted by a biconvex positive lens L31.

Between the third lens group G3 and the image plane I, a glass block G, such as a low pass filter and an infrared cut-off filter, for cutting off spatial frequencies exceeding a critical resolution of a picture element (e.g. CCD, CMOS), disposed on the image plane I, and a sensor cover glass CV of the picture element are disposed.

Table 3 shows each data value of Example 3. The surface numbers 1 to 23 in Table 3 correspond to the surfaces 1 to 23 in FIG. 5. In Example 3, the second surface, eighth surface and eighteenth surface are formed to be aspherical.

TABLE 3

[Lens Data]

| surface number | r | d | nd | vd |
|---|---|---|---|---|
| object surface | ∞ | | | |
| 1 | 39.9468 | 1.5000 | 1.806100 | 40.71 |
| 2(aspherical surface) | 9.3127 | 6.5000 | | |
| 3 | 134.4231 | 1.0000 | 1.729157 | 54.68 |
| 4 | 23.1778 | 1.5000 | | |
| 5 | 19.8394 | 3.3000 | 1.805181 | 25.42 |
| 6 | 94.1569 | D6 | | |
| 7(diaphragm) | ∞ | D7 | | |

TABLE 3-continued

| | | | | |
|---|---|---|---|---|
| 8(aspherical surface) | 28.2189 | 0.5000 | 1.592014 | 67.02 |
| 9 | 8.5125 | 2.7000 | 1.618000 | 63.33 |
| 10 | −30.6475 | 1.0000 | | |
| 11(aperture stop) | ∞ | 0.8000 | | |
| 12 | 8.8356 | 2.7000 | 1.772499 | 49.60 |
| 13 | 156.2450 | 1.0000 | 1.800999 | 34.97 |
| 14 | 8.1151 | 1.2000 | | |
| 15 | 127.0139 | 1.0000 | 1.882997 | 40.76 |
| 16 | 7.6682 | 2.8000 | 1.497820 | 82.52 |
| 17 | −14.1568 | D17 | | |
| 18(aspherical surface) | 50.3497 | 2.7000 | 1.603001 | 65.44 |
| 19 | −90.3109 | 2.8200 | | |
| 20 | ∞ | 1.5900 | 1.516330 | 64.14 |
| 21 | ∞ | 1.0000 | | |
| 22 | ∞ | 0.7000 | 1.516330 | 64.14 |
| 23 | ∞ | Bf | | |
| image plane | ∞ | | | |

[Aspherical data]

second surface $\kappa = 0.4970$, $A4 = 7.96450E{-}06$, $A6 = 1.06220E{-}07$, $A8 = 0.00000E{+}00$, $A10 = 0.00000E{+}00$ eighth surface $\kappa = 1.0000$, $A4 = -4.72990E{-}05$, $A6 = -1.58230E{-}07$, $A8 = 0.00000E{+}00$, $A10 = 0.00000E{+}00$ eighteenth surface $\kappa = 1.0000$, $A4 = 2.00560E{-}06$, $A6 = 7.62370E{-}08$, $A8 = 0.00000E{+}00$, $A10 = 0.00000E{+}00$

[General Data]
zoom ratio 2.8035

| | wide-angle end | intermediate position | telephoto end |
|---|---|---|---|
| f | 9.05996 | 17.69991 | 25.40001 |
| FNo | 2.89172 | 4.04711 | 5.08512 |
| ω | 44.65472 | 25.47901 | 18.28788 |
| Y | 8.35000 | 8.35000 | 8.35000 |
| TL | 72.28636 | 65.08249 | 68.56901 |
| Bf | 0.88358 | 0.88353 | 0.88332 |
| Bf(converted to air) | 6.21381 | 6.21376 | 6.21355 |

[Zooming Data]

| variable distance | wide-angle end | intermediate position | telephoto end |
|---|---|---|---|
| D6 | 15.59672 | 0.88573 | 0.76426 |
| D7 | 9.13979 | 6.57142 | 1.19999 |
| D17 | 10.35627 | 20.43181 | 29.41144 |

[Zoom lens group data]

| group number | first surface of group | focal length of group | total lens length |
|---|---|---|---|
| G1 | 1 | −19.17720 | 13.8 |
| G2 | 8 | 19.33903 | 13.7 |
| G3 | 18 | 54.00001 | 2.7 |

[Conditional Expression]

conditional expression (1) Dt23/Dt3i = 4.73
conditional expression (2) f2/f3 = 0.36

As the data table in Table 3 shows, the zoom lens ZL3 according to this example satisfies all the conditional expressions (1) and (2).

FIG. 6 are graphs showing various aberrations of the zoom lens ZL3 according to Example 3 (graphs showing spherical aberration, astigmatism, distortion, coma aberration and lateral chromatic aberration), where FIG. 6A are graphs showing various aberrations of the zoom lens upon focusing on infinity in the wide-angle end state, FIG. 6B are graphs showing various aberrations of the zoom lens upon focusing on infinity in the intermediate focal length state, and FIG. 6C are graphs showing various aberrations of the zoom lens upon focusing on infinity in the telephoto end state.

In Example 3, as the respective graphs on aberrations show, various aberrations are corrected well in each focal length state from the wide-angle end state to the telephoto end state, and excellent image forming performance is exhibited.

Example 4

Example 4 will now be described with reference to FIG. 7, FIG. 8 and Table 4. FIG. 7 is a diagram depicting a configuration of a zoom lens ZL (ZL4) according to Example 4, and a zoom lens from a wide-angle end state (W) to a telephoto end state (T) thereof. As FIG. 7 shows, the zoom lens ZL4 according to Example 4 has, in order from an object, a first lens group G1 having negative refractive power, a second lens group G2 having positive refractive power, and a third lens group G3 having positive refractive power.

Upon zooming from the wide-angle end state to the telephoto end state, the first lens group G1 and the second lens group G2 move respectively so that the distance between the first lens group G1 and the second lens group G2 decreases, the distance between the second lens group G2 and the third lens group G3 increases, and the third lens group G3 is fixed.

The first lens group G1 is comprised of, in order from the object: a negative meniscus lens L11 having a convex surface facing the object; a negative meniscus lens L12 having a convex surface facing the object; and a positive meniscus lens L13 having a convex surface facing the object.

A diaphragm S1 for cutting unnecessary external light is disposed between the first lens group G1 and the second lens group G2, and moves toward the object upon zooming from the wide-angle end state to the telephoto end state.

The second lens group G2 is comprised of, in order from the object: a cemented lens of a negative meniscus lens L21 having a convex surface facing the object and a biconvex positive lens L22; a cemented lens of a positive meniscus lens L23 having a convex surface facing the object and a negative meniscus lens L24 having a convex surface facing the object; and a cemented lens of a negative meniscus lens L25 having a convex surface facing the object and a biconvex positive lens L26.

An aperture stop S2 for adjusting quantity of light is disposed between the biconvex positive lens L22 and the positive meniscus lens L23 having a convex surface facing the object constituting the second lens group G2, and moves, together with the second lens group G2, toward the object upon zooming from the wide-angle end state to the telephoto end state.

The third lens group G3 is constituted by a biconvex positive lens L31.

Between the third lens group G3 and the image plane I, a glass block G, such as a low pass filter and an infrared cut-off filter, for cutting off spatial frequencies exceeding a critical resolution of a picture element (e.g. CCD, CMOS), disposed on the image plane I, and a sensor cover glass CV of the picture element are disposed.

Table 4 shows each data value of Example 4. The surface numbers 1 to 23 in Table 4 correspond to the surfaces 1 to 23 in FIG. 7. In Example 4, the second surface, eighth surface and eighteenth surface are formed to be aspherical.

TABLE 4

[Lens Data]

| surface number | r | d | nd | νd |
|---|---|---|---|---|
| object surface | ∞ | | | |
| 1 | 38.8376 | 1.5000 | 1.806100 | 40.71 |
| 2(aspherical surface) | 9.2768 | 6.5000 | | |
| 3 | 175.0898 | 1.0000 | 1.729157 | 54.68 |
| 4 | 23.9322 | 1.5000 | | |
| 5 | 20.0633 | 3.3000 | 1.805181 | 25.42 |
| 6 | 99.7720 | D6 | | |
| 7(diaphragm) | ∞ | D7 | | |
| 8(aspherical surface) | 22.7320 | 1.0000 | 1.592014 | 67.02 |
| 9 | 32.5585 | 2.0000 | 1.618000 | 63.33 |
| 10 | −34.8847 | 1.1000 | | |
| 11(aperture stop) | ∞ | 1.0000 | | |
| 12 | 9.2861 | 2.9000 | 1.772499 | 49.60 |
| 13 | 665.9355 | 1.0000 | 1.800999 | 34.97 |
| 14 | 7.8954 | 1.3000 | | |
| 15 | 64.4515 | 1.0000 | 1.882997 | 40.76 |
| 16 | 8.5043 | 3.0000 | 1.497820 | 82.52 |
| 17 | −15.6727 | D17 | | |
| 18(aspherical surface) | 48.3299 | 2.7000 | 1.603001 | 65.44 |
| 19 | −97.7082 | 2.8200 | | |
| 20 | ∞ | 1.5900 | 1.516330 | 64.14 |
| 21 | ∞ | 1.0000 | | |
| 22 | ∞ | 0.7000 | 1.516330 | 64.14 |
| 23 | ∞ | Bf | | |
| image plane | ∞ | | | |

[Aspherical data]

second surface

κ = 0.5074, A4 = 7.91410E−06, A6 = 1.13200E−07, A8 = 0.00000E+00, A10 = 0.00000E+00 eighth surface

κ = 1.0000, A4 = −4.17380E−05, A6 = −8.31640E−08, A8 = 0.00000E+00, A10 = 0.00000E+00 eighteenth surface

κ = 1.0000, A4 = 2.41550E−06, A6 = 8.03010E−08, A8 = 0.00000E+00, A10 = 0.00000E+00

[General Data]
zoom ratio 2.8035

| | wide-angle end | intermediate position | telephoto end |
|---|---|---|---|
| f | 9.05996 | 17.69991 | 25.40001 |
| FNo | 2.87254 | 4.02099 | 5.05298 |
| ω | 44.65485 | 25.47852 | 18.28932 |
| Y | 8.35000 | 8.35000 | 8.35000 |
| TL | 72.32302 | 65.11915 | 68.60567 |
| Bf | 0.83806 | 0.83801 | 0.83780 |
| Bf(converted to air) | 6.16828 | 6.16824 | 6.16803 |

[Zooming Data]

| variable distance | wide-angle end | intermediate position | telephoto end |
|---|---|---|---|
| D6 | 15.59673 | 0.88574 | 0.76427 |
| D7 | 9.13980 | 6.57143 | 1.20000 |
| D17 | 9.83843 | 19.91397 | 28.89360 |

TABLE 4-continued

[Zoom lens group data]

| group number | first surface of group | focal length of group | total lens length |
|---|---|---|---|
| G1 | 1 | −19.17720 | 13.8 |
| G2 | 8 | 19.33903 | 14.3 |
| G3 | 18 | 54.00001 | 2.7 |

[Conditional Expression]

conditional expression (1) Dt23/Dt3i = 4.68
conditional expression (2) f2/f3 = 0.36

As the data table in Table 4 shows, the zoom lens ZL4 according to this example satisfies all the conditional expressions (1) and (2).

Figure 8C:
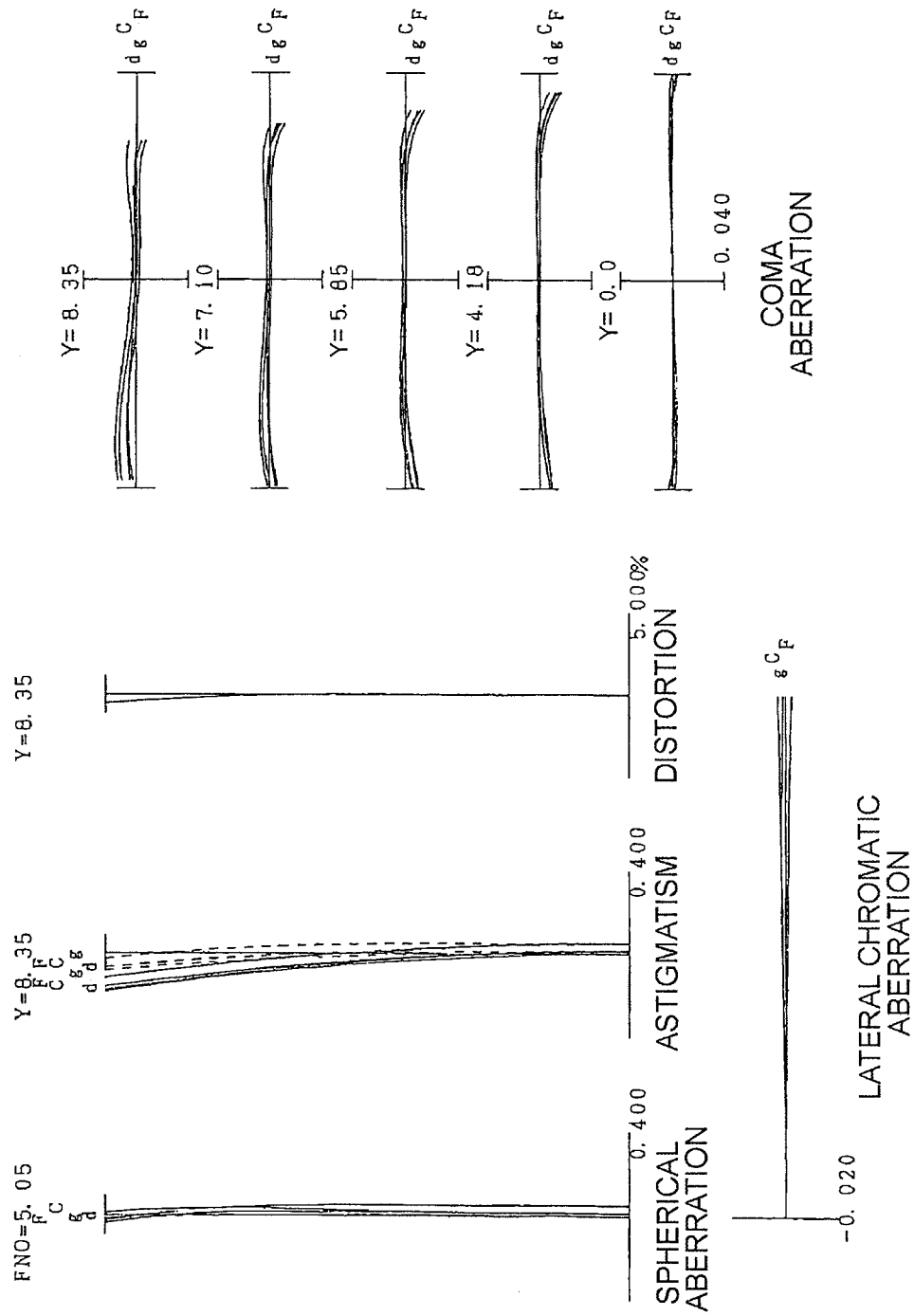
FIG. 8 are graphs showing various aberrations of the zoom lens according to Example 4, where FIG. 8A are graphs showing various Aberrations of the zoom lens upon focusing on infinity in the wide-angle end state, FIG. 8B are graphs showing various aberrations of the zoom lens upon focusing on infinity in the intermediate focal length state, and FIG. 8C are graphs showing various aberrations of the zoom lens upon focusing on infinity in the telephoto end state.

FIG. 8 are graphs showing various aberrations of the zoom lens ZL4 according to Example 4 (graphs showing spherical aberration, astigmatism, distortion, coma aberration and lateral chromatic Aberration), where FIG. 8A are graphs showing various aberrations of the zoom lens upon focusing on infinity in the wide-angle end state, FIG. 8B are graphs showing various aberrations of the zoom lens upon focusing on infinity in the intermediate focal length state, and FIG. 8C are graphs showing various aberrations of the zoom lens upon focusing on infinity in the telephoto end state. In Example 4, as the respective graphs on aberrations show, various aberrations are corrected well in each focal length state from the wide-angle end state to the telephoto end state, and excellent image forming performance is exhibited.

Second Embodiment

Second embodiments of the present invention will now be described with reference to the drawings. As FIG. 9 shows, a zoom lens according to the second embodiment is a zoom lens comprising, in order from an object, a first lens group G1 having negative refractive power, a second lens group G2 having positive refractive power, and a third lens group G3 having positive refractive power, wherein the second lens group G2 is constituted only by three or more cemented lenses.

By this configuration, the apparatus can be downsized, preventing the lens diameter from becoming too larger in the wide-angle end state, and fluctuation of astigmatism due to zooming can be corrected well. Since three or more cemented lenses are disposed in the second lens group G2, fluctuation of lateral chromatic aberration during zooming can be corrected well.

In the zoom lens according to the present embodiment, image blur is corrected by shifting the cemented lens disposed closest to the object among the second lens group G2 roughly vertically to the optical axis. Because of this configuration, the amount of moving of the image plane upon shifting the cemented lens is large, so the required amount of shifting the cemented lens upon correcting image blur can be decreased, and fluctuation of coma aberration and fluctuation of astigmatism upon shifting the cemented lens for correcting image blur can be decreased. Since the amount of shifting the cemented lens is small and the cemented lens is much lighter and smaller compared with the method of shifting the entire lens group, the drive mechanism for shifting this cemented lens can be smaller, and therefore the size of the entire apparatus can be decreased.

In the zoom lens according to the present embodiment, it is preferable that the following conditional expression (3) is satisfied, where f2F denotes a focal length of the cemented lens disposed closest to the object in the second lens group G2, and f2M denotes a focal length of the cemented lens disposed second closest to the object in the second lens group G2.

$$0.001 < f2F/f2M < 0.500 \quad (3)$$

The conditional expression (3) specifies an appropriate ratio of the focal length of the cemented lens disposed closest to the object and the focal length of the cemented lens disposed to the image plane side thereof (that is, disposed second closest to the object) among three or more cemented lenses disposed in the second lens group G2. If the upper limit value of the conditional expression (3) is exceeded, the moving amount of the image plane upon shifting the cemented lens disposed closest to the object in the second lens group G2 becomes small, and it becomes difficult to correct fluctuation of coma aberration and fluctuation of astigmatism upon shifting the cemented lens for correcting image blur, which is not desirable. If the lower limit value of the conditional expression (3) is not reached, it becomes difficult to correct spherical aberration, which is not desirable.

To ensure the effect of the present embodiment, it is preferable that the upper limit value of the conditional expression (3) is 0.40. To further ensure the effect of the present embodiment, it is preferable that the upper limit value of the conditional expression (3) is 0.30.

In the zoom lens according to the present embodiment, it is preferable that the following conditional expression (4) is satisfied, where f2F denotes a focal length of the cemented lens disposed closest to the object in the second lens group G2, and f2MR denotes a combined focal length of the cemented lenses disposed second and third closest to the object in the second lens group G2.

$$0.01 < f2F/f2MR < 0.2 \quad (4)$$

The conditional expression (4) specifies an appropriate ratio of the focal length of the cemented lens closest to the object and the combined focal length of the cemented lenses disposed second and third closest to the object among the three or more cemented lenses constituting the second lens group G2. If the upper limit value of the conditional expression (4) is exceeded, the moving amount of the image plane upon shifting the cemented lens disposed closest to the object in the second lens group G2 becomes small, and it becomes difficult to correct fluctuation of coma aberration and fluctuation of astigmatism upon shifting the cemented lens for correcting image blur, which is not desirable. If the lower limit value of the conditional expression (4) is not reached, it becomes difficult to correct spherical aberration, which is not desirable.

To ensure the effect of the present embodiment, it is preferable that the upper limit value of the conditional expression (4) is 0.1. To further ensure the effect of the present embodiment, it is preferable that the lower limit value of the conditional expression (4) is 0.02.

In the zoom lens according to the present embodiment, it is preferable that the following conditional expression (5) is satisfied, where Dt23 denotes a distance between the second lens group G2 and the third lens group G3 in the telephoto end state, and Dt3$i$ denotes a distance between the third lens group G3 and the image plane (converted to air) in the telephoto end state. "Dt23 denotes a distance between the second lens group G2 and the third lens group G3 in the telephoto end state" means a distance from the lens surface closest to the image constituting the second lens group G2 to the lens surface closest to the object constituting the third lens group G3 in the telephoto end state. "Dt3$i$ denotes a distance between the third lens group G3 and the image plane (converted to air) in the telephoto end state" means a distance from the lens surface closest to the image constituting the third lens group G3 to the image plane in the telephoto end state.

$$3.00 < Dt23/Dt3i < 30.00 \quad (5)$$

The conditional expression (5) specifies an appropriate ratio of the air distance of the third lens group G3 to the object side, and the air distance thereof to the image side. If the upper limit value of the conditional expression (5) is exceeded, it becomes difficult to correct astigmatism well, which is not desirable. If the lower limit value of the conditional expression (5) is not reached, it becomes difficult to correct coma aberration well, which is not desirable.

To ensure the effect of the present embodiment, it is preferable that the upper limit value of the conditional expression (5) is 20.00. To further ensure the effect of the present embodiment, it is preferable that the upper limit value of the conditional expression (5) is 10.00.

To ensure the effect of the present embodiment, it is preferable that the lower limit value of the conditional expression (5) is 3.50. To further ensure the effect of the present embodiment, it is preferable that the lower limit value of the conditional expression (5) is 4.00. To even further ensure the effect of the present embodiment, it is preferable that the lower limit value of the conditional expression (5) is 4.50.

In the zoom lens according to the present embodiment, it is preferable that the following conditional expression (6) is satisfied, where f2 denotes a focal length of the second lens group G2, and f3 denotes a focal length of the third lens group G3.

$$0.10 < f2/f3 < 0.50 \quad (6)$$

The conditional expression (6) specifies an appropriate ratio of the focal length of the second lens group G2 and the focal length of the third lens group G3. If the upper limit value of the conditional expression (6) is exceeded, the total length of the optical system becomes long, which is not desirable. It also becomes difficult to correct coma aberration well, which is not desirable. If the lower limit value of the conditional expression (6) is not reached, it becomes difficult to correct spherical aberration well, which is not desirable.

To ensure the effect of the present embodiment, it is preferable that the upper limit value of the conditional expression (6) is 0.45. To further ensure the effect of the present embodiment, it is preferable that the upper limit value of the conditional expression (6) is 0.40.

To ensure the effect of the present embodiment, it is preferable that the lower limit value of the conditional expression (6) is 0.15. To further ensure the effect of the present embodiment, it is preferable that the lower limit value of the conditional expression (6) is 0.20.

In the zoom lens according to the present embodiment, it is preferable that the third lens group G3 is constituted only by a single lens. By constituting the third lens group G3 only by a single lens like this, assembly adjustment becomes extremely easy, which is effective for decreasing cost. Furthermore, the space required for housing the lenses decreases, so the size of the apparatus when carrying can be decreased. Using the single lens also enables correcting longitudinal chromatic aberration well.

In the zoom lens according to the present embodiment, it is preferable that the first lens group G1 and the second lens group G2 move upon zooming from the wide-angle end stat to the telephoto end state so that the distance between the first lens group G1 and the second lens group G2 decreases, and the distance between the second lens group G2 and the third lens group G3 increases, and the third lens group G3 is fixed. By this configuration, each lens group position during zooming can be controlled by one cam drum, and the position of the image plane during zooming can be accurately controlled as a result. Fixing the third lens group G3 during zooming can decrease deterioration of astigmatism due to positional shift of the third lens group G3.

In the zoom lens according to the present embodiment, it is preferable that the first lens group G1 is constituted by three lenses, which are, in order from the object, a first negative lens, a second negative lens and a positive lens. By this configuration, lateral chromatic aberration generated in the wide-angle end state can be corrected well.

In the zoom lens according to the present embodiment, it is preferable that at least one of the first negative lens and the second negative lens constituting the first lens group G1 has an aspherical surface. By this configuration, distortion generated in the wide-angle end state can be corrected well.

In the zoom lens according to the present embodiment, it is preferable that the second lens group G2 has positive lenses, and at least one of the positive lenses constituting the second lens group G2 has an aspherical surface. By this configuration, coma aberration can be corrected well.

In the zoom lens according to the present embodiment, it is preferable that an aperture stop for determining brightness is disposed between the first lens group G1 and the cemented lens having positive refractive power constituting the second lens group G2. By this configuration, fluctuation of spherical aberration during zooming can be corrected well.

In the zoom lens according to the present embodiment, it is preferable that a diaphragm for cutting unnecessary external light is disposed between the first lens group G1 and the second lens group G2, and moves upon zooming from the wide-angle end state to the telephoto end state. Since unnecessary external light in the wide-angle end state can be effectively cut by this configuration, coma aberration in the wide-angle end state can be corrected well.

FIG. 21 shows a digital still camera CAM (optical apparatus) having the zoom lens as an image capturing lens ZL, the configuration of which is as per the previous explanation.

Figure 23:
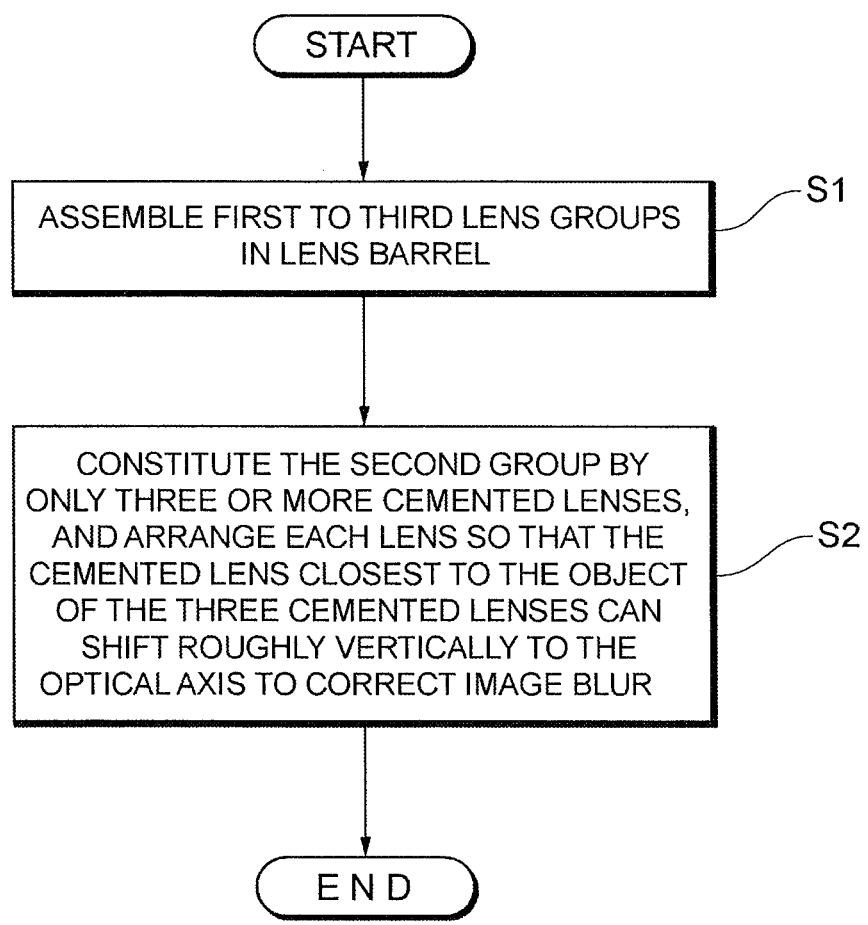
FIG. 23 is a flow chart depicting a second method of manufacturing the zoom lens according to the present embodiment.

Now a method of manufacturing the zoom lens having the above mentioned configuration will be described with reference to FIG. 23. First the first to third lens groups (e.g. first to third lens groups G1 to G3 in FIG. 9) are assembled in a lens barrel (step S1). In this assembling step, each lens is disposed so that the first lens group has negative refractive power, the second lens group has positive refractive power, and the third lens group has positive refractive power. The second lens group is constituted only by three or more cemented lenses, and each lens is disposed so that image blur can be corrected by shifting the cemented lens, which is disposed closest to the object among the second lens group, roughly vertically to the optical axis (step S2). When each lens is assembled in the lens barrel, each lens may be assembled in the lens barrel one at a time in order along the optical axis, or a part or all of the lenses may be integratedly held on a holding member, and then assembled in the lens barrel. After assembling each lens group in the lens barrel like this, it is checked whether the object image is formed in a state where each lens group is assembled in the lens barrel, that is, whether the center of each lens is aligned, and then various operations of the zoom lens are checked. Examples of the various operations are a zoom operation in which lens groups which perform zooming from the wide-angle end state to the telephoto end state (e.g. first lens group G1, diaphragms S1 and S2, and second lens group G2 in this embodiment) move along the optical axis, a focusing operation in which a lens group which performs focusing from an object at a long distance to an object at a short distance (e.g. third lens group G3 in this embodiment) moves along the optical axis, and a hand motion blur corrections operation in which at least a part of the lenses (e.g. at least a part of the second lens group G2 in this embodiment) move so as to have components orthogonal to the optical axis. The sequence of checking the various operations is arbitrary. According to this manufacturing method, a compact and ultra-high image quality zoom lens having an image blur correction function, which can support picture elements having larger sizes and higher resolutions compared with prior art, can be obtained.

Example 5 to Example 8

Example 5 to Example 8 according to the second embodiment will now be described with reference to the drawings. Table 5 to Table 8 are tables listing each data according to Example 5 to Example 8.

Example 5

Example 5 will now be described with reference to FIG. 9 to FIG. 11 and Table 5. FIG. 9 is a diagram depicting a configuration of a zoom lens ZL (ZL1) according to Example 5, and a zoom lens from a wide-angle end state (W) to a telephoto end state (T) thereof. As FIG. 9 shows, the zoom lens ZL1 according to Example 5 has, in order from an object, a first lens group G1 having negative refractive power, a second lens group G2 having positive refractive power, and a third lens group G3 having positive refractive power.

Upon zooming from the wide-angle end state to the telephoto end state, the first lens group G1 and the second lens group G2 move respectively so that the distance between the first lens group G1 and the second lens group G2 decreases, the distance between the second lens group G2 and the third lens group G3 increases, and the third lens group G3 is fixed.

The first lens group G1 is comprised of, in order from the object: a negative meniscus lens L11 having a convex surface facing the object; a negative meniscus lens L12 having a convex surface facing the object; and a positive meniscus lens L13 having a convex surface facing the object.

A diaphragm S1 for cutting unnecessary external light is disposed between the first lens group G1 and the second lens group G2, and moves toward the object upon zooming from the wide-angle end state to the telephoto end state.

The second lens group G2 is comprised of, in order from the object: a cemented lens of a negative meniscus lens L21 having a convex surface facing the object and a biconvex positive lens L22; a cemented lens of a biconvex positive lens L23 and a biconcave negative lens L24; and a cemented lens of a negative meniscus lens L25 having a convex surface facing the object and a biconvex positive lens L26.

In this example, image blur is corrected by shifting, roughly vertically to the optical axis, the cemented lens of the negative meniscus lens L21 having a convex surface facing the object and the biconvex positive lens L22, which is disposed closest to the object among the cemented lenses constituting the second lens group G2.

An aperture stop S2 for adjusting quantity of light is disposed between the biconvex positive lens L22 and the biconvex positive lens L23 constituting the second lens group G2, and moves, together with the second lens group G2, toward the object upon zooming from the wide-angle end state to the telephoto end state.

The third lens group G3 is constituted by a biconvex positive lens L31.

Between the third lens group G3 and the image plane I, a glass block G, such as a low pass filter and an infrared cut-off filter, for cutting off spatial frequencies exceeding a critical resolution of a picture element (e.g. CCD, CMOS), disposed on the image plane I, and a sensor cover glass CV of the picture element are disposed.

Table 5 shows each data value of Example 5. The surface numbers 1 to 23 in Table 5 correspond to the surfaces 1 to 23 in FIG. 9. In Example 5, the second surface, eighth surface and eighteenth surface are formed to be aspherical.

TABLE 5

[Lens Data]

| surface number | r | d | nd | vd |
|---|---|---|---|---|
| object surface | ∞ | | | |
| 1 | 38.7781 | 1.5000 | 1.806100 | 40.71 |
| 2(aspherical surface) | 9.2824 | 6.5000 | | |
| 3 | 183.8983 | 1.0000 | 1.729157 | 54.68 |
| 4 | 24.0042 | 1.5000 | | |
| 5 | 20.1101 | 3.3000 | 1.805181 | 25.42 |
| 6 | 101.4010 | D6 | | |
| 7(diaphragm) | ∞ | D7 | | |
| 8(aspherical surface) | 25.9620 | 1.2000 | 1.592014 | 67.02 |
| 9 | 16.7688 | 2.0000 | 1.618000 | 63.33 |
| 10 | −32.7003 | 1.0000 | | |
| 11(aperture stop) | ∞ | 0.8000 | | |
| 12 | 9.3921 | 2.9000 | 1.772499 | 49.60 |
| 13 | −450.5504 | 1.2000 | 1.800999 | 34.97 |
| 14 | 8.2370 | 1.2000 | | |
| 15 | 71.5552 | 1.3000 | 1.882997 | 40.76 |
| 16 | 8.1763 | 3.0000 | 1.497820 | 82.52 |
| 17 | −15.2902 | D17 | | |
| 18(aspherical surface) | 49.7019 | 3.0000 | 1.603001 | 65.44 |
| 19 | −92.2790 | 2.8200 | | |
| 20 | ∞ | 1.5900 | 1.516330 | 64.14 |
| 21 | ∞ | 1.0000 | | |
| 22 | ∞ | 0.7000 | 1.516330 | 64.14 |
| 23 | ∞ | Bf | | |
| image plane | ∞ | | | |

[Aspherical data]

second surface

κ = 0.5090, A4 = 7.82030E−06, A6 = 1.10540E−07, A8 = 0.00000E+00, A10 = 0.00000E+00 eighth surface

κ = 1.0000, A4 = −3.98800E−05, A6 = −7.73110E−08, A8 = 0.00000E+00, A10 = 0.00000E+00 eighteenth surface

κ = 1.0000, A4 = 2.24470E−06, A6 = 7.89090E−08, A8 = 0.00000E+00, A10 = 0.00000E+00

[General Data]
zoom ratio 2.8035

| | wide-angle end | intermediate position | telephoto end |
|---|---|---|---|
| f | 9.05996 | 17.69991 | 25.40001 |
| FNo | 2.89144 | 4.04720 | 5.08557 |
| ω | 44.65220 | 25.47754 | 18.28922 |
| Y | 8.35000 | 8.35000 | 8.35000 |

TABLE 5-continued

| TL | 72.75641 | 65.55254 | 69.03906 |
|---|---|---|---|
| Bf | 0.74678 | 0.74673 | 0.74652 |
| Bf(converted to air) | 6.07700 | 6.07695 | 6.07674 |

[Zooming Data]

| variable distance | wide-angle end | intermediate position | telephoto end |
|---|---|---|---|
| D6 | 15.59672 | 0.88573 | 0.76426 |
| D7 | 9.13980 | 6.57143 | 1.20000 |
| D17 | 9.76311 | 19.83865 | 28.81828 |

[Zoom lens group data]

| group number | first surface of group | focal length of group | total lens length |
|---|---|---|---|
| G1 | 1 | −19.17720 | 13.8 |
| G2 | 8 | 19.33903 | 14.6 |
| G3 | 18 | 54.00001 | 3.0 |

[Conditional Expression]

conditional expression (3) f2F/f2M = 0.079
conditional expression (4) f2F/f2MR = 0.07781
conditional expression (5) Dt23/Dt3i = 4.74
conditional expression (6) f2/f3 = 0.36

As the data table in Table 5 shows, the zoom lens ZL1 according to this example satisfies all the conditional expressions (3) to (6).

Figure 10A:
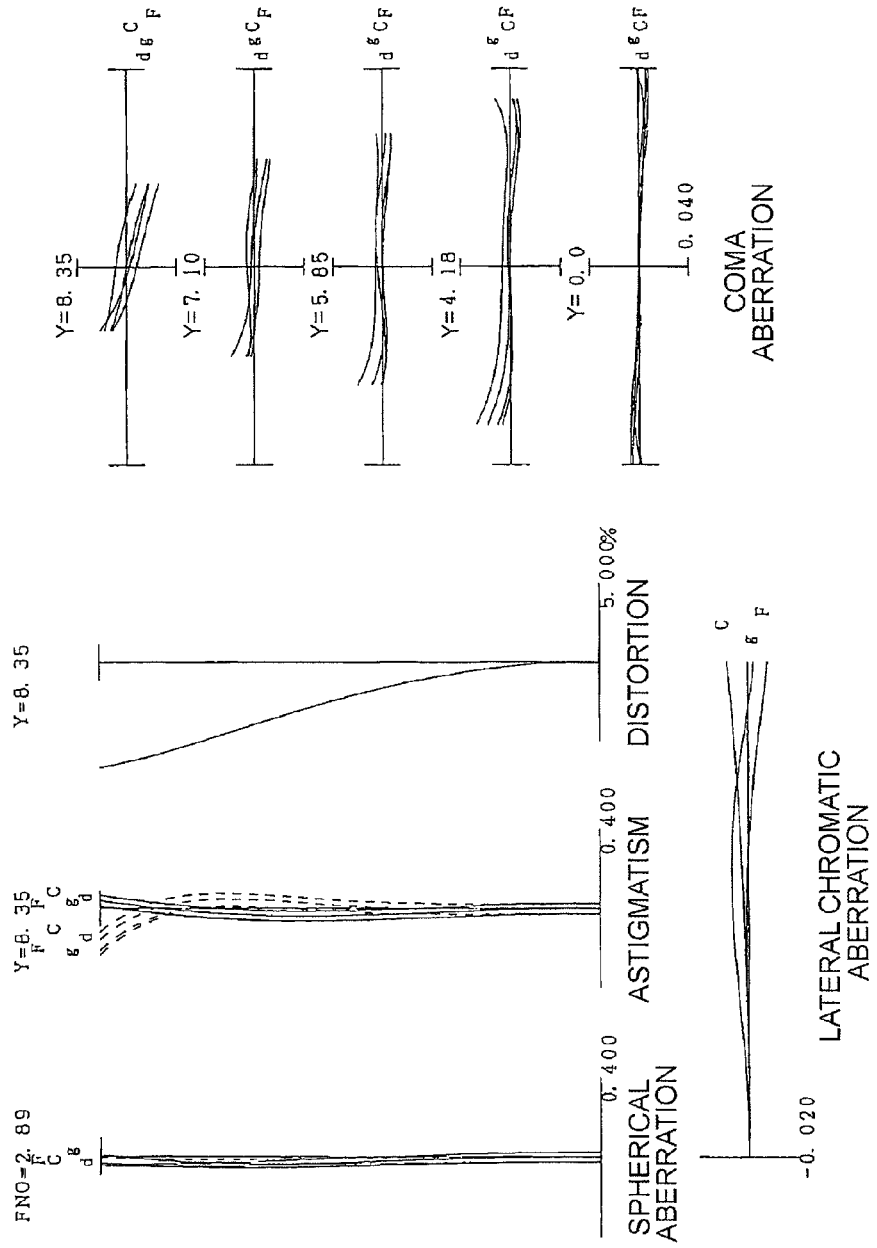
FIG. 10 are graphs showing various aberrations of the zoom lens according to Example 5, where FIG. 10A are graphs showing various aberrations of the zoom lens upon focusing on infinity in the wide-angle end state, FIG. 10B are graphs showing various aberrations of the zoom lens upon focusing on infinity in the intermediate focal length state, and FIG. 10C are graphs showing various aberrations of the zoom lens upon focusing on infinity in the telephoto end state.
Figure 10B:
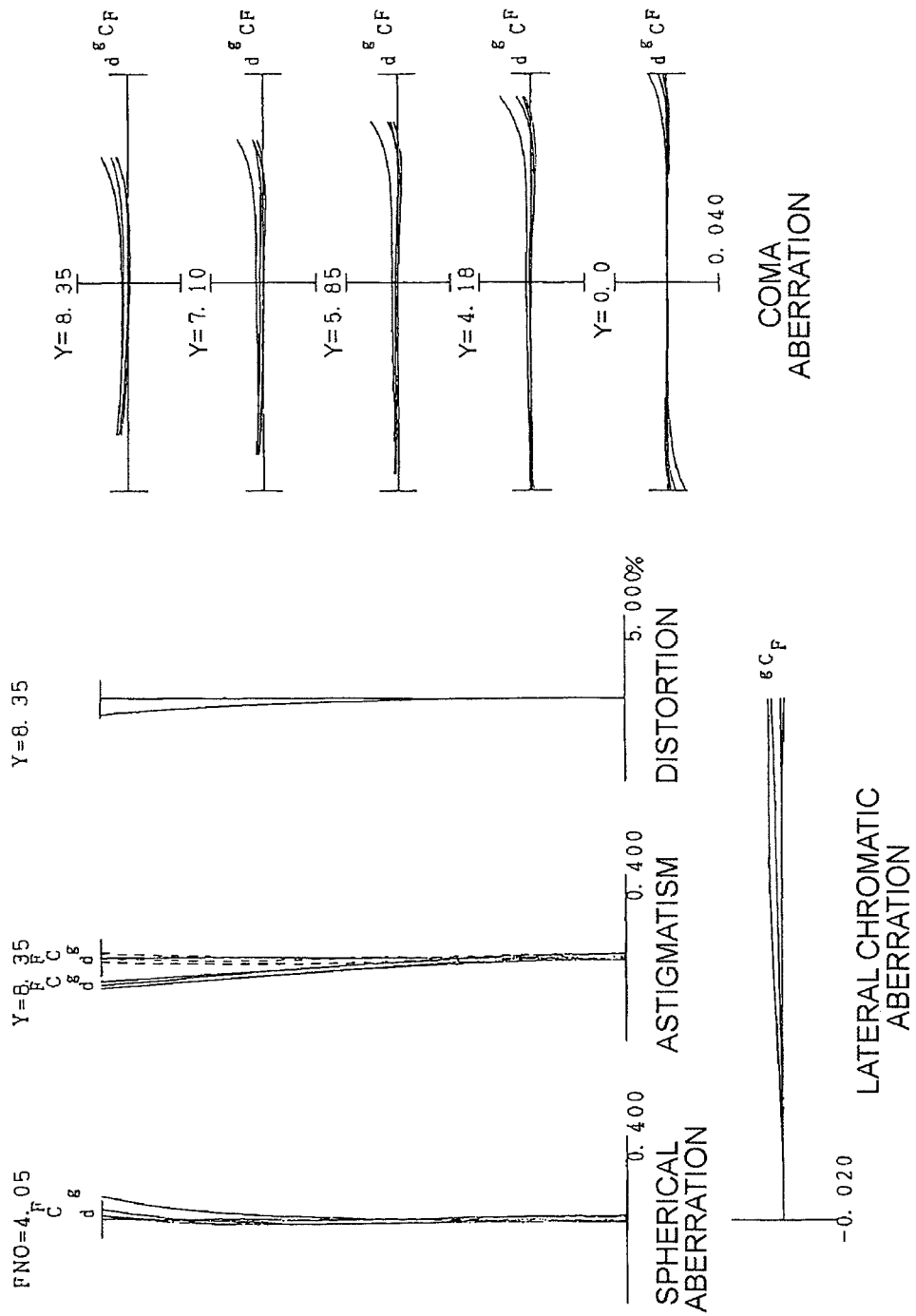
Figure 10C:
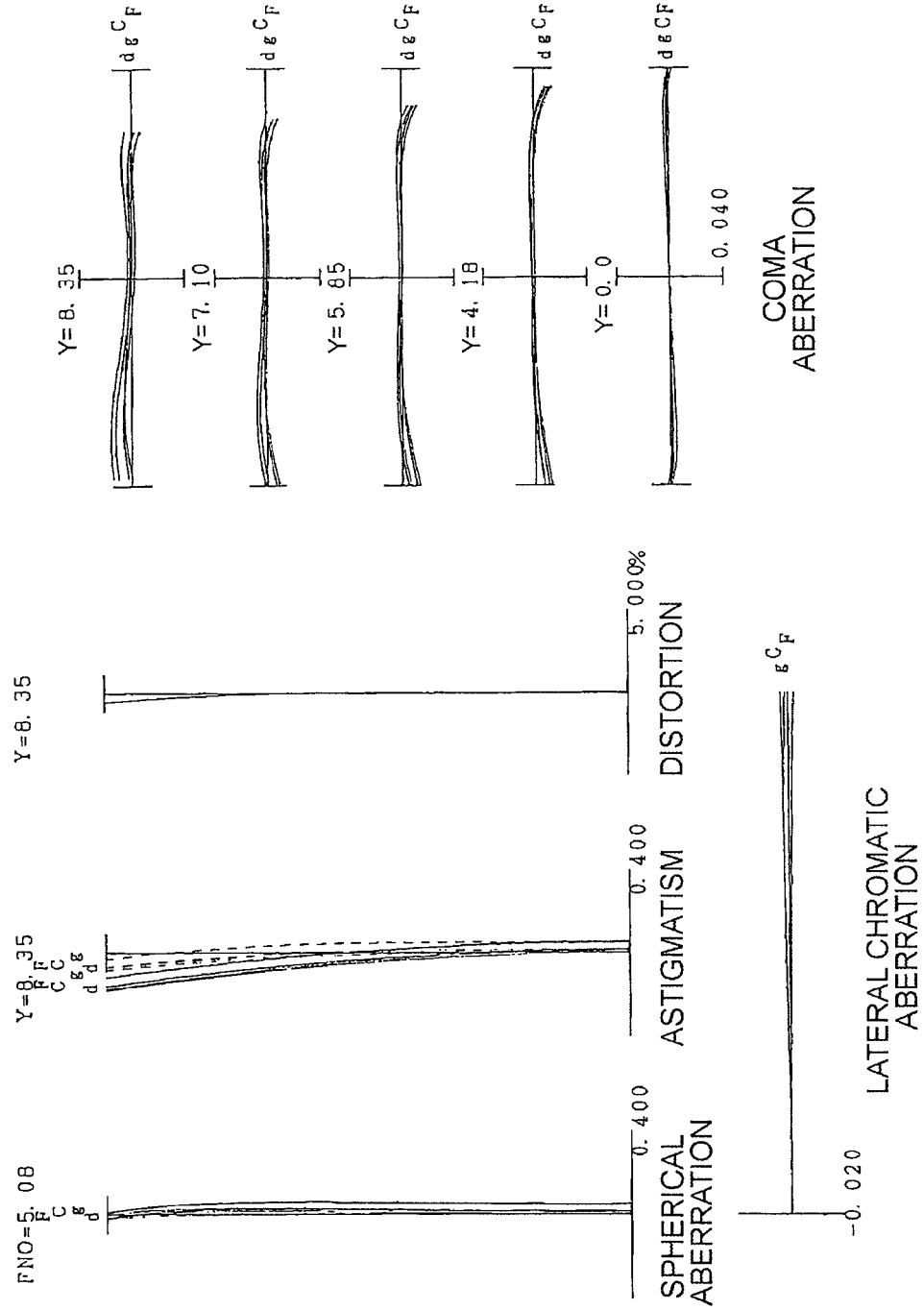
Figure 11A:
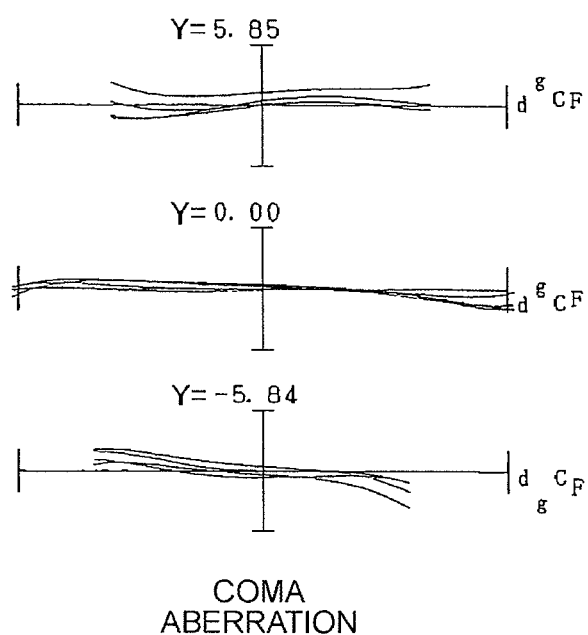
FIG. 11 are graphs showing various aberrations of the zoom lens according to Example 5 after image blur correction, where FIG. 11A are graphs showing various aberrations of the zoom lens upon focusing on infinity in the wide-angle end state after image blur correction, FIG. 11B are graphs showing various aberrations of the zoom lens upon focusing on infinity in the intermediate focal length state after image blur correction, and FIG. 11C are graphs showing various aberrations of the zoom lens upon focusing on infinity in the telephoto end state.
Figure 11B:
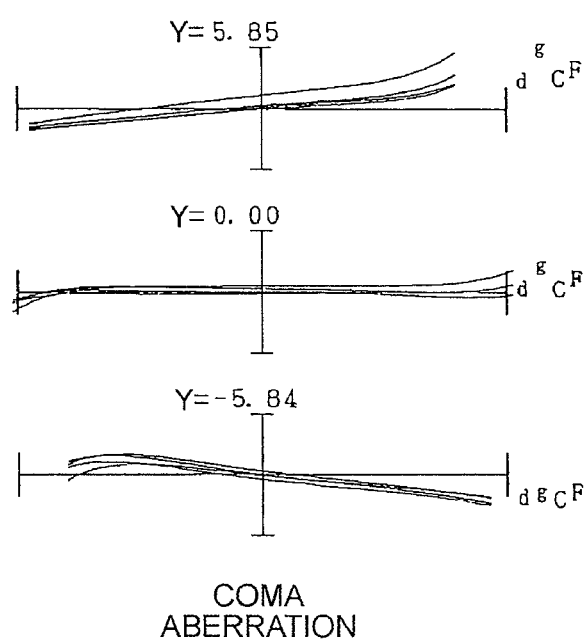

FIG. 10 to FIG. 11 are graphs showing various aberrations of the zoom lens ZL1 according to Example 1, FIG. 10A are graphs showing various aberrations of the zoom lens upon focusing on infinity in the wide-angle end state, FIG. 10B are graphs showing various aberrations of the zoom lens upon focusing on infinity in the intermediate focal length state, and FIG. 10C are graphs showing various aberrations of the zoom lens upon focusing on infinity in the telephoto end state. FIG. 11A, are graphs showing various aberrations of the zoom lens upon focusing on infinity in the wide-angle end state after image blur is corrected (after shifting 0.1 mm), FIG. 11B are graphs showing various aberrations of the zoom lens upon focusing on infinity in the intermediate focal length state after image blur is corrected (after shifting 0.1 mm), and FIG. 11C are graphs showing various aberrations of the zoom lens upon focusing on infinity in the telephoto end state after image blur is corrected (after shifting 0.1 mm).

In each graph showing aberrations, FNo denotes an F number, and Y denotes an image height. In the graph showing spherical aberrations, the solid line indicates spherical aberration, and the broken line indicates the sine condition. In the graph showing astigmatisms, the solid line indicates the sagittal image surface, and the broken line indicates the meridional image surface. In the graph showing coma aberrations, the solid line indicates the meridional coma. The description on the graphs showing aberrations is the same for the other examples, where this description is omitted.

In Example 5, as the respective graphs on aberrations show, various aberrations are corrected well in each focal length state from the wide-angle end state to the telephoto end state, and excellent image forming performance is exhibited.

Example 6

Example 6 will now be described with reference to FIG. 12 to FIG. 14 and Table 2. FIG. 12 is a diagram depicting a configuration of a zoom lens ZL (ZL2) according to Example 6, and a zoom lens from a wide-angle end state (W) to a telephoto end state (T) thereof. As FIG. 12 shows, the zoom lens ZL2 according to Example 6 has, in order from an object, a first lens group G1 having negative refractive power, a second lens group G2 having positive refractive power, and a third lens group G3 having positive refractive power.

Upon zooming from the wide-angle end state to the telephoto end state, the first lens group G1 and the second lens group G2 move respectively so that the distance between the first lens group G1 and the second lens group G2 decreases, the distance between the second lens group G2 and the third lens group G3 increases, and the third lens group G3 is fixed.

The first lens group G1 is comprised of, in order from the object: a negative meniscus lens L11 having a convex surface facing the object; a negative meniscus lens L12 having a convex surface facing the object; and a positive meniscus lens L13 having a convex surface facing the object.

A diaphragm S1 for cutting unnecessary external light is disposed between the first lens group G1 and the second lens group G2, and moves toward the object upon zooming from the wide-angle end state to the telephoto end state.

The second lens group G2 is comprised of, in order from the object: a cemented lens of a negative meniscus lens L21 having a convex surface facing the object and a biconvex positive lens L22; a cemented lens of a positive meniscus lens L23 having a convex surface facing the object and a negative meniscus lens L24 having a convex surface facing the object; and a cemented lens of a negative meniscus lens L25 having a convex surface facing the object and a biconvex positive lens L26.

In this example, image blur is corrected by shifting, roughly vertically to the optical axis, the cemented lens of the negative meniscus lens L21 having a convex surface facing the object and the biconvex positive lens L22, which is disposed closest to the object among the cemented lenses constituting the second lens group G2.

An aperture stop S2 for adjusting quantity of light is disposed between the biconvex positive lens L22 and the positive meniscus lens L23 having a convex surface facing the object constituting the second lens group G2, and moves, together with the second lens group G2, toward the object upon zooming from the wide-angle end state to the telephoto end state.

The third lens group G3 is constituted by a biconvex positive lens L31.

Between the third lens group G3 and the image plane I, a glass block G, such as a low pass filter and an infrared cut-off filter, for cutting off spatial frequencies exceeding a critical resolution of a picture element (e.g. CCD, CMOS), disposed on the image plane I, and a sensor cover glass CV of the picture element are disposed.

Table 6 shows each data value of Example 6. The surface numbers 1 to 23 in Table 6 correspond to the surfaces 1 to 23 in FIG. 12. In Example 6, the second surface, eighth surface and eighteenth surface are formed to be aspherical.

TABLE 6

[Lens Data]

| surface number | r | d | nd | vd |
|---|---|---|---|---|
| object surface | ∞ | | | |
| 1 | 39.6181 | 1.5000 | 1.806100 | 40.71 |
| 2(aspherical surface) | 9.3068 | 6.5000 | | |
| 3 | 147.3117 | 1.0000 | 1.729157 | 54.68 |
| 4 | 23.4401 | 1.5000 | | |
| 5 | 19.9275 | 3.3000 | 1.805181 | 25.42 |
| 6 | 96.4018 | D6 | | |
| 7(diaphragm) | ∞ | D7 | | |

TABLE 6-continued

| | | | | |
|---|---|---|---|---|
| 8(aspherical surface) | 27.4568 | 0.7000 | 1.592014 | 67.02 |
| 9 | 10.6595 | 2.5000 | 1.618000 | 63.33 |
| 10 | −32.0304 | 1.0000 | | |
| 11(aperture stop) | ∞ | 0.8000 | | |
| 12 | 9.0348 | 2.9000 | 1.772499 | 49.60 |
| 13 | 507.9539 | 1.0000 | 1.800999 | 34.97 |
| 14 | 8.2208 | 1.2000 | | |
| 15 | 82.7249 | 1.0000 | 1.882997 | 40.76 |
| 16 | 7.6793 | 3.0000 | 1.497820 | 82.52 |
| 17 | −14.9390 | D17 | | |
| 18(aspherical surface) | 49.5815 | 2.7000 | 1.603001 | 65.44 |
| 19 | −92.9175 | 3.0000 | | |
| 20 | ∞ | 1.5900 | 1.516330 | 64.14 |
| 21 | ∞ | 1.0000 | | |
| 22 | ∞ | 0.7000 | 1.516330 | 64.14 |
| 23 | ∞ | Bf | | |
| image plane | ∞ | | | |

[Aspherical data]

second surface

κ = 0.4995, A4 = 8.00570E−06, A6 = 1.10200E−07, A8 = 0.00000E+00, A10 = 0.00000E+00 eighth surface

κ = 1.0000, A4 = −4.18390E−05, A6 = −9.30920E−08, A8 = 0.00000E+00, A10 = 0.00000E+00 eighteenth surface

κ = 1.0000, A4 = 2.09510E−06, A6 = 7.83470E−08, A8 = 0.00000E+00, A10 = 0.00000E+00

[General Data]
zoom ratio 2.8035

| | wide-angle end | intermediate position | telephoto end |
|---|---|---|---|
| f | 9.05996 | 17.69991 | 25.40001 |
| FNo | 2.89342 | 4.04955 | 5.08823 |
| ω | 44.65324 | 25.47896 | 18.28836 |
| Y | 8.35000 | 8.35000 | 8.35000 |
| TL | 72.43416 | 65.23029 | 68.71681 |
| Bf | 0.68671 | 0.68666 | 0.68645 |
| Bf(converted to air) | 6.19693 | 6.19688 | 6.19667 |

[Zooming Data]

| variable distance | wide-angle end | intermediate position | telephoto end |
|---|---|---|---|
| D6 | 15.59672 | 0.88573 | 0.76426 |
| D7 | 9.13980 | 6.57143 | 1.20000 |
| D17 | 10.12093 | 20.19647 | 29.17610 |

[Zoom lens group data]

| group number | first surface of group | focal length of group | total lens length |
|---|---|---|---|
| G1 | 1 | −19.17720 | 13.8 |
| G2 | 8 | 19.33903 | 13.7 |
| G3 | 18 | 54.00001 | 2.7 |

[Conditional Expression]

conditional expression (3) f2F/f2M = 0.150
conditional expression (4) f2F/f2MR = 0.07596
conditional expression (5) Dt23/Dt3i = 4.71
conditional expression (6) f2/f3 = 0.36

As the data table in Table 6 shows, the zoom lens ZL2 according to this example satisfies all the conditional expressions (3) to (6).

Figure 13A:
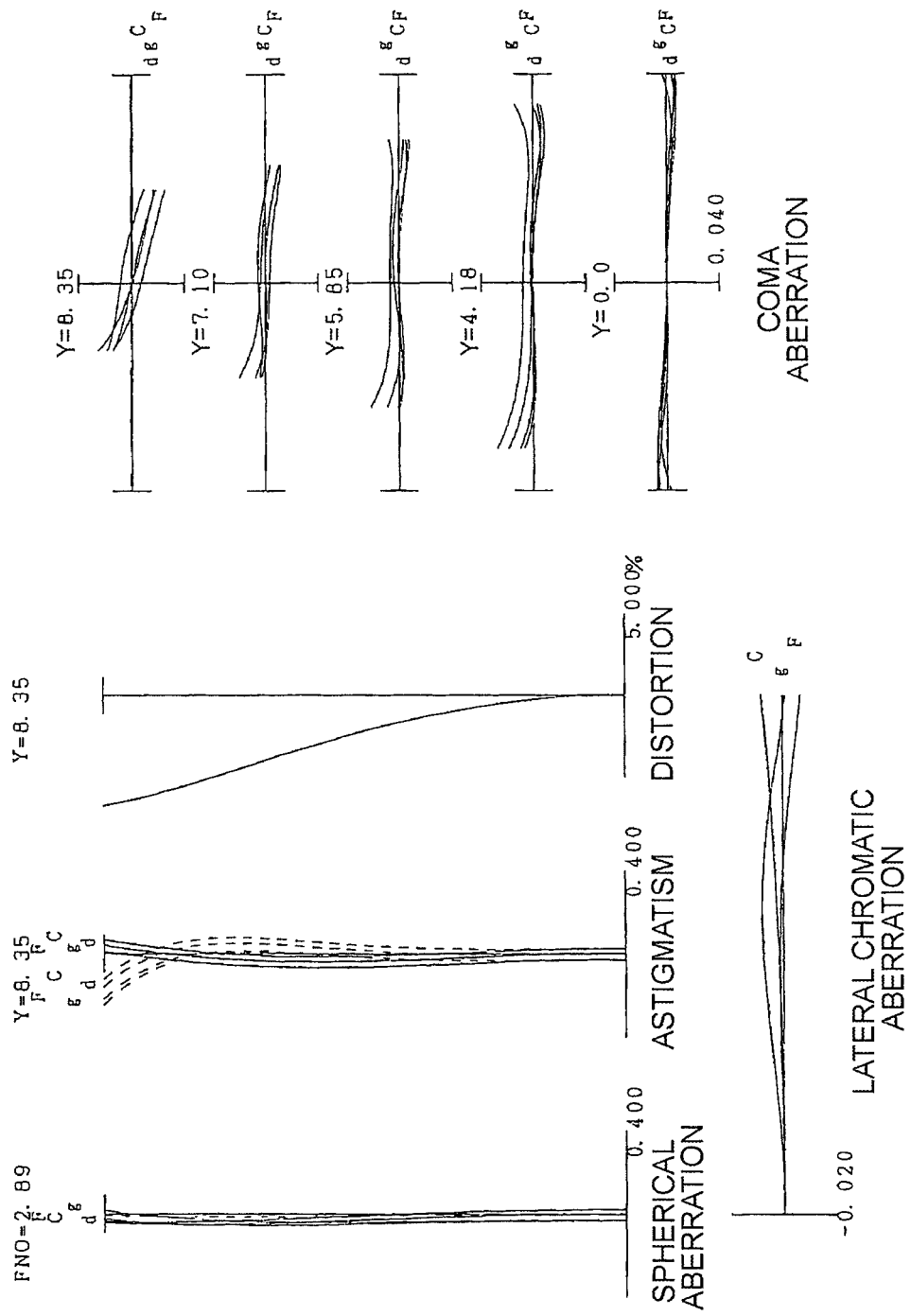
FIG. 13 are graphs showing various aberrations of the zoom lens according to Example 6, where FIG. 13A are graphs showing various aberrations of the zoom lens upon focusing on infinity in the wide-angle end state, FIG. 13B are graphs showing various aberrations of the zoom lens upon focusing on infinity in the intermediate focal length state, and FIG. 13C are graphs showing various aberrations of the zoom lens upon focusing on infinity in the telephoto end state.
Figure 13C:
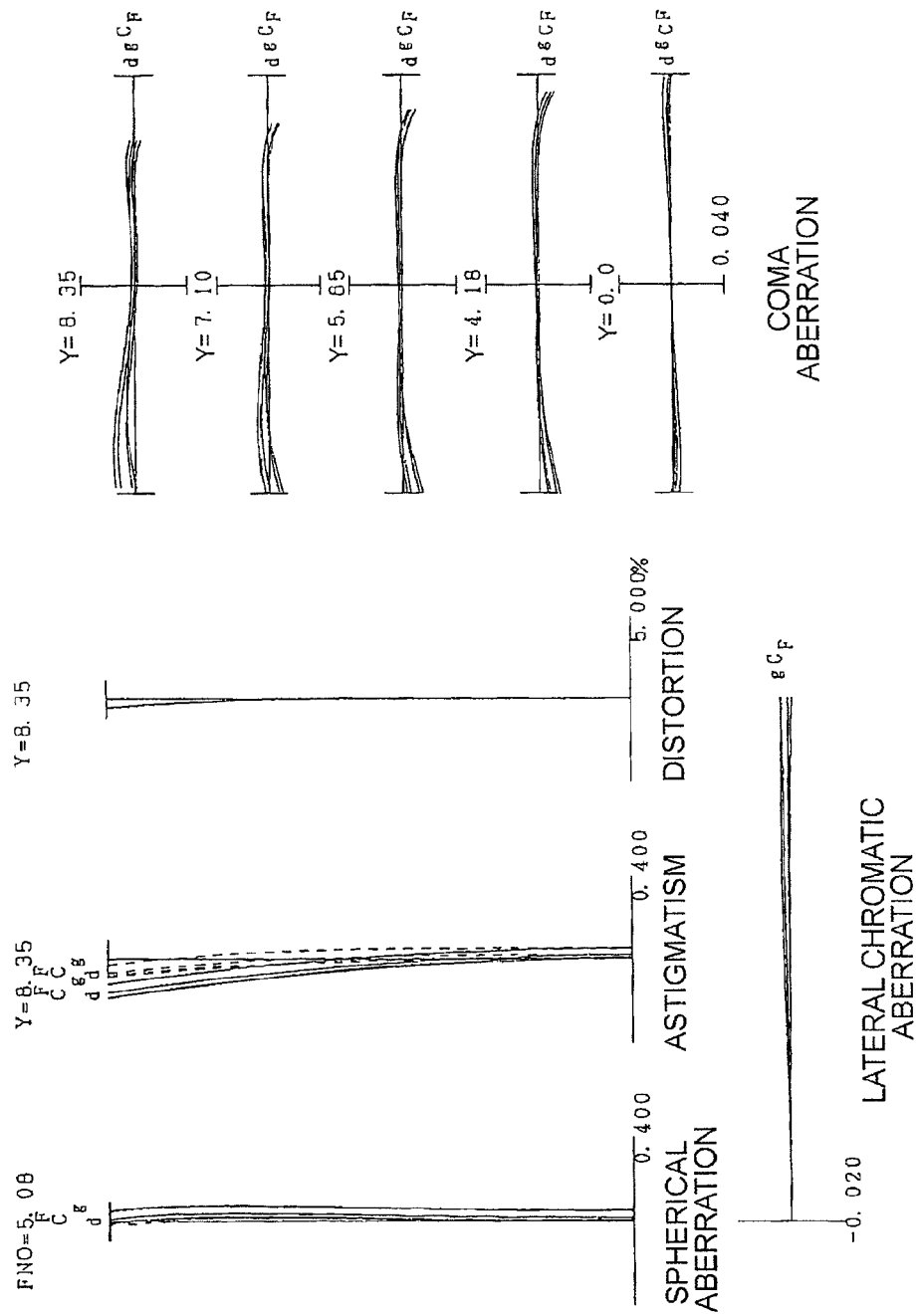
Figure 14A:
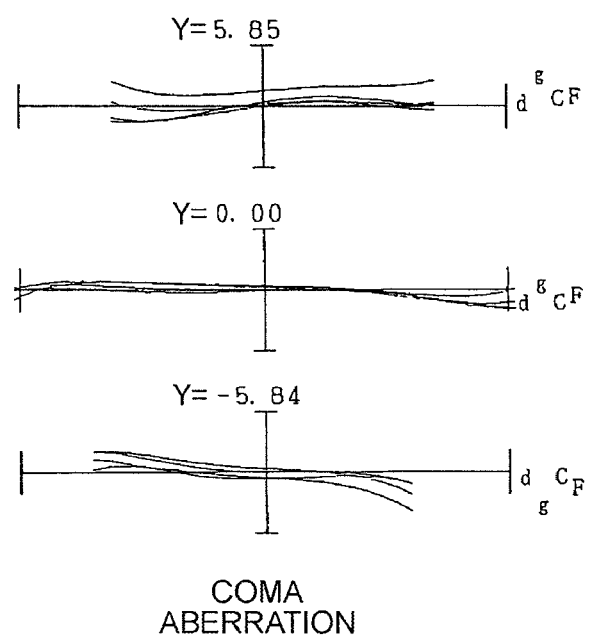
FIG. 14 are graphs showing various aberrations of the zoom lens according to Example 6 after image blur correction, where FIG. 14A are graphs showing various aberrations of the zoom lens upon focusing on infinity in the wide-angle end state after image blur correction, FIG. 14B are graphs showing various aberrations of the zoom lens upon focusing on infinity in the intermediate focal length state after image blur correction, and FIG. 14C are graphs showing various aberrations of the zoom lens upon focusing on infinity in the telephoto end state.

FIG. 13 to FIG. 14 are graphs showing various aberrations of the zoom lens ZL2 according to Example 6, FIG. 13A are graphs showing various aberrations of the zoom lens upon focusing on infinity in the wide-angle end state, FIG. 13B are graphs showing various aberrations of the zoom lens upon focusing on infinity in the intermediate focal length state, and FIG. 13C are graphs showing various aberrations of the zoom lens upon focusing on infinity in the telephoto end state. FIG. 14A are graphs showing various aberrations of the zoom lens upon focusing on infinity in the wide-angle end state after image blur is corrected (after shifting 0.1 mm), FIG. 11B are graphs showing various aberrations of the zoom lens upon focusing on infinity in the intermediate focal length state after image blur is corrected (after shifting 0.1 mm), and FIG. 14C are graphs showing various aberrations of the zoom lens upon focusing on infinity in the telephoto end state after image blur is corrected (after shifting 0.1 mm).

In Example 6, as the respective graphs on aberrations show, various aberrations are corrected well in each focal length state from the wide-angle end state to the telephoto end state, and excellent image forming performance is exhibited.

Example 7

Example 7 will now be described with reference to FIG. 15 to FIG. 17 and Table 7. FIG. 15 is a diagram depicting a configuration of a zoom lens ZL (ZL3) according to Example 7, and a zoom lens from a wide-angle end state (W) to a telephoto end state (T) thereof. As FIG. 15 shows, the zoom lens ZL3 according to Example 3 has, in order from an object, a first lens group G1 having negative refractive power, a second lens group G2 having positive refractive power, and a third lens group G3 having positive refractive power.

Upon zooming from the wide-angle end state to the telephoto end state, the first lens group G1 and the second lens group G2 move respectively so that the distance between the first lens group G1 and the second lens group G2 decreases, the distance between the second lens group G2 and the third lens group G3 increases, and the third lens group G3 is fixed.

The first lens group G1 is comprised of, in order from the object: a negative meniscus lens L11 having a convex surface facing the object; a negative meniscus lens L12 having a convex surface facing the object; and a positive meniscus lens L13 having a convex surface facing the object.

A diaphragm S1 for cutting unnecessary external light is disposed between the first lens group G1 and the second lens group G2, and moves toward the object upon zooming from the wide-angle end state to the telephoto end state.

The second lens group G2 is comprised of, in order from the object: a cemented lens of a negative meniscus lens L21 having a convex surface facing the object and a biconvex positive lens L22; a cemented lens of a positive meniscus lens L23 having a convex surface facing the object and a negative meniscus lens L24 having a convex surface facing the object; and a cemented lens of a negative meniscus lens L25 having a convex surface facing the object and a biconvex positive lens L26.

In this example, image blur is corrected by shifting, roughly vertically to the optical axis, the cemented lens of the negative meniscus lens L21 having a convex surface facing the object and the biconvex positive lens L22, which is disposed closest to the object among the cemented lenses constituting the second lens group G2.

An aperture stop S2 for adjusting quantity of light is disposed between the biconvex positive lens L22 and the positive meniscus lens L23 having a convex surface facing the object constituting the second lens group G2, and moves, together with the second lens group G2, toward the object upon zooming from the wide-angle end state to the telephoto end state.

The third lens group G3 is constituted by a biconvex positive lens L31.

Between the third lens group G3 and the image plane I, a glass block G, such as a low pass filter and an infrared cut-off filter, for cutting off spatial frequencies exceeding a critical resolution of a picture element (e.g. CCD, CMOS), disposed on the image plane I, and a sensor cover glass CV of the picture element are disposed.

Table 7 shows each data value of Example 7. The surface numbers 1 to 23 in Table 7 correspond to the surfaces 1 to 23 in FIG. 15. In Example 7, the second surface, eighth surface and eighteenth surface are formed to be aspherical.

TABLE 7

[Lens Data]

| surface number | r | d | nd | vd |
|---|---|---|---|---|
| object surface | ∞ | | | |
| 1 | 39.9468 | 1.5000 | 1.806100 | 40.71 |
| 2(aspherical surface) | 9.3127 | 6.5000 | | |
| 3 | 134.4231 | 1.0000 | 1.729157 | 54.68 |
| 4 | 23.1778 | 1.5000 | | |
| 5 | 19.8394 | 3.3000 | 1.805181 | 25.42 |
| 6 | 94.1569 | D6 | | |
| 7(diaphragm) | ∞ | D7 | | |
| 8(aspherical surface) | 28.2189 | 0.5000 | 1.592014 | 67.02 |
| 9 | 8.5125 | 2.7000 | 1.618000 | 63.33 |
| 10 | −30.6475 | 1.0000 | | |
| 11(aperture stop) | ∞ | 0.8000 | | |
| 12 | 8.8356 | 2.7000 | 1.772499 | 49.60 |
| 13 | 156.2450 | 1.0000 | 1.800999 | 34.97 |
| 14 | 8.1151 | 1.2000 | | |
| 15 | 127.0139 | 1.0000 | 1.882997 | 40.76 |
| 16 | 7.6682 | 2.8000 | 1.497820 | 82.52 |
| 17 | −14.1568 | D17 | | |
| 18(aspherical surface) | 50.3497 | 2.7000 | 1.603001 | 65.44 |
| 19 | −90.3109 | 2.8200 | | |
| 20 | ∞ | 1.5900 | 1.516330 | 64.14 |
| 21 | ∞ | 1.0000 | | |
| 22 | ∞ | 0.7000 | 1.516330 | 64.14 |
| 23 | ∞ | Bf | | |
| image plane | ∞ | | | |

[Aspherical data]

second surface

κ = 0.4970, A4 = 7.96450E−06, A6 = 1.06220E−07, A8 = 0.00000E+00, A10 = 0.00000E+00 eighth surface

κ = 1.0000, A4 = −4.72990E−05, A6 = −1.58230E−07, A8 = 0.00000E+00, A10 = 0.00000E+00 eighteenth surface

κ = 1.0000, A4 = 2.00560E−06, A6 = 7.62370E−08, A8 = 0.00000E+00, A10 = 0.00000E+00

[General Data]
zoom ratio 2.8035

| | wide-angle end | intermediate position | telephoto end |
|---|---|---|---|
| f | 9.05996 | 17.69991 | 25.40001 |
| FNo | 2.89172 | 4.04711 | 5.08512 |
| ω | 44.65472 | 25.47901 | 18.28788 |
| Y | 8.35000 | 8.35000 | 8.35000 |
| TL | 72.28636 | 65.08249 | 68.56901 |

TABLE 7-continued

| | | | |
|---|---|---|---|
| Bf | 0.88358 | 0.88353 | 0.88332 |
| Bf(converted to air) | 6.21381 | 6.21376 | 6.21355 |

[Zooming Data]

| variable distance | wide-angle end | intermediate position | telephoto end |
|---|---|---|---|
| D6 | 15.59672 | 0.88573 | 0.76426 |
| D7 | 9.13979 | 6.57142 | 1.19999 |
| D17 | 10.35627 | 20.43181 | 29.41144 |

[Zoom lens group data]

| group number | first surface of group | focal length of group | total lens length |
|---|---|---|---|
| G1 | 1 | −19.17720 | 13.8 |
| G2 | 8 | 19.33903 | 13.7 |
| G3 | 18 | 54.00001 | 2.7 |

[Conditional Expression]

conditional expression (3) f2F/f2M = 0.158
conditional expression (4) f2F/f2MR = 0.05068
conditional expression (5) Dt23/Dt3i = 4.73
conditional expression (6) f2/f3 = 0.36

As the data table in Table 7 shows, the zoom lens ZL3 according to this example satisfies all the conditional expressions (3) to (6).

Figure 16A:
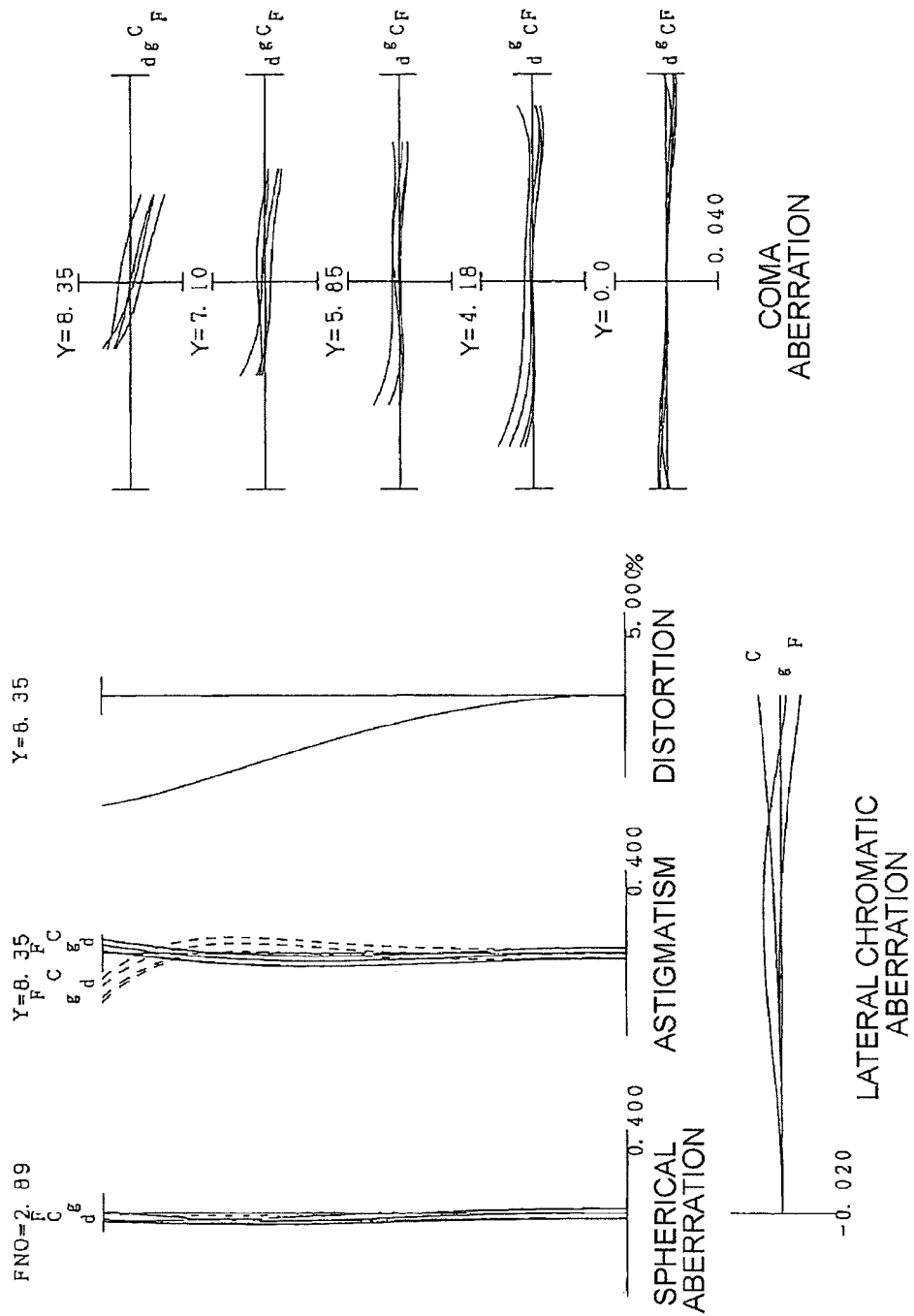
FIG. 16 are graphs showing various aberrations of the zoom lens according to Example 7, where FIG. 16A are graphs showing various aberrations of the zoom lens upon focusing on infinity in the wide-angle end state, FIG. 16B are graphs showing various aberrations of the zoom lens upon focusing on infinity in the intermediate focal length state, and FIG. 16C are graphs showing various aberrations of the zoom lens upon focusing on infinity in the telephoto end state.
Figure 16B:
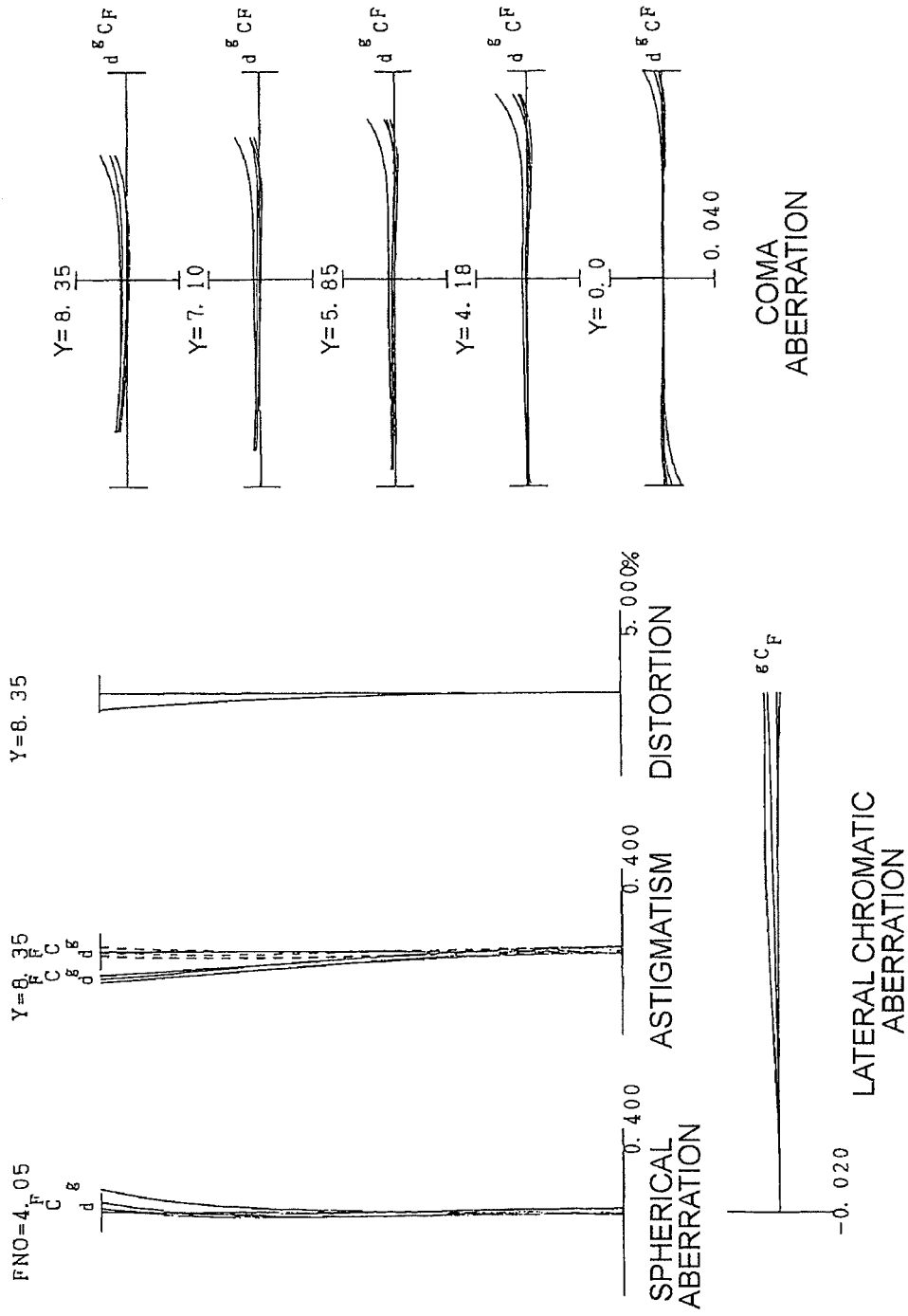
Figure 17A:
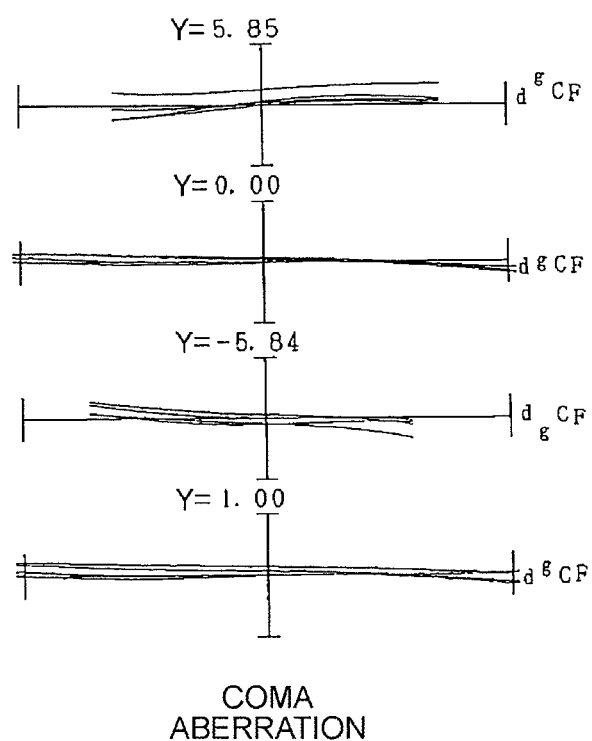
FIG. 17 are graphs showing various aberrations of the zoom lens according to Example 7 after image blur correction, where FIG. 17A are graphs showing various aberrations of the zoom lens upon focusing on infinity in the wide-angle end state after image blur correction, FIG. 17B are graphs showing various aberrations of the zoom lens upon focusing on infinity in the intermediate focal length state after image blur correction, and FIG. 17C are graphs showing various aberrations of the zoom lens upon focusing on infinity in the telephoto end state.
Figure 17B:
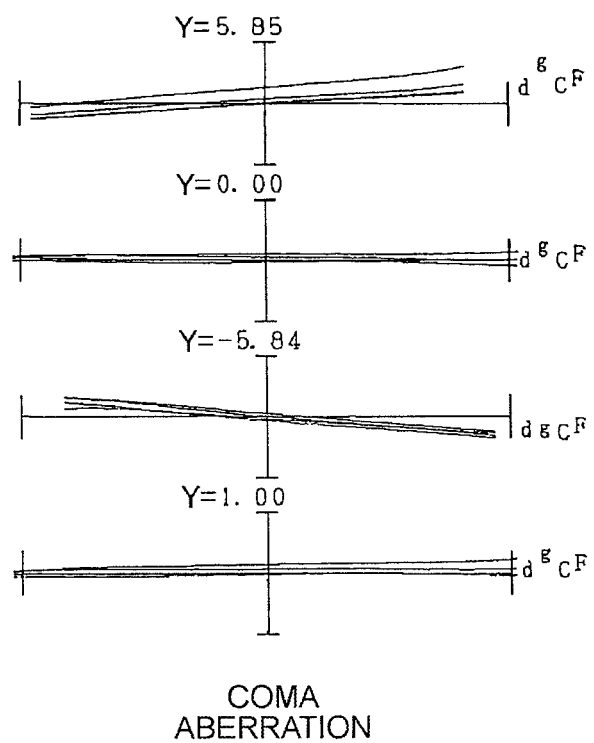

FIG. 16 to FIG. 17 are graphs showing various aberrations of the zoom lens ZL3 according to Example 7, FIG. 16A are graphs showing various aberrations of the zoom lens upon focusing on infinity in the wide-angle end state, FIG. 16B are graphs showing various aberrations of the zoom lens upon focusing on infinity in the intermediate focal length state, and FIG. 16C are graphs showing various aberrations of the zoom lens upon focusing on infinity in the telephoto end state. FIG. 17A are graphs showing various aberrations of the zoom lens upon focusing on infinity in the wide-angle end state after image blur is corrected (after shifting 0.1 mm), FIG. 17B are graphs showing various aberrations of the zoom lens upon focusing on infinity in the intermediate focal length state after image blur is corrected (after shifting 0.1 mm), and FIG. 17C are graphs showing various aberrations of the zoom lens upon focusing on infinity in the telephoto end state after image blur is corrected (after shifting 0.1 mm).

In Example 7, as the respective graphs on aberrations show, various aberrations are corrected well in each focal length state from the wide-angle end state to the telephoto end state, and excellent image forming performance is exhibited.

Example 8

Example 8 will now be described with reference to FIG. 18 to FIG. 20 and Table 8. FIG. 18 is a diagram depicting a configuration of a zoom lens ZL (ZL4) according to Example 8, and a zoom lens from a wide-angle end state (W) to a telephoto end state (T) thereof. As FIG. 18 shows, the zoom lens ZL4 according to Example 8 has, in order from an object, a first lens group G1 having negative refractive power, a second lens group G2 having positive refractive power, and a third lens group G3 having positive refractive power.

Upon zooming from the wide-angle end state to the telephoto end state, the first lens group G1 and the second lens group G2 move respectively so that the distance between the first lens group G1 and the second lens group G2 decreases, the distance between the second lens group G2 and the third lens group G3 increases, and the third lens group G3 is fixed.

The first lens group G1 is comprised of, in order from the object: a negative meniscus lens L11 having a convex surface facing the object; a negative meniscus lens L12 having a convex surface facing the object; and a positive meniscus lens L13 having a convex surface facing the object.

A diaphragm S1 for cutting unnecessary external light is disposed between the first lens group G1 and the second lens group G2, and moves toward the object upon zooming from the wide-angle end state to the telephoto end state.

The second lens group G2 is comprised of, in order from the object: a cemented lens of a negative meniscus lens L21 having a convex surface facing the object and a biconvex positive lens L22; a cemented lens of a positive meniscus lens L23 having a convex surface facing the object and a negative meniscus lens L24 having a convex surface facing the object; and a cemented lens of a negative meniscus lens L25 having a convex surface facing the object and a biconvex positive lens L26.

In this example, image blur is corrected by shifting, roughly vertically to the optical axis, the cemented lens of the negative meniscus lens L21 having a convex surface facing the object and the biconvex positive lens L22, which is disposed closest to the object among the cemented lenses constituting the second lens group G2.

An aperture stop S2 for adjusting quantity of light is disposed between the biconvex positive lens L22 and the positive meniscus lens L23 having a convex surface facing the object constituting the second lens group G2, and moves, together with the second lens group G2, toward the object upon zooming from the wide-angle end state to the telephoto end state.

The third lens group G3 is constituted by a biconvex positive lens L31.

Between the third lens group G3 and the image plane I, a glass block G, such as a low pass filter and an infrared cut-off filter, for cutting off spatial frequencies exceeding a critical resolution of a picture element (e.g. CCD, CMOS), disposed on the Image plane I, and a sensor cover glass CV of the picture element are disposed.

Table 8 shows each data value of Example 8. The surface numbers 1 to 23 in Table 8 correspond to the surfaces 1 to 23 in FIG. 18. In Example 8, the second surface, eighth surface and eighteenth surface are formed to be aspherical.

TABLE 8

[Lens Data]

| surface number | r | d | nd | vd |
|---|---|---|---|---|
| object surface | ∞ | | | |
| 1 | 38.8376 | 1.5000 | 1.806100 | 40.71 |
| 2(aspherical surface) | 9.2768 | 6.5000 | | |
| 3 | 175.0898 | 1.0000 | 1.729157 | 54.68 |
| 4 | 23.9322 | 1.5000 | | |
| 5 | 20.0633 | 3.3000 | 1.805181 | 25.42 |
| 6 | 99.7720 | D6 | | |
| 7(diaphragm) | ∞ | D7 | | |
| 8(aspherical surface) | 22.7320 | 1.0000 | 1.592014 | 67.02 |
| 9 | 32.5585 | 2.0000 | 1.618000 | 63.33 |
| 10 | −34.8847 | 1.1000 | | |
| 11(aperture stop) | ∞ | 1.0000 | | |
| 12 | 9.2861 | 2.9000 | 1.772499 | 49.60 |
| 13 | 665.9355 | 1.0000 | 1.800999 | 34.97 |
| 14 | 7.8954 | 1.3000 | | |
| 15 | 64.4515 | 1.0000 | 1.882997 | 40.76 |
| 16 | 8.5043 | 3.0000 | 1.497820 | 82.52 |
| 17 | −15.6727 | D17 | | |
| 18(aspherical surface) | 48.3299 | 2.7000 | 1.603001 | 65.44 |
| 19 | −97.7082 | 2.8200 | | |
| 20 | ∞ | 1.5900 | 1.516330 | 64.14 |
| 21 | ∞ | 1.0000 | | |

TABLE 8-continued

| 22 | ∞ | 0.7000 | 1.516330 | 64.14 |
|---|---|---|---|---|
| 23 | ∞ | Bf | | |
| image plane | ∞ | | | |

[Aspherical data]

second surface

κ = 0.5074, A4 = 7.91410E−06, A6 = 1.13200E−07, A8 = 0.00000E+00, A10 = 0.00000E+00 eighth surface

κ = 1.0000, A4 = −4.17380E−05, A6 = −8.31640E−08, A8 = 0.00000E+00, A10 = 0.00000E+00 eighteenth surface

κ = 1.0000, A4 = 2.41550E−06, A6 = 8.03010E−08, A8 = 0.00000E+00, A10 = 0.00000E+00

[General Data]
zoom ratio 2.8035

| | wide-angle end | intermediate position | telephoto end |
|---|---|---|---|
| f | 9.05996 | 17.69991 | 25.40001 |
| FNo | 2.87254 | 4.02099 | 5.05298 |
| ω | 44.65485 | 25.47852 | 18.28932 |
| Y | 8.35000 | 8.35000 | 8.35000 |
| TL | 72.32302 | 65.11915 | 68.60567 |
| Bf | 0.83806 | 0.83801 | 0.83780 |
| Bf(converted to air) | 6.16828 | 6.16824 | 6.16803 |

[Zooming Data]

| variable distance | wide-angle end | intermediate position | telephoto end |
|---|---|---|---|
| D6 | 15.59673 | 0.88574 | 0.76427 |
| D7 | 9.13980 | 6.57143 | 1.20000 |
| D17 | 9.83843 | 19.91397 | 28.89360 |

[Zoom lens group data]

| group number | first surface of group | focal length of group | total lens length |
|---|---|---|---|
| G1 | 1 | −19.17720 | 13.8 |
| G2 | 8 | 19.33903 | 14.3 |
| G3 | 18 | 54.00001 | 2.7 |

[Conditional Expression]

conditional expression (3) f2F/f2M = 0.006
conditional expression (4) f2F/f2MR = 0.04812
conditional expression (5) Dt23/Dt3i = 4.68
conditional expression (6) f2/f3 = 0.36

As the data table in Table 8 shows, the zoom lens ZL4 according to this example satisfies all the conditional expressions (3) to (6).

Figure 19A:
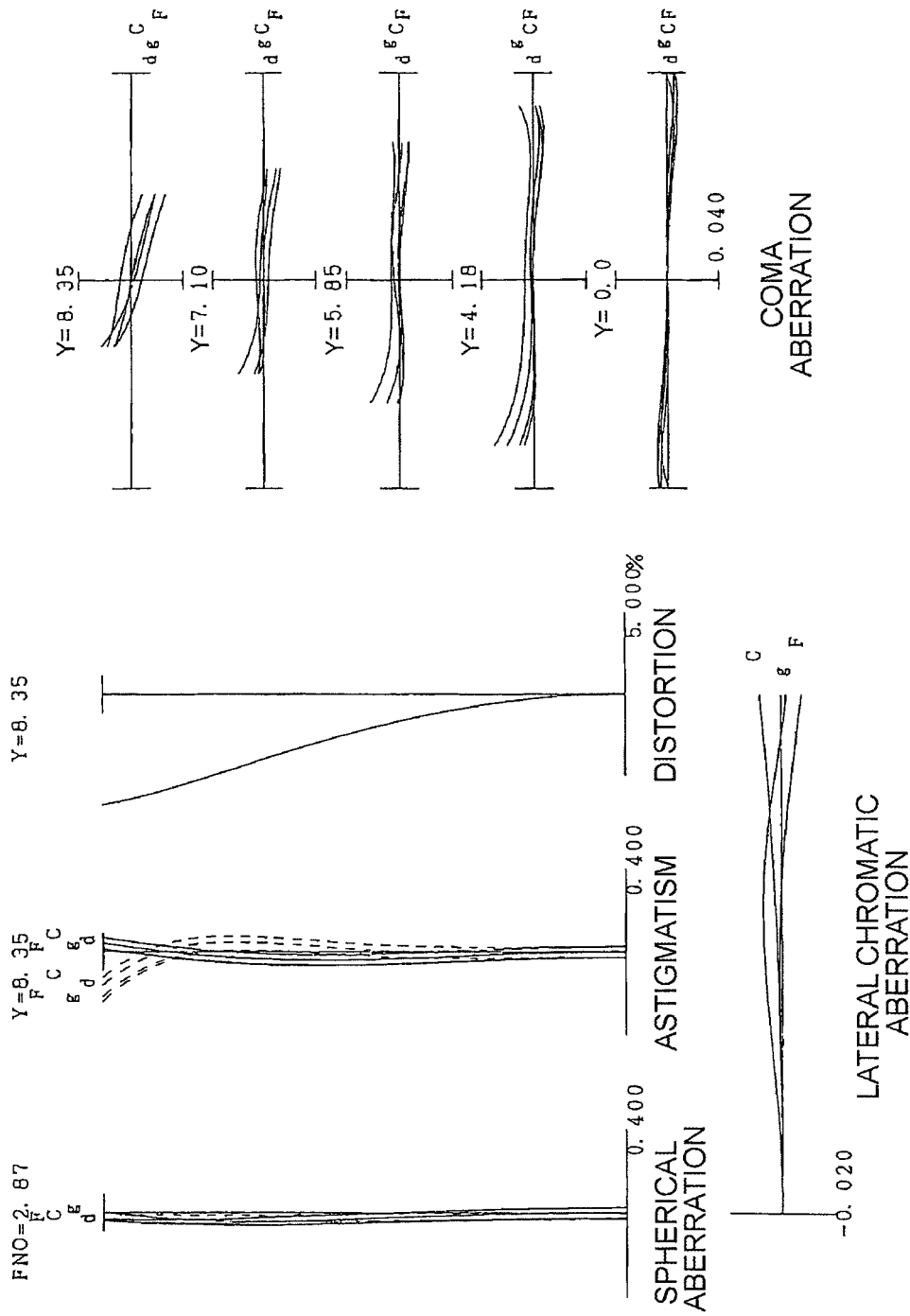
FIG. 19 are graphs showing various aberrations of the zoom lens according to Example 8, where FIG. 19A are graphs showing various aberrations of the zoom lens upon focusing on infinity in the wide-angle end state, FIG. 19B are graphs showing various aberrations of the zoom lens upon focusing on infinity in the intermediate focal length state, and FIG. 19C are graphs showing various aberrations of the zoom lens upon focusing on infinity in the telephoto end state.
Figure 20A:
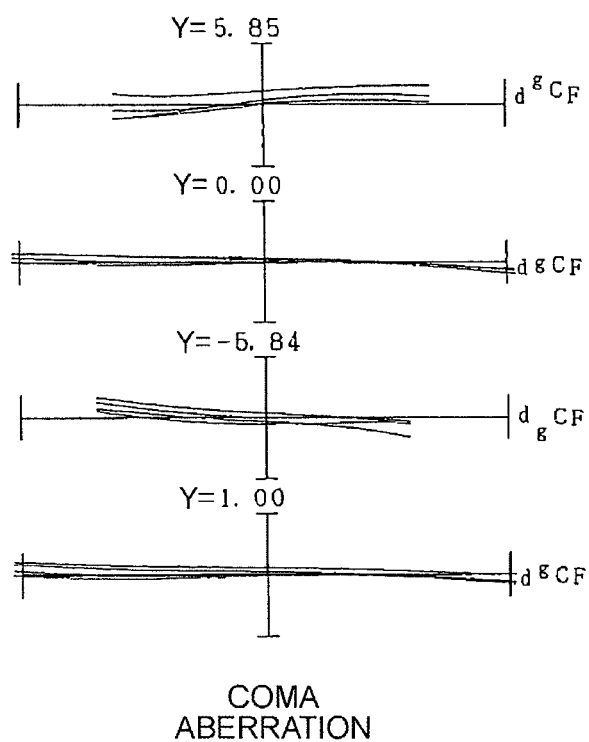
FIG. 20 are graphs showing various aberrations of the zoom lens according to Example 8 after image blur correction, where FIG. 20A are graphs showing various aberrations of the zoom lens upon focusing on infinity in the wide-angle end state after image blur correction, FIG. 20B are graphs showing various aberrations of the zoom lens upon focusing on infinity in the intermediate focal length state after image blur correction, and FIG. 20C are graphs showing various aberrations of the zoom lens upon focusing on infinity in the telephoto end state.
Figure 20B:
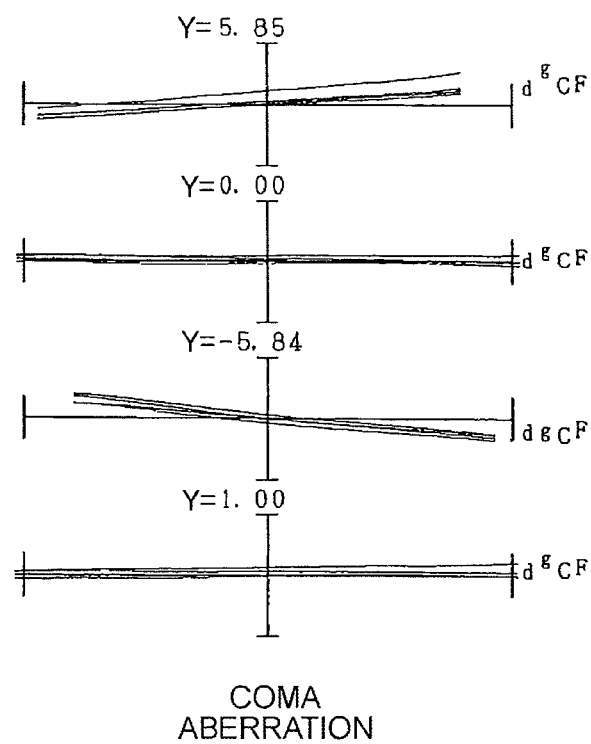
Figure 20C:
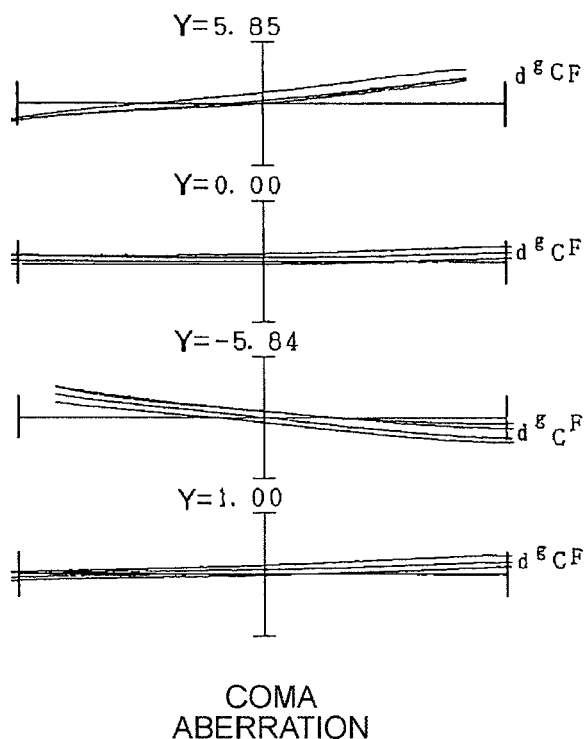

FIG. 19 to FIG. 20 are graphs showing various aberrations of the zoom lens ZL4 according to Example 8, FIG. 19A are graphs showing various aberrations of the zoom lens upon focusing on infinity in the wide-angle end state, FIG. 19B are graphs showing various aberrations of the zoom lens upon focusing on infinity in the intermediate focal length state, and FIG. 19C are graphs showing various aberrations of the zoom lens upon focusing on infinity in the telephoto end state. FIG. 20A are graphs showing various aberrations of the zoom lens upon focusing on infinity in the wide-angle end state after image blur is corrected (after shifting 0.1 mm), FIG. 20B are graphs showing various aberrations of the zoom lens upon focusing on infinity in the intermediate focal length state after image blur is corrected (after shifting 0.1 mm), and FIG. 20C are graphs showing various aberrations of the zoom lens upon focusing on infinity in the telephoto end state after image blur is corrected (after shifting 0.1 mm).

In Example 8, as the respective graphs on aberrations show, various aberrations are corrected well in each focal length state from the wide-angle end state to the telephoto end state, and excellent image forming performance is exhibited.

In the first and second embodiments, the following contents can be adopted within a range where optical performance is not diminished.

In each example, the zoom lens comprised of three lens groups was shown, but the present invention can also be applied to a configuration using a different number of lens groups, such as four lens groups. In the configuration, a lens or a lens group may be added to the side closest to the object, or a lens or a lens group may be added to the side closest to the image. A "lens group" refers to a portion having at least one lens isolated by an air space which changes upon zooming.

In the present embodiment, a single or a plurality of lens group(s) or a partial lens group may be designed to be a focusing lens group which performs focusing from an object at infinity to an object at close distance by moving in the optical axis direction. This focusing lens group can be applied to auto focus, and is also suitable for driving a motor for auto focusing (e.g. driving using an ultrasonic motor). It is particularly preferable that the third lens group is designed to be the focusing lens group.

In the present embodiment, a lens group or a partial lens group may be designed to be a vibration isolating lens group, which corrects image blurs generated by hand motion by moving the lens group or the partial lens group in a direction perpendicular to the optical axis or rotating (oscillating) the lens group or the partial lens group in an in-plane direction including the optical axis. It is particularly preferable that at least a part of the second lens group is designed to be the vibration-isolating lens group.

In the present embodiment, the lens surface may be formed to be a spherical surface or a plane, or an aspherical surface. If the lens surface is a spherical surface or a plane, lens processing, assembly and adjustment are easy, and deterioration of optical performance, due to an error in processing, assembly and adjustment, can be prevented, which is desirable. Even if the image plane is shifted, the drawing performance is not affected very much, which is desirable. If the lens surface is an aspherical surface, the aspherical surface can be any aspherical surface out of an aspherical surface generated by grinding, a glass molded aspherical surface generated by forming glass in an aspherical shape using a die, and a composite-aspherical surface generated by forming a resin on the surface of the graph to be an aspherical shape. The lens surface may be a diffraction surface, and the lens may be a refractive index distributed lens (GRIN lens) or a plastic lens.

In the present embodiment, it is preferable that the aperture stop is disposed among or near the second lens group, but the role of the aperture stop may be substituted by the frame of the lens, without disposing a separate element as the aperture stop.

In the present embodiment, each lens surface may be coated with an anti-reflection film which has high transmittance in a wide wavelength region, in order to decrease flares and ghosts, and implement a high optical performance with high contrast.

The zoom ratio of the zoom lens (zooming optical system) of the present embodiment is about 1.5 to 6.

In the zoom lens (zooming optical system) of the present embodiment, it is preferable that the first lens group has one positive lens component and two negative lens components. It is preferable that the lens components are disposed, in order from the object, to be in the sequence of negative, negative and positive, with air distance there between.

In the zoom lens (zooming optical system) of the present embodiment, it is preferable that the second lens group has two positive lens components and one negative lens component. It is preferable that the lens components are disposed, in order from the object, to be in the sequence of positive, positive and negative, with air distance there between.

In the zoom lens (zooming optical system) of the present embodiment, it is preferable that the third lens group has one positive lens component.

As described above, the present invention can provide a compact and ultra-high image quality zoom lens and optical apparatus, which are suitable for a video camera and electronic still camera using solid state picture elements, and can support picture elements having larger sizes and higher resolutions compared with prior art, and moreover have an image blur correction function, and a method of manufacturing the zoom lens.

The present invention was described with configuration requirements in the embodiments, but needless to say, the present invention is not limited to these embodiments.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A zoom lens comprising, in order from an object, a first lens group having negative refractive power, a second lens group having positive refractive power, and a third lens group having positive refractive power, wherein
the second lens group has three or more cemented lenses.

2. The zoom lens according to claim 1, wherein the following conditional expression is satisfied:

$$3.00 < Dt23/Dt3i < 30.00$$

where Dt23 denotes a distance between the second lens group and the third lens group in a telephoto end state, and Dt3$i$ denotes a distance from the third lens group to the image plane in the telephoto end state, when converted to air.

3. The zoom lens according to claim 1, wherein the following conditional expression is satisfied:

$$0.10 < f2/f3 < 0.50$$

where f2 denotes a focal length of the second lens group and f3 denotes a focal length of the third lens group.

4. The zoom lens according to claim 1, wherein the third lens group is constituted only by a single lens.

5. The zoom lens according to claim 1, wherein upon zooming from a wide-angle end state to a telephoto end state, the first lens group and the second lens group move so that the distance between the first lens group and the second lens group decreases, and the distance between the second lens group and the third lens group increases, and the third lens group is fixed during zooming.

6. The zoom lens according to claim 1, wherein the first lens group is constituted at least by three lenses, which are, in order from the object, a first negative lens, a second negative lens and a positive lens.

7. The zoom lens according to claim 6, wherein at least one of the first negative lens and the second negative lens of the first lens group has an aspherical surface.

8. The zoom lens according to claim 1, wherein the second lens group has at least one positive lens with an aspherical surface.

9. The zoom lens according to claim 1, wherein an aperture stop for determining brightness is disposed in the second lens group.

10. The zoom lens according to claim 1, wherein a diaphragm for cutting unnecessary external light is disposed between the first lens group and the second lens group, and moves upon zooming from a wide-angle end state to a telephoto end state.

11. The zoom lens according to claim 1, wherein image blur is corrected by shifting the cemented lens disposed closest to the object in the second lens group in a direction substantially perpendicular to the optical axis.

12. The zoom lens according to claim 11, wherein the following conditional expression is satisfied:

$$0.001 < f2F/f2M < 0.500$$

where f2F denotes a focal length of the cemented lens disposed closest to the object, and f2M denotes a focal length of the cemented lens disposed second closest to the object, in the second lens group.

13. The zoom lens according to claim 11, wherein the following conditional expression is satisfied:

$$0.01 < f2F/f2MR < 0.2$$

where f2F denotes a focal length of the cemented lens disposed closest to the object, and f2MR denotes a combined focal length of the cemented lenses disposed second and third closest to the object, in the second lens group.

14. An optical apparatus including the zoom according to claim 1.

15. A method of manufacturing a zoom lens, comprising:
disposing, in order from an object, a first lens group having negative refractive power, a second lens group having positive refractive power, and a third lens group having positive refractive power, wherein
the second lens group has three or more cemented lenses.

16. The method of manufacturing the zoom lens according to claim 15, wherein the following conditional expression is satisfied:

$$3.00 < Dt23/Dt3i < 30.00$$

where Dt23 denotes a distance between the second lens group and the third lens group in a telephoto end state, and Dt3$i$ denotes a distance from the third lens group to the image plane in the telephoto end state, when converted to air.

17. The method of manufacturing the zoom lens according to claim 15, wherein the following conditional expression is satisfied:

$$0.10 < f2/f3 < 0.50$$

where f2 denotes a focal length of the second lens group and f3 denotes a focal length of the third lens group.

18. The method of manufacturing the zoom lens according to claim 15, wherein the third lens group is constituted only by a single lens.

19. The method of manufacturing the zoom lens according to claim 15, wherein the first, second, and third lens groups are disposed such that, upon zooming from a wide-angle end state to a telephoto end state,
the first lens group and the second lens group move so that the distance between the first lens group and the second lens group decreases, and the distance between the second lens group and the third lens group increases, and the third lens group is fixed during zooming.

20. The method of manufacturing the zoom lens according to claim 15, wherein the first lens group is constituted by at least three lenses, which are, in order from the object, a first negative lens, a second negative lens and a positive lens.

21. The method of manufacturing the zoom lens according to claim 15, wherein image blur is corrected by shifting the cemented lens disposed closest to the object in the second lens group in a direction substantially perpendicular to the optical axis.

22. The method of manufacturing the zoom lens according to claim 21, wherein the following conditional expression is satisfied:

$$0.001 < f2F/f2M < 0.500$$

where f2F denotes a focal length of the cemented lens disposed closest to the object, and f2M denotes a focal length of the cemented lens disposed second closest to the object, in the second lens group.

23. The method of manufacturing the zoom lens according to claim 21, wherein the following conditional expression is satisfied:

$$0.01 < f2F/f2MR < 0.2$$

where f2F denotes a focal length of the cemented lens disposed closest to the object, and f2MR denotes a combined focal length of the cemented lenses disposed second and third closest to the object, in the second lens group.

* * * * *